(12) United States Patent
Nagata et al.

(10) Patent No.: US 8,989,108 B2
(45) Date of Patent: Mar. 24, 2015

(54) WIRELESS PACKET COMMUNICATION METHOD AND WIRELESS PACKET COMMUNICATION APPARATUS

(75) Inventors: Kengo Nagata, Kanagawa (JP); Tomoaki Kumagai, Kanagawa (JP); Shinya Otsuki, Kanagawa (JP); Kazuyoshi Saito, Tokyo (JP); Satoru Aikawa, Kanagawa (JP); Atsushi Ohta, Kanagawa (JP); Akinori Hirukawa, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 66 days.

(21) Appl. No.: 13/108,504

(22) Filed: May 16, 2011

(65) Prior Publication Data
US 2011/0216728 A1    Sep. 8, 2011

Related U.S. Application Data

(62) Division of application No. 10/548,788, filed as application No. PCT/JP2004/008912 on Jun. 18, 2004, now Pat. No. 7,974,243.

(30) Foreign Application Priority Data

Jun. 18, 2003 (JP) ................. 2003-173914
Oct. 29, 2003 (JP) ................. 2003-368685
Nov. 14, 2003 (JP) ................. 2003-385603
Dec. 15, 2003 (JP) ................. 2003-416354
Dec. 24, 2003 (JP) ................. 2003-427580
Jan. 28, 2004 (JP) ................. 2004-019673
Feb. 5, 2004 (JP) ................. 2004-029730
Apr. 5, 2004 (JP) ................. 2004-111621

(51) Int. Cl.
H04W 4/00          (2009.01)
H04B 7/216         (2006.01)

(Continued)

(52) U.S. Cl.
CPC .. *H04B 7/04* (2013.01); *H04L 1/06* (2013.01); *H04L 1/1887* (2013.01);

(Continued)

(58) Field of Classification Search
None
See application file for complete search history.

(56) References Cited

U.S. PATENT DOCUMENTS 4,663,706 A    5/1987   Allen et al. .................... 709/234
5,430,724 A    7/1995   Fall et al. ...................... 370/337

(Continued)

FOREIGN PATENT DOCUMENTS

EP    1 130 834 A1    9/2001
EP    1 255 369 A1    11/2002

(Continued)

OTHER PUBLICATIONS

International Standard ISO/IEC 8802-11 ANSI/IEEE Std 802.11, 1999 edition, Information technology—Telecommunications and information exchange between systems—Local and metropolitan area networks—Specific requirements—Part 11: Wireless LAN Medium Access Control (MAC) and Physical Layer (PHY) specifications, pp. 70-86.

(Continued)

*Primary Examiner* — Jae Y Lee
*Assistant Examiner* — Thinh Tran
(74) *Attorney, Agent, or Firm* — Harness, Dickey & Pierce, P.L.C.

(57) ABSTRACT

In retransmission processing due to a failure of transmission of data packets, a plurality of data packets are simultaneously transmitted between two STAs by utilizing multiple wireless channels and MIMO, and the number of idle channels and the number of retransmission packets are compared. Then, when both of the numbers are different or only when the number of idle channels is larger than the number of retransmission packets, the retransmission packets are reconstructed according to the number of idle channels, and the reconstructed retransmission packets are simultaneously transmitted by using the idle channels.

7 Claims, 50 Drawing Sheets

(51) Int. Cl.
*H04L 12/413* (2006.01)
*H04J 3/24* (2006.01)
*H04B 7/04* (2006.01)
*H04L 1/06* (2006.01)
*H04L 1/18* (2006.01)
*H04L 5/14* (2006.01)
*H04L 27/26* (2006.01)
*H04L 1/00* (2006.01)
*H04W 28/04* (2009.01)
*H04W 72/12* (2009.01)
*H04W 74/08* (2009.01)

(52) U.S. Cl.
CPC ............ *H04L 1/1893* (2013.01); *H04L 5/143* (2013.01); *H04L 27/2601* (2013.01); *H04L 2001/0096* (2013.01); *H04W 28/04* (2013.01); *H04W 72/1263* (2013.01); *H04W 74/0808* (2013.01)
USPC ........... 370/329; 370/334; 370/341; 370/342; 370/445; 370/474

(56) References Cited

U.S. PATENT DOCUMENTS

| | | | |
|---|---|---|---|
| 5,444,718 A | 8/1995 | Ejzak et al. | 714/748 |
| 6,021,124 A | 2/2000 | Haartsen | 370/336 |
| 6,307,868 B1 | 10/2001 | Rakib et al. | 370/485 |
| 6,574,668 B1 | 6/2003 | Gubbi et al. | 709/237 |
| 6,697,331 B1 | 2/2004 | Riihinen et al. | 370/236 |
| 7,031,419 B2 | 4/2006 | Piirainen | 375/358 |
| 7,532,600 B2 | 5/2009 | Hu et al. | 370/335 |
| 2001/0014091 A1 | 8/2001 | Yamada | 370/349 |
| 2002/0080792 A1* | 6/2002 | Rosier | 370/394 |
| 2002/0159431 A1 | 10/2002 | Moulsley et al. | |
| 2003/0066004 A1* | 4/2003 | Rudrapatna et al. | 714/751 |
| 2003/0067890 A1 | 4/2003 | Goel et al. | |
| 2003/0072452 A1 | 4/2003 | Mody et al. | 380/274 |
| 2003/0074669 A1* | 4/2003 | Kobayashi et al. | 725/95 |
| 2003/0103521 A1* | 6/2003 | Raphaeli et al. | 370/445 |
| 2003/0112810 A1 | 6/2003 | Nakabayashi et al. | 370/401 |
| 2004/0057530 A1* | 3/2004 | Tarokh et al. | 375/267 |
| 2004/0110499 A1 | 6/2004 | Kang et al. | 455/422.1 |
| 2004/0184470 A1 | 9/2004 | Holden | 370/412 |
| 2005/0117520 A1 | 6/2005 | Miyoshi | 370/238 |
| 2005/0226272 A1 | 10/2005 | Luby et al. | 370/473 |

FOREIGN PATENT DOCUMENTS

| | | |
|---|---|---|
| EP | 1 298 829 A1 | 4/2003 |
| JP | 57-107658 A | 7/1982 |
| JP | 05-035624 A | 2/1993 |
| JP | 06-232871 A | 8/1994 |
| JP | 08-116331 A | 5/1996 |
| JP | 11-317785 A | 11/1999 |
| JP | 2001-44969 A | 2/2001 |
| JP | 2002-281002 A | 9/2002 |
| JP | 2002-319993 A | 10/2002 |
| JP | 2003-078480 A | 3/2003 |
| JP | 2003-101604 A | 4/2003 |
| JP | 2004-040493 A | 2/2004 |
| WO | 99/08423 | 2/1999 |
| WO | 01/71928 A2 | 9/2001 |
| WO | WO 0230032 A2 * | 4/2002 |
| WO | 02/089389 A1 | 11/2002 |

OTHER PUBLICATIONS

IEEE Std 802.11-1997, Information technology—Telecommunications and information exchange between systems—Local and metropolitan area networks—Specific requirements—Part 11: Wireless LAN Medium Access Control (MAC) and Physical Layer (PHY) specifications, pp. 71-87 and 445.

Low-powered Data Communication System/Broadband Mobile Access Communication System (CSMA) standard, ARIB STD-T71 version 1.0, Association of Radio Industries and Businesses, 2000, pp. 59-71 (with English translation of relevant sections).

Kurosaki, Satoshi, et al., "100Mbit/s SDM-COFDM over MIMO Channel for Broadband Communications," Technical Report of the Institute of Electronics, Information and Communication Engineers, A P2001-96, RCS2001-135, pp. 37-42 (with English translation).

Andre Bourdoux et al., "Joint TX-RX Optimisation for MIMO-SDMA Based on a Null-space Constraint," IEEE, Proceedings, Vehicular Technology Conference, Fall 2002, pp. 171-174.

Hiroyuki Atarashi et al., "Partial Frequency ARQ for Multi-Carrier Modulation," Technical Report of The Institute of Electronics, Information and Communication Engineers, vol. 94, No. 108, Jun. 1994, pp. 67-72.

\* cited by examiner

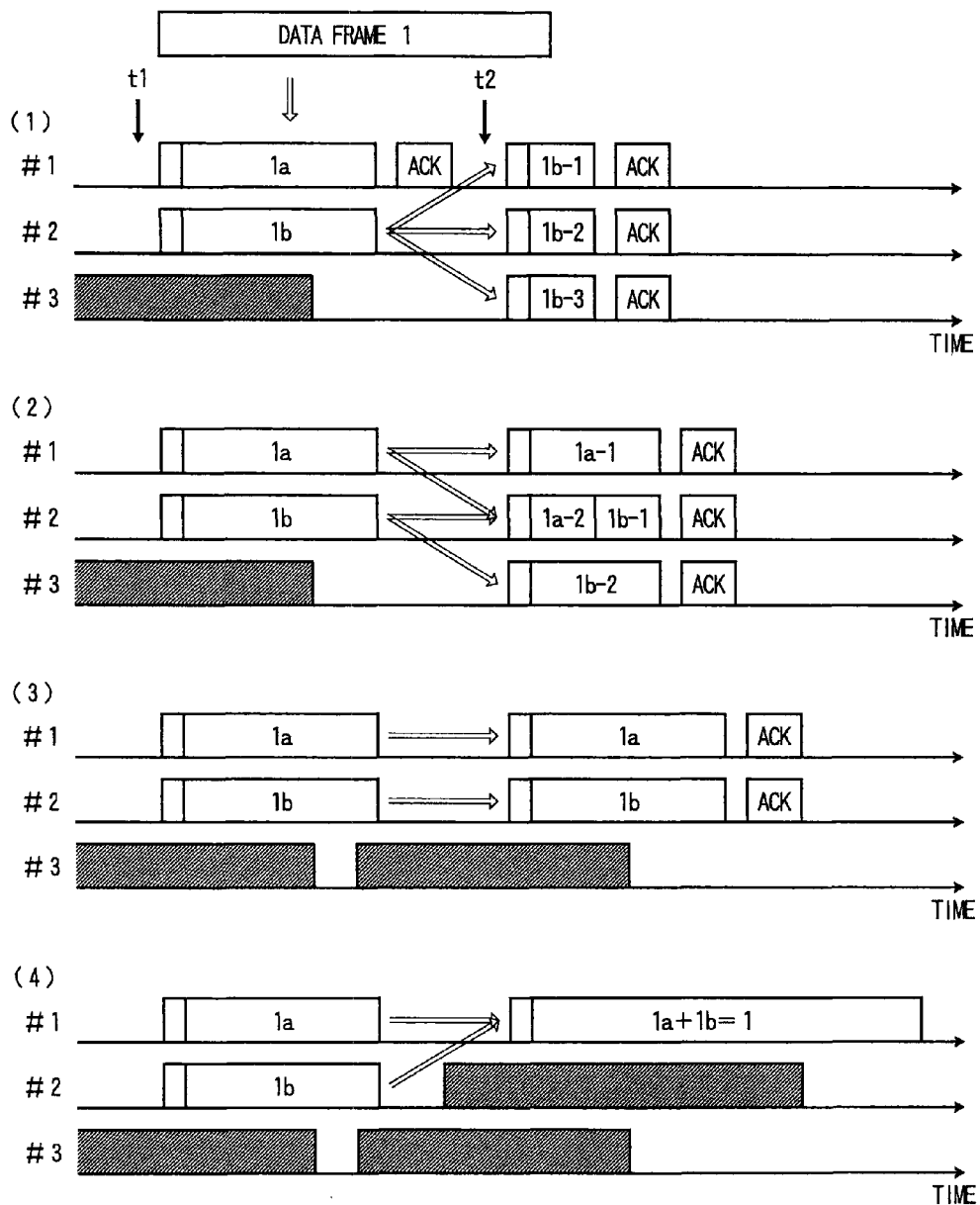

FIG. 14
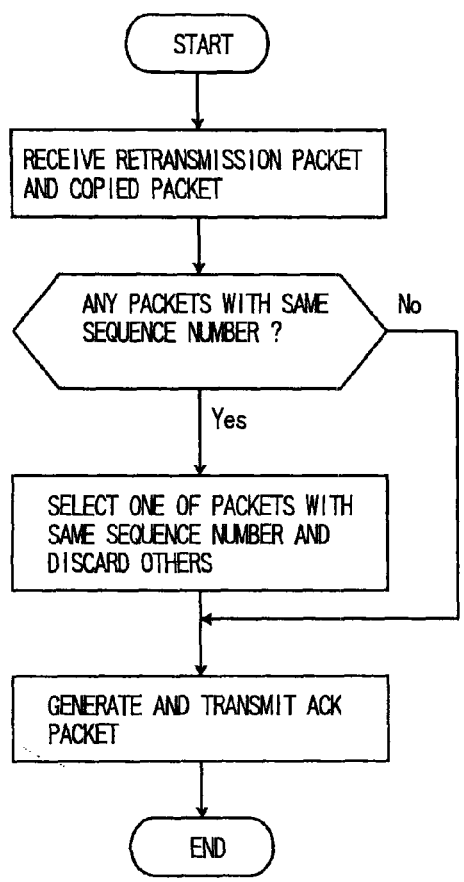
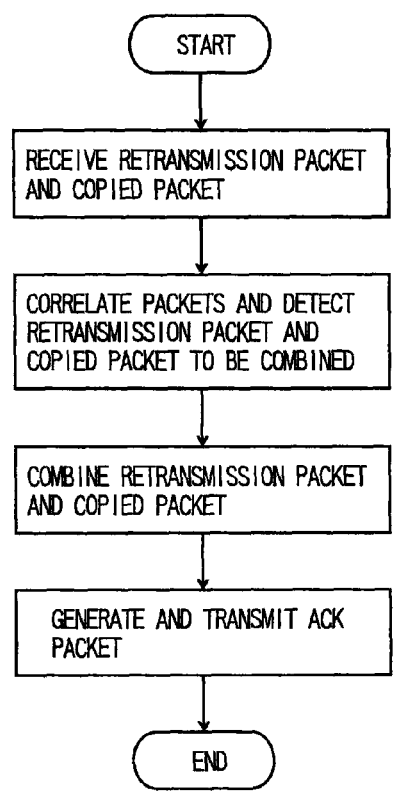

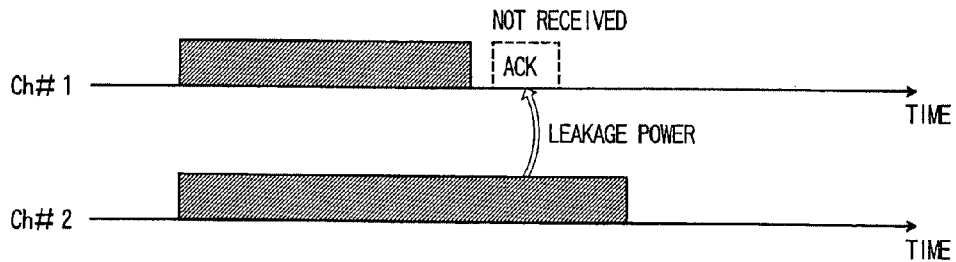
FIG. 48
(PRIOR ART)
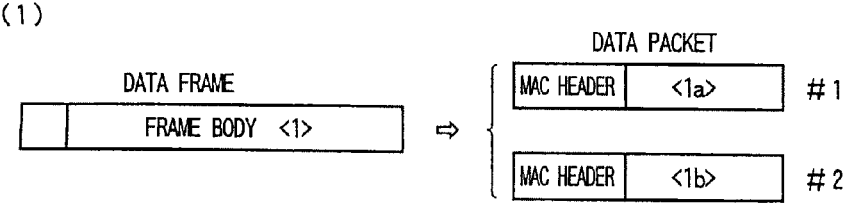
FIG. 49
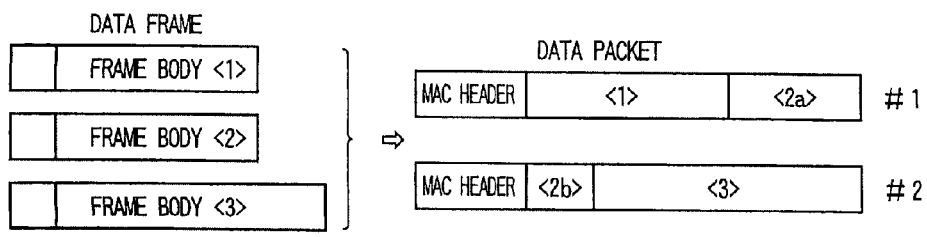
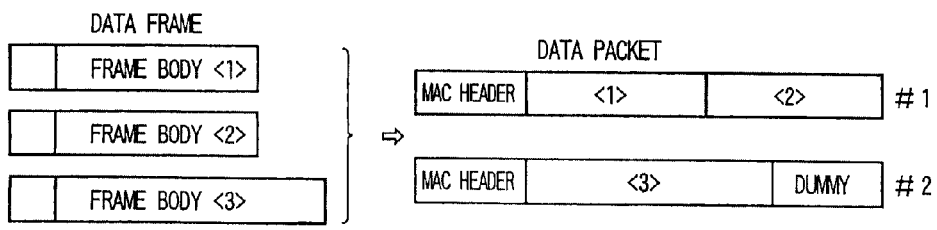

WIRELESS PACKET COMMUNICATION METHOD AND WIRELESS PACKET COMMUNICATION APPARATUS

CROSS-REFERENCE TO RELATED APPLICATION

This application is based upon and claims the benefit of priority from Japanese Patent Application No. 2003-173914, filed Jun. 18, 2003, Application No. 2003-368685, filed Oct. 29, 2003, Application No. 2003-385603, filed Nov. 14, 2003, Application No. 2003-416354, filed Dec. 15, 2003, application No. 2003-427580, filed Dec. 24, 2003, Application No. 2004-019673, filed Jan. 28, 2004, Application No. 2004-029730, filed Feb. 5, 2004 and Application No. 2004-111621, filed Apr. 5, 2004, the entire contents of which are incorporated herein by reference.

TECHNICAL HELD

The present invention relates to a wireless packet communication method of simultaneously transmitting a plurality of data packets to/from an station (hereinafter, STA) by utilizing multiple wireless channels and Multiple Input Multiple Output (hereinafter, MIMO), and more particularly, to a wireless packet communication method involved in retransmission processing when a data packet is not normally transmitted.

BACKGROUND ART

In a conventional wireless packet communication method, after only one wireless channel for use is determined in advance, it is detected prior to the transmission of a data packet whether or not this wireless channel is idle (carrier sense), and one data packet is transmitted only when this wireless channel is idle. Such control allows a plurality of STAs to share one wireless channel at different times ((1) "International Standard ISO/IEC 8802-11 ANSI/IEEE Std. 802.11, 1999 edition, Information technology—Telecommunications and information exchange between systems—Local and metropolitan area networks—Specific requirements—Part 11: Wireless LAN Medium Access Control (MAC) and Physical Layer (PHY) specifications", (2) "Low-powered Data Communication System/Broadband Mobile Access Communication System (CSMA) Standard", ARIB STD-T71 version 1.0, Association of Radio Industries and Businesses, settled in 2000).

Meanwhile, in order to enhance data packet transmission efficiency, a wireless packet communication method is being considered in which multiple wireless channels, if found idle by carrier sense, are used for simultaneous transmission of a plurality of data packets. In this method, for example, if there are two idle wireless channels while there are three data packets, the two wireless channels are used for the simultaneous transmission of two out of the three data packets. Further, for example, if there are three idle wireless channels while there are two data packets, the two wireless channels are used for the simultaneous transmission of all (two) the data packets.

In order to enhance data packet transmission efficiency, another wireless packet communication method is being considered in which a known MIMO technique (Kurosaki et al., "100 Mbit/s SDM-COFDM over MIMO Channel for Broadband Mobile Communications", Technical Reports of the Institute of Electronics, Information and Communication Engineers, A P 2001-96, RCS2001-135(2001-10)) is used for simultaneous transmission of a plurality of data packets via one wireless channel. The space division multiplexing (SDM) here is a system in which different data packets are simultaneously transmitted from a plurality of antennas via the same wireless channel, and the plural data packets simultaneously transmitted via the same wireless channel are received through digital signal processing according to different propagation coefficients of the respective data packets received by a plurality of antennas of an opposing STA. Note that the number of MIMOs is determined according to the propagation coefficient and the like.

Incidentally, in the method of simultaneously transmitting a plurality of data packets by using multiple wireless channels, when center frequencies of the multiple wireless channels that are simultaneously used are close to each other, leakage power leaking from one of the wireless channels to a frequency domain used by another wireless channel has a significant influence. In the transmission of a data packet, after a transmit-side STA transmits the data packet, a receive-side STA generally transmits a reception acknowledgment packet (an ACK packet, a NACK packet) to the transmit-side STA in response to the received packet. When the transmit-side STA attempts to receive this acknowledgement packet (hereinafter, ACK packet), the influence of the leakage power from the other wireless channel being used for the simultaneous transmission poses a problem.

For example, as shown in FIG. 48, such a case will be assumed where center frequencies of a wireless channel #1 and a wireless channel #2 are close to each other and the transmission time is different between data packets simultaneously transmitted from the respective wireless channels. Here, since the data packet transmitted from the wireless channel #1 is short, the wireless channel #2 is in a course of transmission when an ACK packet for this packet is received. Therefore, there is a possibility that leakage power from the wireless channel #2 may prevent the reception of the ACK packet via the wireless channel #1. Under such circumstances, no improvement in throughput can be expected even in the simultaneous transmission using the multiple wireless channels.

Incidentally, the case like this occurs due to difference in packet time length (transmission time=packet size) between the data packets if transmission rates of the respective wireless channels are equal to each other, and if the transmission rates of the respective wireless channels are also taken into consideration, this case occurs due to difference in packet time length (transmission time=data size/transmission rate).

Meanwhile, in a wireless LAN system and the like, data size of data frames inputted from a network is not constant. Therefore, when the inputted data frames are sequentially converted to data packets for transmission, the packet time length (transmission time) of the data packets changes. Consequently, as shown in FIG. 48, even if the plural data packets are simultaneously transmitted, there is a higher possibility of a failure in receiving the ACK packet, due to the difference in the packet time length between the data packets.

Regarding this problem, a method is being considered in which the packet time lengths of a plurality of data packets to be simultaneously transmitted are made equal or equivalent so that the transmissions of the plural data packets are completed simultaneously or substantially simultaneously. This allows a transmitting STA to receive all ACK packets without being affected by leakage power or the like between the wireless channels since the transmitting STA is not in the course of transmission at the timing when the ACK packets for the plural respective data packets arrive, which can contribute to improvement in throughput. The "simultaneous transmission" in this specification refers to a state in which a plurality of data packets with the same packet time length (transmission time) are simultaneously transmitted.

Here, as methods of generating a plurality of data packets for simultaneous transmission from a data frame/data frames, the following three methods are available. For example, when there is one data frame and the number of idle channels is two, the data frame is divided so that two data packets are generated as shown in FIG. 49(1). When there are three data frames and the number of idle channels is two, for example, a data frame 2 is divided and the resultants are combined with a data frame 1 and a data frame 3 respectively so that two data packets are generated, as shown in FIG. 49(2). Alternatively, as shown in FIG. 49(3), a data frame 1 and a data frame 2 are combined and a dummy bit is added to a data frame 3 so that two data packets equal in packet time length are generated. Further, when multiple wireless channels are used and transmission rates of the respective wireless channels are different, a size ratio of data packets is adjusted according to a ratio of the transmission rates so that packet time lengths become equal to each other.

Incidentally, when the transmission of a data packet fails, a receiving-end transmits a reply to that effect by means of an ACK packet, or does not return the ACK packet itself. In this case, a transmit-side STA determines that the transmission of the data packet failed and executes retransmission processing for this data packet.

[Problem 1 at the Time of Retransmission]

It is assumed here that one channel out of, for example, three channels is busy at the time of initial transmission, and two data packets are generated so as to correspond to the two idle channels and are simultaneously transmitted. Two idle wireless channels are not always available when retransmission processing is thereafter executed due to a failure of transmission of at least one of the data packets. For example, when the number of idle wireless channels becomes larger at the time of the retransmission processing than that at the time of the initial transmission as shown in FIGS. 50(1), (2), if all the wireless channels that are idle at the time of the retransmission processing can be used for simultaneous transmission, instead of the retransmission using the same wireless channels as those used for the initial transmission, this can contribute to improvement in throughput.

On the other hand, there is also a case where the number of idle wireless channels becomes smaller at the time of retransmission as shown in FIG. 51. In this case, two data packets to be retransmitted are divided for two separate transmissions. At this time, carrier sense is necessary before each of the retransmission packets is transmitted, and thus it is not always possible to transmit them continuously, which may possibly cause reduced throughput, increased average delay time, and increased jitter.

[Problem 2 at the Time of Retransmission]

Next, problems when conventional retransmission methods are applied to simultaneous transmission will be described, though a retransmission method in the simultaneous transmission will not be particularly specified.

FIG. 52 shows a conventional retransmission method 1. Here, it is assumed that the number of simultaneously transmittable data packets is 3 and this number does not change at transmission timings t1, t2, t3 obtained by carrier sense. A transmit-side STA A generates data packets P1, P2, P3 from a data frame F1 and generates data packets P4, P5, P6 from a data frame F2. Note that P1 to P6 correspond to sequence numbers of the respective data packets.

The STA A simultaneously transmits the data packets P1 to P3 at the transmission timing t1. Thereafter, based on ACK packets from a receive-side STA, it confirms a success of transmission of the data packets P1, P3 and a failure of transmission of the data packet 2. The STA A determines that the data frame F1 cannot be restored due to the failure of transmission of the data packet P2 to retransmit all the data packets P1 to P3 corresponding to the data frame F1 at the next transmission timing t2. At this time, the data packets P1, P3 are retransmitted even though having been normally received. However, if the transmission of the data packet P1 fails at this time, the data packets P1 to P3 are retransmitted again at the next transmission timing t3.

Thus, the transmit-side STA A simultaneously transmits a plurality of data packets included in a data frame, and simultaneously retransmits the same plural data packets included in the data frame again when failing in the transmission of part thereof. This means that the data packet successfully transmitted is also retransmitted, so that channel utilization is lowered and throughput is unavoidably lowered.

In a MIMO system in particular, if the number of multiplexing is increased, the influence that a fluctuation in wireless channels gives to transmission quality becomes more significant, resulting in a higher packet error rate and a higher bit error rate. Therefore, if all data packets including data packets which have been successfully transmitted are simultaneously retransmitted due to the failure of part of the data packets that have been simultaneously transmitted, a probability of another transmission failure becomes high, so that channel utilization and throughput have been unavoidably lowered.

FIG. 53 shows a conventional retransmission method 2. It is assumed here that the number of simultaneously transmittable data packets is 3 and this number does not change at transmission timings t1, t2, t3 obtained by carrier sense. A transmit-side STA A generates data packets P1, P2, P3 from a data frame F1 and generates data packets P4, P5, P6 from a data frame F2. It is assumed here that the data packets P1 to P6 are equal in the transmission time.

The STA A simultaneously transmits the data packets P1 to P3 at the transmission timing t1. Thereafter, based on ACK packets from a receive-side STA, it confirms a success of transmission of the data packets P1, P3 and a failure of transmission of the data packet P2. Then, at the next transmission timing t2, it simultaneously transmits data packets P4, P5 that have been simultaneously generated since the retransmission of only the not-successfully-transmitted data packet P2 leads to poor efficiency. Thereafter, based on ACK packets from the receive-side STA, it confirms a success of transmission of the data packets P4, P5 and a failure of transmission of the data packet P2. Then, at the next transmission timing t3, it simultaneously transmits the data packet P2 whose transmission has failed again and the new data packet P6. Thereafter, based on ACK packets from the receive-side STA, it confirms a success of transmission of the data packet P6 and a failure of transmission of the data packet P2.

When the data packet P6 is successfully transmitted while the failure of transmission of the data packet P2 is thus repeated, the data packets P4 to P6 constituting the data frame F2 have all received. As a result, while the data frame F1 is left unrestorable due to the failure of transmission of the data packet P2, the next data frame F2 is restored so that the sequence is reversed. At this time, in order to make the sequence of the restored data frames in the proper order, it is necessary to retain the first restored data frame F2 until the data packet P2 is successfully transmitted and the data frame F1 is restored.

Further, though not described in FIG. 53, if the data packet P2, at the time of its retransmission, is simultaneously transmitted with a data packet generated from a next data frame F3 and the transmission of the data packet 2 fails, this results in a situation where the data frame F3 is first restored while the data frame F1 is left unrestorable. If such processing is repeated, the sequentially restored data frames F2, F3, . . . are retained until the data packet P2 is successfully transmitted and the data frame F1 is restored, and therefore, a reception buffer size in the receive-side STA has to be made large.

Incidentally, it is assumed here that the data packets P1 to P6 generated from the data frames F1, F2 are equal in the transmission time, but when the data packets P1 to P3 and the data packets P4 to P6 are different in the transmission time, the aforesaid influence of the leakage power between the channels poses a problem if the data packets P4, P5 are simultaneously transmitted at the time of the retransmission of the packet P2.

An object of the present invention is to provide a retransmission method for realizing improvement in throughput also in retransmission processing while taking advantage of simultaneous transmission. Another object is to provide a retransmission method for not only improving throughput in retransmission processing but also facilitating processing of restoring to a data frame a plurality of data packets including a retransmitted data packet, when the data packets are generated from the data frame and simultaneously transmitted.

DISCLOSURE OF THE INVENTION

According to a first aspect of the invention, when retransmission processing is to be executed due to a failure of transmission of a data packet between two STAs, a number of wireless channels determined to be idle by carrier sense is compared with a number of retransmission packets. Then, when both of the numbers are different or only when the number of idle channels is larger than the number of retransmission packets, the retransmission packets are reconstructed according to the number of idle channels and the reconstructed retransmission packets are simultaneously transmitted by using the idle wireless channels.

According to a second aspect of the invention, when retransmission processing is to be executed between two STAs using MIMO due to a failure of transmission of a data packet, a number of MIMOs of one wireless channel determined to be idle by carrier sense is compared with a number of retransmission packets. Then, when both of the numbers are different or only when the number of MIMOs is larger than the number of retransmission packets, the retransmission packets are reconstructed according to the number of MIMOs and the reconstructed retransmission packets are simultaneously transmitted by using the MIMO.

According to a third aspect of the invention, when retransmission processing is to be executed due to a failure of transmission of a data packet between two STAs capable of using MIMO of each wireless channel together, a number of simultaneous transmissions corresponding to a sum of numbers of MIMO of respective wireless channels determined to be idle by carrier sense is compared with a number of retransmission packets. Then, when both of the numbers are different or only when the number of simultaneous transmissions is larger than the number of retransmission packets, the retransmission packets are reconstructed according to the number of simultaneous transmissions and the reconstructed retransmission packets are simultaneously transmitted by using the idle wireless channels and the MIMO.

According to a fourth aspect of the invention, when retransmission processing is to be executed due to a failure of transmission of a data packet between two STAs, a number of wireless channels determined to be idle by carrier sense is compared with a number of retransmission packets. Then, when the number of idle channels is larger than the number of retransmission packets, the retransmission packets are copied according to a number of surplus idle channels, and the retransmission packets and a copy packet are simultaneously transmitted by using the idle wireless channels. Then, a receive-side STA diversity-receives the retransmission packets and the copy packet which are simultaneously transmitted.

According to a fifth aspect of the invention, when retransmission processing is to be executed due to a failure of transmission of a data packet between two STAs using MIMO, a number of MIMOs of one wireless channel determined to be idle by carrier sense is compared with a number of retransmission packets. Then, when the number of MIMOs is larger than the number of retransmission packets, the retransmission packets are copied according to a number of surplus MIMOs and the retransmission packets and a copy packet are simultaneously transmitted by using the MIMO. Then, a receive-side STA diversity-receives the retransmission packets and the copy packet which are simultaneously transmitted.

According to a sixth aspect of the invention, when retransmission processing is to be executed due to a failure of transmission of a data packet between two STAs capable of using MIMO of each wireless channel together, a number of simultaneous transmissions corresponding to a sum of numbers of MIMO of wireless channels determined to be idle by carrier sense is compared with a number of retransmission packets. Then, when the number of simultaneous transmissions is larger than the number of retransmission packets, the retransmission packets are copied according to a surplus number in the number of simultaneous transmissions, and the retransmission packets and a copy packet are simultaneously transmitted by using the idle wireless channels and the MIMO. Then, a receive-side STA diversity-receives the retransmission packets and the copy packet which are simultaneously transmitted.

According to a seventh aspect of the invention, multiple wireless channels determined to be idle both by physical carrier sense that determines a busy state or an idle state according to received power and by virtual carrier sense that determines the busy state during a set transmission inhibition time are used between two STAs. When retransmission processing is to be executed due to a failure of transmission of a data packet between the STAs, a number of wireless channels determined to be idle by the carrier senses is compared with a number of retransmission packets. Then, when the number of idle channels is smaller than the number of retransmission packets, a transmission time for the plural retransmission packets via the idle wireless channel is secured and the plural retransmission packets are continuously transmitted without use of the physical carrier sense.

According to an eighth aspect of the invention, when retransmission processing is to be executed due to a failure of transmission of a data packet between two STAs using MIMO, a number of MIMOs of one wireless channel determined to be idle by carrier sense is compared with a number of retransmission packets. Then, when the number of MIMOs is smaller than the number of retransmission packets, a transmission time for the plural retransmission packets via the idle wireless channel is secured, and the plural retransmission packets are continuously transmitted without use of physical carrier sense.

According to a ninth aspect of the invention, when retransmission processing is to be executed due to a failure of transmission of a data packet between two STAs capable of using MIMO of each wireless channel together, a number of simultaneous transmissions corresponding to a sum of numbers of MIMO of respective wireless channels determined to be idle by carrier senses is compared with a number of retransmission packets. Then when the number of simultaneous transmissions is smaller than the number of retransmission packets, a transmission time for the plural retransmission packets via the idle wireless channel is secured and the plural retransmission packets are continuously transmitted without use of physical carrier sense.

According to a tenth aspect of the invention, the number of MIMOs in any one of the second, third, fifth, sixth, eighth or ninth aspect of the invention is set according to a channel condition between the two STAs.

According to an eleventh aspect of the invention, in any one of the seventh to ninth aspects of the invention, determined is a procedure for securing the transmission time for the plural retransmission packets via the idle wireless channel and continuously transmitting the plural retransmission packets without use of the physical carrier sense. In a retransmission packet to be transmitted first, the transmission time for the plural retransmission packets is set as the transmission inhibition time, and the retransmission packet to be transmitted first is transmitted. An STA having received the retransmission packet refrains from transmitting during the transmission inhibition time, while an own STA transmitting the retransmission packet continuously transmits a subsequent retransmission packet.

According to a twelfth aspect of the invention, in any one of the seventh to ninth aspects of the invention, determined is a procedure for securing the transmission time for the plural retransmission packets via the idle wireless channel and continuously transmitting the plural retransmission packets without use of the physical carrier sense. Information indicating presence of a subsequent retransmission packet is appended to a retransmission packet to be transmitted first, and an STA normally receiving the retransmission packet sets a transmission time for the subsequent retransmission packet as the transmission inhibition time in a reply packet to transmit the reply packet. An STA having received the reply packet refrains from transmitting during the transmission inhibition time, while an own STA as a destination of the reply packet ignores the transmission inhibition time to continuously transmit the subsequent retransmission packet.

According to a thirteenth aspect of the invention, in any one of the seventh to ninth aspects of the invention, determined is a procedure for securing the transmission time for the plural retransmission packets via the idle wireless channel and continuously transmitting the plural retransmission packets without use of the physical carrier sense. The transmission time for the plural retransmission packets is set in a control packet as the transmission inhibition time for transmission of the control packet. An STA having received the control packet refrains from transmitting during the transmission inhibition time, while an own STA transmitting the control packet continuously transmits the plural retransmission packets.

According to a fourteenth aspect of the invention, the STA having received the control packet in the thirteenth aspect of the invention sets the transmission inhibition time in a reply packet to transmit the reply packet. An STA having received the reply packet refrains from transmitting during the transmission inhibition time, while the own STA as a destination of the reply packet ignores the transmission inhibition time to continuously transmit the plural retransmission packets.

According to a fifteenth aspect of the invention, determined is a procedure for retransmission processing between two STAs between which a plurality of data packets are simultaneously transmitted by using multiple wireless channels, a plurality of data packets are simultaneously transmitted by MIMO using one wireless channel, or a plurality of data packets corresponding to a sum of numbers of MIMO of multiple wireless channels are simultaneously transmitted by using the both. A transmit-side STA generates a plurality of data packets equal in a transmission time from one data frame or more accumulated in a transmission buffer to simultaneously transmit the plural data packets. Then, the transmit-side STA retransmits only a not-successfully-transmitted data packet when receiving an ACK packet transmitted from a receive-side STA to recognize a success of transmission of part of the data packets. On the other hand, the transmit-side STA retransmits the plural data packets when not receiving the ACK packet. Further, the transmit-side STA starts subsequent transmission processing when receiving the ACK packet to recognize success of transmission of all the simultaneously transmitted data packets.

According to a sixteenth aspect of the invention, a transmit-side STA generates a plurality of data packets equal in a transmission time from one data frame or more accumulated in a transmission buffer to simultaneously transmit the plural data packets. Further, the transmit-side STA transmits a negative acknowledgement request packet (hereinafter, NACK request packet) for requesting a NACK packet (hereinafter, NACK packet) indicating a not-successfully-received data packet to receive the NACK packet transmitted from a receive-side STA. Here, the transmit-side STA retransmits only the not-successfully-transmitted data packet when recognizing a failure of transmission of part or all of the data packets. On the other hand, the transmit-side STA starts subsequent transmission processing when not receiving the NACK packet.

According to a seventeenth aspect of the invention, a transmit-side STA generates at least a simultaneously transmittable number of data packets equal in a transmission time, from one data frame or more accumulated in a transmission buffer to continuously simultaneously transmit the plural data packets in unit of the simultaneously transmittable number. Further, the transmit-side STA transmits an ACK request packet for requesting an ACK packet indicating a successfully received data packet to receive the ACK packet transmitted from a receive-side STA. Here, the transmit-side STA retransmits only a not-successfully-transmitted data packet when recognizing a success of transmission of part of the data packets. On the other hand, the transmit-side STA retransmits the plural data packets when not receiving the ACK packet. Further, the transmit-side STA starts subsequent transmission processing when receiving the ACK packet to recognize success of transmission all the simultaneously transmitted data packets.

According to an eighteenth aspect of the invention, a transmit-side STA generates at least a simultaneously transmittable number of data packets equal in a transmission time, from one data frame or more accumulated in a transmission buffer to continuously simultaneously transmit the plural data packets in unit of the simultaneously transmittable number. Further, the transmit-side STA transmits a NACK request packet for requesting a NACK packet indicating a not-successfully-received data packet to receive the NACK packet transmitted from a receive-side STA. Here, the transmit-side STA retransmits only the not-successfully-transmitted data packet when recognizing a failure of transmission of part or all of the data packets. On the other hand, the transmit-side STA starts subsequent transmission processing when not receiving the NACK packet.

According to a nineteenth aspect of the invention, in the seventeenth or eighteenth aspect of the invention, when the plural data packets continuously simultaneously transmitted are equal in the transmission time, in a case where a number of the not-successfully-transmitted data packets exceeds the simultaneously transmittable number, the not-successfully-transmitted data packets are continuously simultaneously retransmitted. On the other hand, in a case where the number of not-successfully-transmitted data packets is equal to or smaller than the simultaneously transmittable number, the not successfully transmitted data packet(s) is(are) retransmitted or simultaneously retransmitted.

According to a twentieth aspect of the invention, in the seventeenth or eighteenth aspect of the invention, when the transmission time for the plural data packets continuously simultaneously transmitted is different depending on each unit of the simultaneously transmittable number, in a case where the not-successfully-transmitted data packets are different in the transmission time, a dummy bit is added to a data packet whose transmission time is shorter to make packet time lengths equal. Then, in a case where a number of the not-successfully-transmitted data packets exceeds the simultaneously transmittable number, the not-successfully-transmitted data packets are continuously simultaneously retransmitted. On the other hand, in a case where the number of not-successfully-transmitted data packets is equal to or smaller than the simultaneously transmittable number, the not-successfully-transmitted data packet(s) is(are) retransmitted or simultaneously retransmitted.

According to a twenty-first aspect of the invention, in any one of the fifteenth to eighteenth aspects of the invention, instead of retransmitting only the not-successfully-transmitted data packet, a data packet with a smallest sequence number among the not-successfully-transmitted data packets and all the subsequent data packets are retransmitted.

According to a twenty-second aspect of the invention, a number of simultaneously transmitted data packets is determined to be p (p is an integer equal to 2 or more). In a step 1 of a first STA transmitting the data packets, M (M is an integer equal to 1 or more) packet-sets each consisting of p pieces of data packets or less that are equal in a transmission time are generated from one data frame or more accumulated in a transmission buffer. In a step 2, one packet-set (determined to be an Nth packet-set) among the M packet-sets is simultaneously transmitted in order of generation. In a step 3, an N+1th packet-set is simultaneously transmitted in the order of generation when a reply packet indicating success of transmission of all the data packets is received from a second STA having received the Nth packet-set. In a step 4, a number h of untransmitted data packets failing in transmission is obtained when the reply packet indicating a failure of transmission of part of the data packets is received from the second STA, and when there is any untransmitted data packet in and after the N+1th packet-set, h pieces of the untransmitted data packets in the Nth packet-set and (p−h) pieces of untransmitted data packets or less in and after the N+1th packet-set are simultaneously transmitted in the order of generation, while, when there is no untransmitted data packet in and after the N+1th packet-set, h pieces of the untransmitted data packets in the Nth packet-set are transmitted.

In a step 5, the Nth packet-set is simultaneously transmitted again when the reply packet is not received from the second STA. In a step 6, when all the data packets constituting the Nth packet-set are successfully transmitted, the number h of the untransmitted data packets failing in transmission is substituted for by a number of the untransmitted data packets in and after the N+1th packet-set, and the processing of the step 4 is thereafter repeated until the transmission of all the data packets in the M packet-sets is completed. Next, after the transmission of all the data packets in the M packet-sets is completed, the first STA returns to the step 1 to generate new M packet-sets.

According to a twenty-third aspect of the invention, in the twenty-second aspect of the invention, after the packet-set is transmitted from the first STA to the second STA, a NACK request packet is transmitted. The second STA transmits a NACK packet in response to the NACK request packet when there is any not-successfully-transmitted data packet. The first STA executes the processing of the step 3 and does not execute the processing of the step 5 when the NACK packet does not arrive.

According to a twenty-fourth aspect of the invention, in the twenty-second or twenty-third aspect of the invention, when the number M of the packet-sets generatable at a time exceeds an upper limit value in the step 1, the generation of a surplus packet-set over the upper limit value is suspended and a data frame not used for generating the packet-set is kept for a next packet-set generation.

According to a twenty-fifth aspect of the invention, in the twenty-second or twenty-third aspect of the invention, when a number of the data frames used for generating the M packet-sets exceeds an upper limit value in the step 1, the generation of a packet-set from a surplus data frame over the upper limit value is suspended and the data frame is kept for a next packet-set generation.

According to a twenty-sixth aspect of the invention, a number of simultaneously transmitted data packets is determined to be p (p is an integer equal to 2 or more). In a step 1 of a first STA transmitting the data packets, a packet-group consisting of a plurality of data packets that are equal in a time transmission T is generated from one data frame or more accumulated in a transmission buffer, and a number D1 of data packets is added to a cumulative number R of data packets. In a step 2, a maximum of p pieces of untransmitted data packets out of the data packets belonging to the packet-group are simultaneously transmitted in order of generation. In a step 3, when a reply packet indicating success of transmission of all the data packets is received from a second STA having received the simultaneously transmitted data packets, a number w of remaining untransmitted data packets in the packet-group is obtained. When w≥p, the maximum of p pieces of untransmitted data packets are simultaneously transmitted in the order of generation. When w<p and the transmission buffer has a newly inputted data frame, data packets whose transmission time is equal to the time T are generated from the data frame to be added to the packet-group, and after a number D2 of the data packets is added to the cumulative number R of data packets, the maximum of p pieces of untransmitted data packets are simultaneously transmitted in the order of generation.

In a step 4, when the reply packet indicating a failure of transmission of part of the simultaneously transmitted data packets arrives from the second STA, a total number w of the untransmitted data packets failing in transmission and remaining untransmitted data packets in the packet-group is obtained. When w≥p, the maximum of p pieces of untransmitted data packets including the untransmitted data packets failing in transmission are simultaneously transmitted in the order of generation. When w<p and the transmission buffer has a newly inputted data frame, data packets whose transmission time is equal to the time T are generated from the data frame to be added to the packet-group, and after a number of the data packets is added to the cumulative number R of data packets, the maximum of p pieces of untransmitted data packets including the untransmitted data packets failing in transmission are simultaneously transmitted in the order of generation. In a step 5, when the reply packet relating to reception of the packet-sets does not arrive from the second STA, all the data packets transmitted latest are simultaneously transmitted.

Then, the first STA repeats the processing of one of the step 3 to the step 5, resets the transmission time T and the cumulative number R of data packets when there is no new data frame input and the transmission of all the data packets in the packet-group is completed, and returns to the step 1.

According to a twenty-seventh aspect of the invention, in the twenty-sixth aspect of the invention, the first STA transmits a NACK request to the second STA after simultaneously transmitting the data packets. The second STA transmits a NACK packet in response to the NACK request packet when there is any not-successfully-transmitted data packet. The first STA executes the processing of the step 3 and does not execute the processing of the step 5 when the NACK packet does not arrive.

According to a twenty-eighth aspect of the invention, in the twenty-sixth or twenty-seventh aspect of the invention, when the cumulative number R of data packets in the packet-group exceeds an upper limit value, the generation of the data packets from the new data frame is suspended. Then, after the transmission of all the data packets in the packet-group is completed, the transmission time T and the cumulative number R of data packets are reset, and a flow returns to the step 1.

According to a twenty-ninth aspect of the invention, in the twenty-eighth aspect of the invention, when the cumulative number R of data packets in the packet-group does not exceed the upper limit value after the completion of the transmission of all the data packets in the packet-group, the time transmission T and the cumulative number R of data packets are not reset and the flow returns to the step 1.

According to a thirtieth aspect of the invention, in any one of the twenty-sixth to twenty-ninth aspects of the invention, instead of the cumulative number R of data packets constituting the packet-group, a number F of accumulated data frames used for generating the packet-group is used.

According to a thirty-first aspect of the invention, in the twenty-second aspect of the invention, instead of the number h of the untransmitted data packets failing in transmission in the step 4, the untransmitted data packets failing in transmission and subsequent data packets in the packet-sets are determined to be the untransmitted data packets, and a number thereof is determined to be h.

According to a thirty-second aspect of the invention, in the twenty-sixth aspect of the invention, instead of the total number w of the untransmitted data packets failing in transmission and the remaining untransmitted data packets in the packet-group in the step 4, the data packets failing in transmission and subsequent data packets in the packet-group are determined to be the untransmitted data packets and a number thereof is determined to be w.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 14 are flowcharts showing reception processing procedures of a retransmission packet and a copy packet;

FIG. 26 is a flowchart showing a processing procedure of a sixteenth embodiment of the present invention;

FIG. 48 is a time chart to explain a problem when center frequencies of multiple wireless channels are close to each other;

FIG. 49 are views to explain methods of generating, from a data frame/data frames, a plurality of data packets to be simultaneously transmitted, (1) showing an example of frame division, (2) showing an example of frame patching, and (3) showing an example of frame aggregation;

BEST MODE FOR CARRYING OUT THE INVENTION

A first embodiment to a fourteenth embodiment described below correspond to a case where the number of idle channels becomes larger/smaller at the time of retransmission processing than that at the time of initial transmission (the aforesaid problem 1 at the time of retransmission), a case where the number of retransmission packets and the number of idle channels are different, and so on, and are intended to make effective use of simultaneous transmission also at the time of the retransmission processing.

[First Embodiment]

Figure 1:
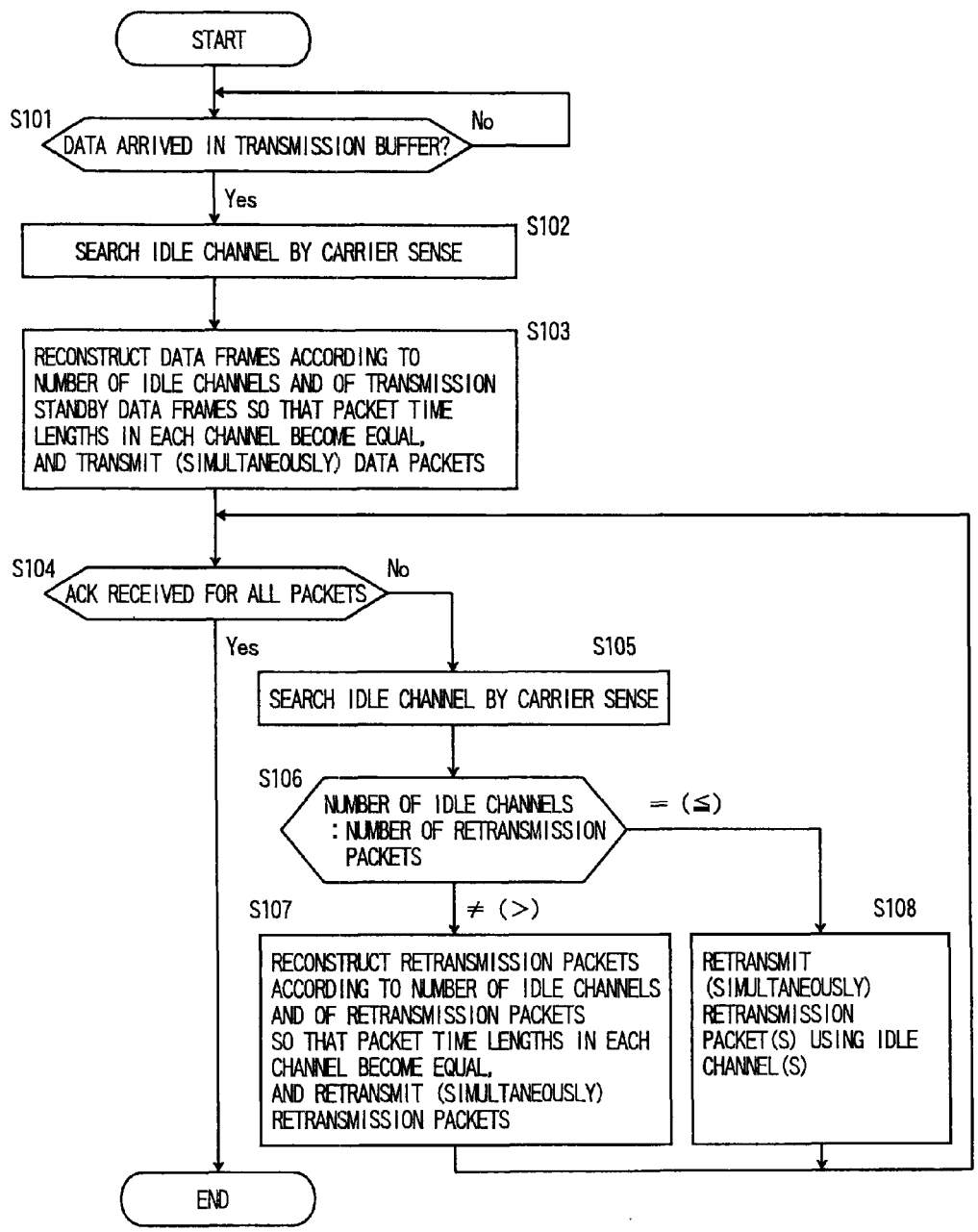
FIG. 1 is a flowchart showing a processing procedure of a first embodiment of the present invention.
Figure 3:
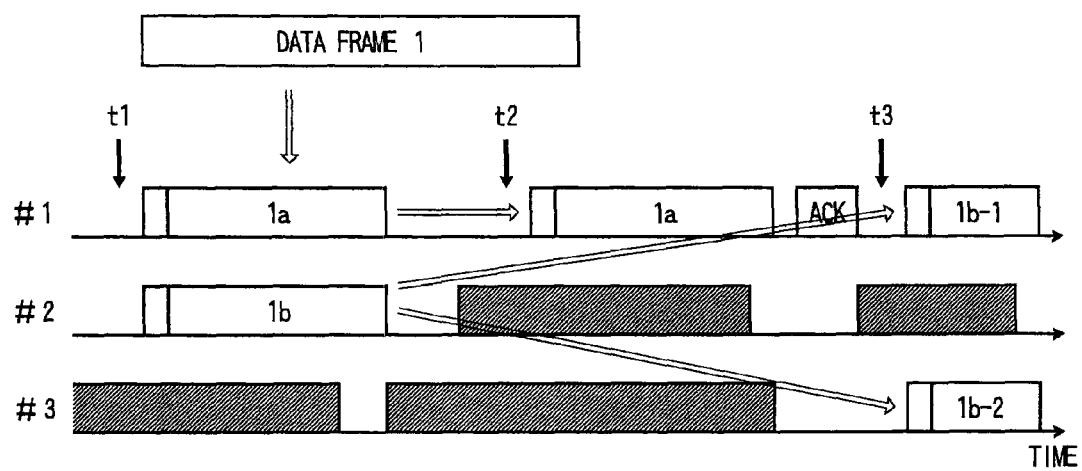
FIG. 3 is a time chart showing an operation example of the first embodiment of the present invention.
Figure 2:
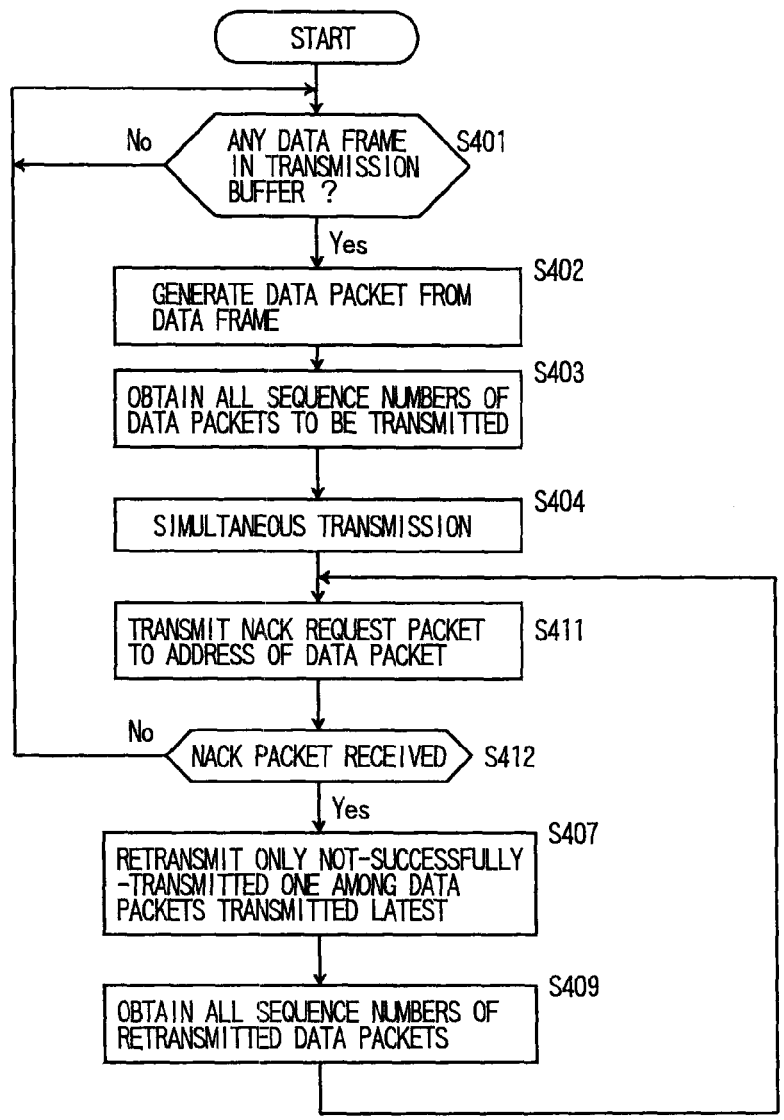
FIG. 2 are time charts showing operation examples of the first embodiment of the present invention.

FIG. 1 shows a flowchart of a first embodiment of the present invention. FIG. 2 and FIG. 3 show operation examples of the first embodiment of the present invention. It is assumed here that wireless channels #1, #2, #3 are prepared.

First, when data arrives in a transmission buffer, it is searched by carrier sense if there is any idle wireless channel (S101, S102). Here, at a timing the data is generated t1, the wireless channel #3 is busy and the wireless channel #1 and the wireless channel #2 are retrieved as idle. Next, according to the number of the idle channels and the number of transmission-standby data frames, the data is reconstructed so that the packet time lengths in the respective wireless channels become equal, and the reconstructed packets are assigned to the wireless channels and (simultaneously) transmitted (S103).

In the examples shown in FIG. 2, which are cases where there is one data frame to be transmitted while there are two idle channels, a data frame 1 is divided (1a, 1b) so that two data packets are generated by the method shown in FIG. 49(1) and the data packets are assigned to the respective wireless channels to be simultaneously transmitted.

Next, it is confirmed for all the simultaneously transmitted packets whether or not respective ACK packets are received within a predetermined time after the transmission (S104), and a packet for which the ACK packet is not received within the predetermined time is subjected to retransmission processing (S105 to S108). In the retransmission processing, it is first searched by carrier sense if there is any idle wireless channel (S105). Next, the number of the idle channels and the number of retransmission packets are compared, and when both of the numbers are different (the number of the idle channels≠the number of the retransmission packets), in order to use all the idle channels for the retransmission, the retransmission packets are reconstructed so that the packet time lengths in the respective wireless channels become equal, and the reconstructed packets are assigned to the respective wireless channels to be (simultaneously) retransmitted (S107). On the other hand, when the number of the idle channels and the number of the retransmission packets are equal, no reconstruction is necessary, and therefore, the retransmission packets are assigned to the respective wireless channels to be (simultaneously) retransmitted (S108). Thereafter, the above-described retransmission processing is repeated until the ACK packets are received for all the packets.

FIG. 2(1) is a case where the ACK packet for the data packet 1a transmitted via the wireless channel #1 is received but the ACK packet for the data packet 1b transmitted via the wireless channel #2 is not received, and therefore, the data packet 1b is subjected to the retransmission processing. Here, the number of the idle channels is 3 at a retransmission processing start time t2 while the number of the retransmission packets is 1, and therefore, the data packet b is divided into three (1b-1, 1b-2, 1b-3), which are then assigned to the wireless channels #1, #2, #3 respectively and simultaneously retransmitted (FIG. 1, S107).

FIG. 2(2) is a case where the ACK packets are not received for the data packets 1a, 1b transmitted via the wireless channels #1, #2, and therefore, the data packets 1a, 1b are subjected to the retransmission processing. Here, the number of the idle channels is 3 at the retransmission processing start time t2 while the number of the retransmission packets is 2, and therefore, each of the data packets 1a, 1b is divided for reconstruction (1a-1, (1a-2, 1b-1), 1b-2), and the reconstructed data packets are assigned to the wireless channels #1, #2, #3 respectively and simultaneously retransmitted (FIG. 1, S107).

FIG. 2(3) is a case where the ACK packets are not received for the data packets 1a, 1b transmitted via the wireless channels #1, #2, and therefore, the data packets 1a, 1b are subjected to the retransmission processing. Here, the number of the idle channels is 2 at the retransmission processing start time t2 while the number of the retransmission packets is 2, and therefore, the data packets 1a, 1b are not reconstructed but assigned to the wireless channels #1, #2 respectively to be simultaneously retransmitted (FIG. 1, S108).

FIG. 2(4) is a case where the ACK packets are not received for the data packets 1a, 1b transmitted via the wireless channels #1, #2, and therefore, the data packets 1a, 1b are subjected to the retransmission processing. Here, the number of the idle channels is 1 at the retransmission processing start time t2 while the number of the retransmission packets is 2, and therefore, the data packets 1a, 1b are reconstructed (1a+1b) and the resultant packet is assigned to the wireless channel #1 to be retransmitted (FIG. 1, S107). Incidentally, in this example, the packets into which one data frame is divided as in FIG. 49(1) are returned to one as a result of the reconstruction. At this time, when the packet time length exceeds the maximum length, a control may be such that the packets are not reconstructed but transmitted in two separate transmissions via one wireless channel.

In the foregoing examples, when the number of the idle channels and the number of the retransmission packets are different, that is, regardless of whether the number of the idle channels is larger or smaller than the number of the retransmission packets, the retransmission packets are reconstructed according to the number of the idle channels. However, the reconstruction of the data packets necessitates a receive-side STA to also execute corresponding processing, resulting in complication, and therefore, the reconstruction may be executed only when the number of the idle channels is larger than the number of the retransmission packets (parenthesized notes for the determination branches at S106 in FIG. 1).

FIG. 3 is a case where the ACK packets are not received for the data packets 1a, 1b transmitted via the wireless channels #1, #2, and therefore, the data packets 1a, 1b are subjected to the retransmission processing. Here, while the number of the retransmission packets is 2, the number of the idle channels at the retransmission processing start time t2 is 1, which is smaller than the number of the data packets, so that the data packets 1a, 1b are not reconstructed but the data packet 1a is first assigned to the wireless channel #1 to be retransmitted (FIG. 1, S108). At a next retransmission processing start time t3, the number of idle channels is 2 while the number of the retransmission packets is 1, and therefore, the data packet 1b is divided into two (1b-1, 1b-2), which are then assigned to the wireless channels #1, #3 respectively to be simultaneously retransmitted (FIG. 1, S107).

[Second Embodiment]

Figure 4:
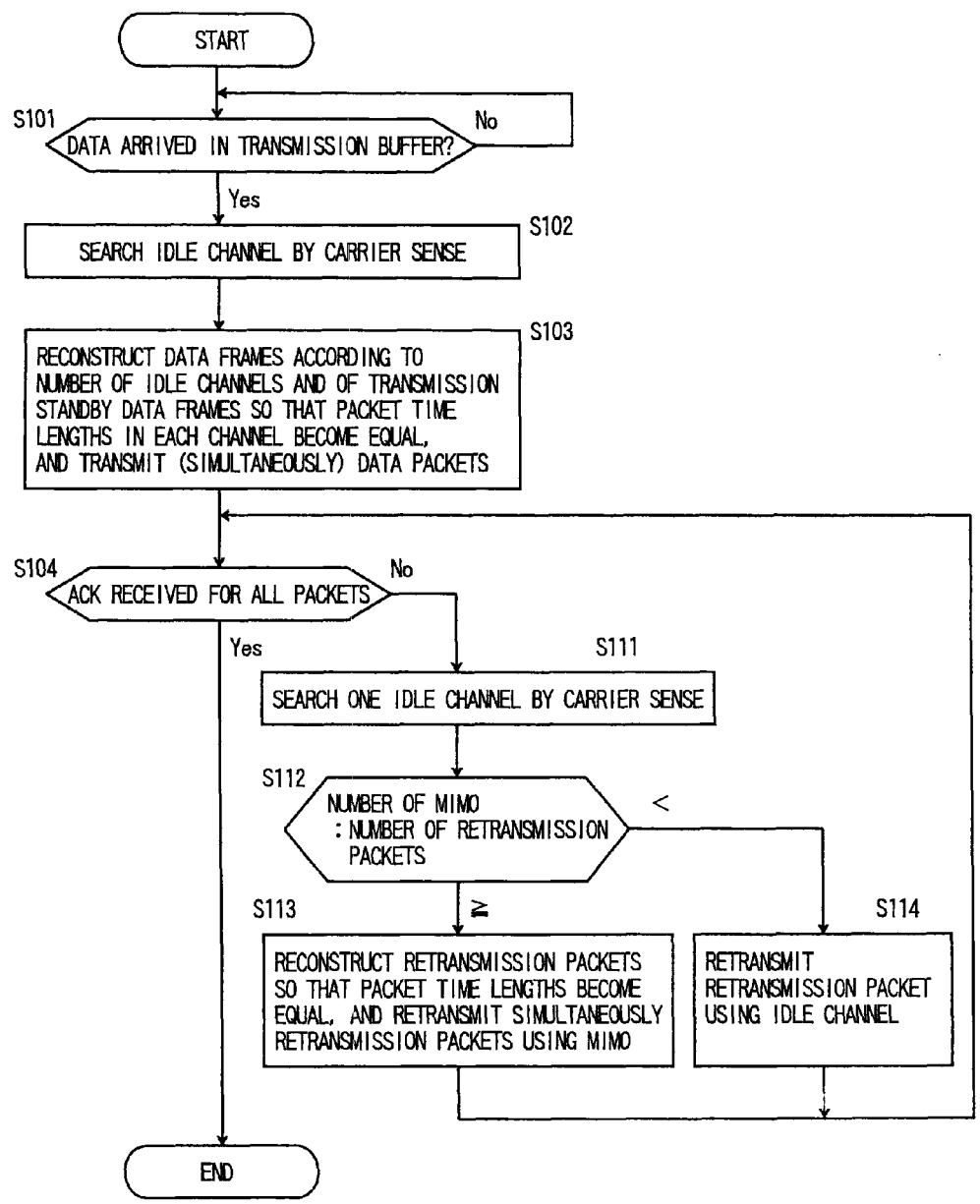
FIG. 4 is a flowchart showing a processing procedure of a second embodiment of the present invention.

FIG. 4 shows a flowchart of a second embodiment of the present invention. This embodiment is characterized in that, in the first embodiment, a MIMO system is utilized for the retransmission of data packets.

First, when data arrives in a transmission buffer, it is searched by carrier sense if there is any idle wireless channel (S101, S102). Next, according to the number of the idle channels and the number of transmission-standby data packets, the data packets are reconstructed so that the packet time lengths in the respective wireless channels become equal, and the reconstructed packets are assigned to the respective wireless channels to be (simultaneously) transmitted (S103).

Next, it is confirmed for all the simultaneously transmitted packets whether or not ACK packets are received within a predetermined time after the transmission (S104), and a packet for which the ACK packet is not received within the predetermined time is subjected to retransmission processing (S111 to S114). In the retransmission processing, it is first searched by carrier sense if there is any idle wireless channel (S111). Here, one idle wireless channel is selected. Next, the number of MIMOs in the selected wireless channel and the number of retransmission packets are compared (S112), and when the number of MIMOs is equal to or larger than the number of the retransmission packets, the retransmission packets are divided for reconstruction into packets with the same packet time length according to the number of MIMOs in order to retransmit the retransmission packets at a time by the MIMO, and the reconstructed packets are assigned to respective antennas of the MIMO to be simultaneously retransmitted (S113). On the other hand, when the number of MIMOs is smaller than the number of the retransmission packets, the retransmission packets are not reconstructed but assigned to the one wireless channel to be retransmitted (S114). Thereafter, the above-described retransmission processing is repeated until the ACK packets are received for all the packets.

[Third Embodiment]

Figure 5:
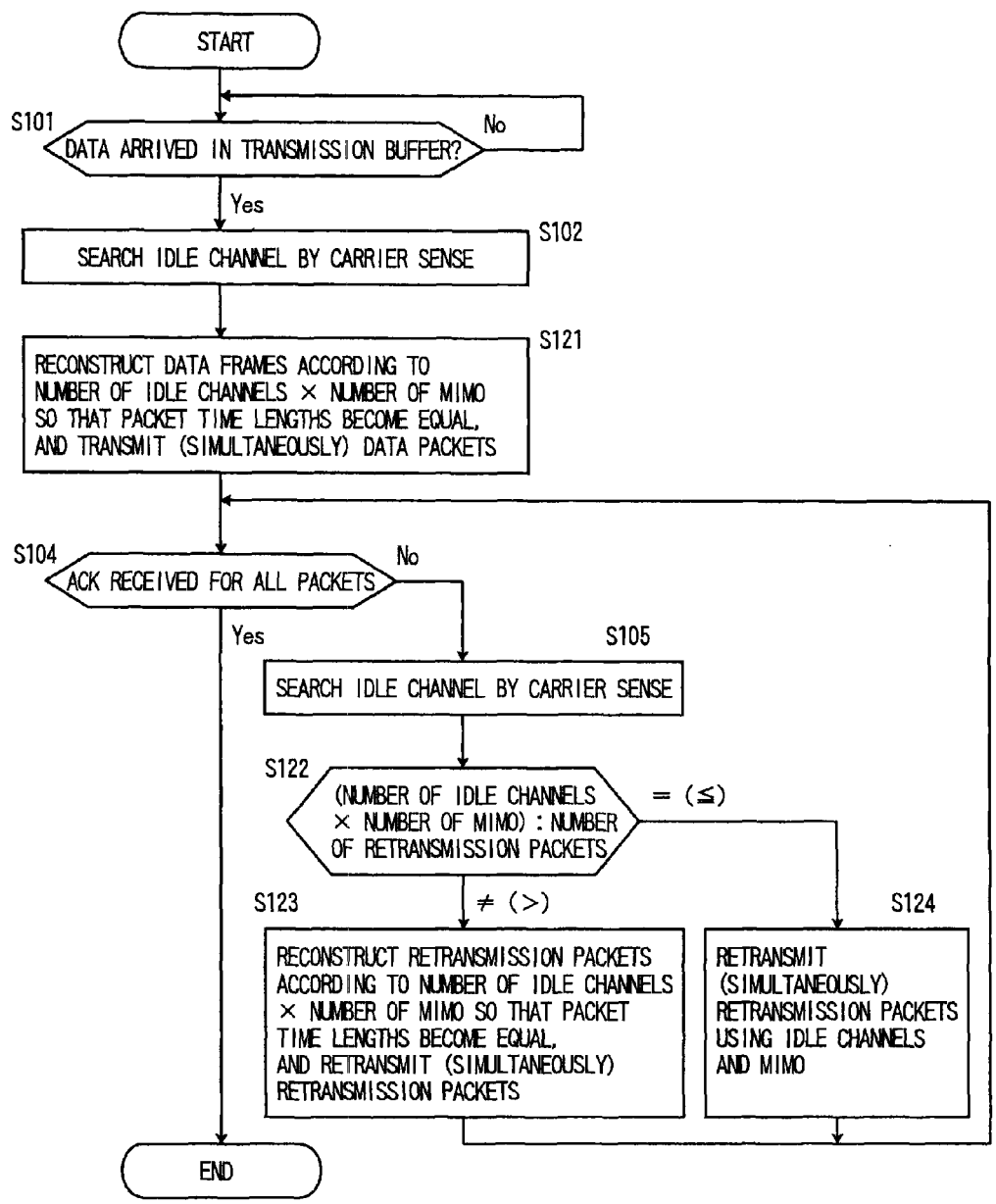
FIG. 5 is a flowchart showing a processing procedure of a third embodiment of the present invention.

FIG. 5 shows a flowchart of a third embodiment of the present invention. This embodiment is characterized in that, in the first embodiment, a MIMO system is used for both the simultaneous transmission and retransmission of data packets. Note that owing to the use of both of idle wireless channels and MIMO, the number of simultaneously transmittable data packets amounts to the sum of the numbers of MIMOs of the respective idle wireless channels. Note that, in the embodiment below, the description will be given on assumption that the numbers of MIMOs of the respective wireless channels are the same, so that the number of simultaneous transmissions equals the number of the idle channels×the number of MIMOs.

When data arrives in a transmission buffer, it is first searched by carrier sense if there is any idle wireless channel (S101, S102). Next, according to the number of the idle channels×the number of MIMOs, the data is reconstructed into packets with the same packet time length, and the reconstructed packets are assigned to the respective wireless channels and antennas of the MIMO to be (simultaneously) transmitted (S121).

Next, it is confirmed for all the simultaneously transmitted packets whether or not ACK packets are received within a predetermined time after the transmission (S104), and a packet for which the ACK packet is not received within the predetermined time is subjected to retransmission processing (S105, S122 to S124). In the retransmission processing, it is first searched by carrier sense if there is any idle wireless channel (S105). Next, the number of the idle channels×the number of MIMOs is compared with the number of retransmission packets (S122), and when both of the numbers are different from each other (the number of the idle channels× the number of MIMOs≠the number of the retransmission packets), for the purpose of using all the MIMO and idle channels for retransmission, the packets are reconstructed to those with the same packet time length and the reconstructed packets are assigned to the respective wireless channels and the respective antennas of the MIMO to be (simultaneously) retransmitted (S123). On the other hand, when the number of the idle channels×the number of MIMOs is equal to the number of the retransmission packets, the retransmission packets are not reconstructed but assigned to the respective wireless channels and the respective antennas of the MIMO to be (simultaneously) retransmitted (S124). Thereafter, the above-described retransmission processing is repeated until the ACK packets are received for all the packets.

Also in this embodiment, the reconstruction of the data packets necessitates a receive-side STA to execute corresponding processing, resulting in complication, and therefore, the reconstruction may be executed only when the number of the idle channels×the number of MIMOs is larger than the number of the retransmission packets (parenthesized notes for the determination branches at S122 in FIG. 5).

[Fourth Embodiment]

Figure 6:
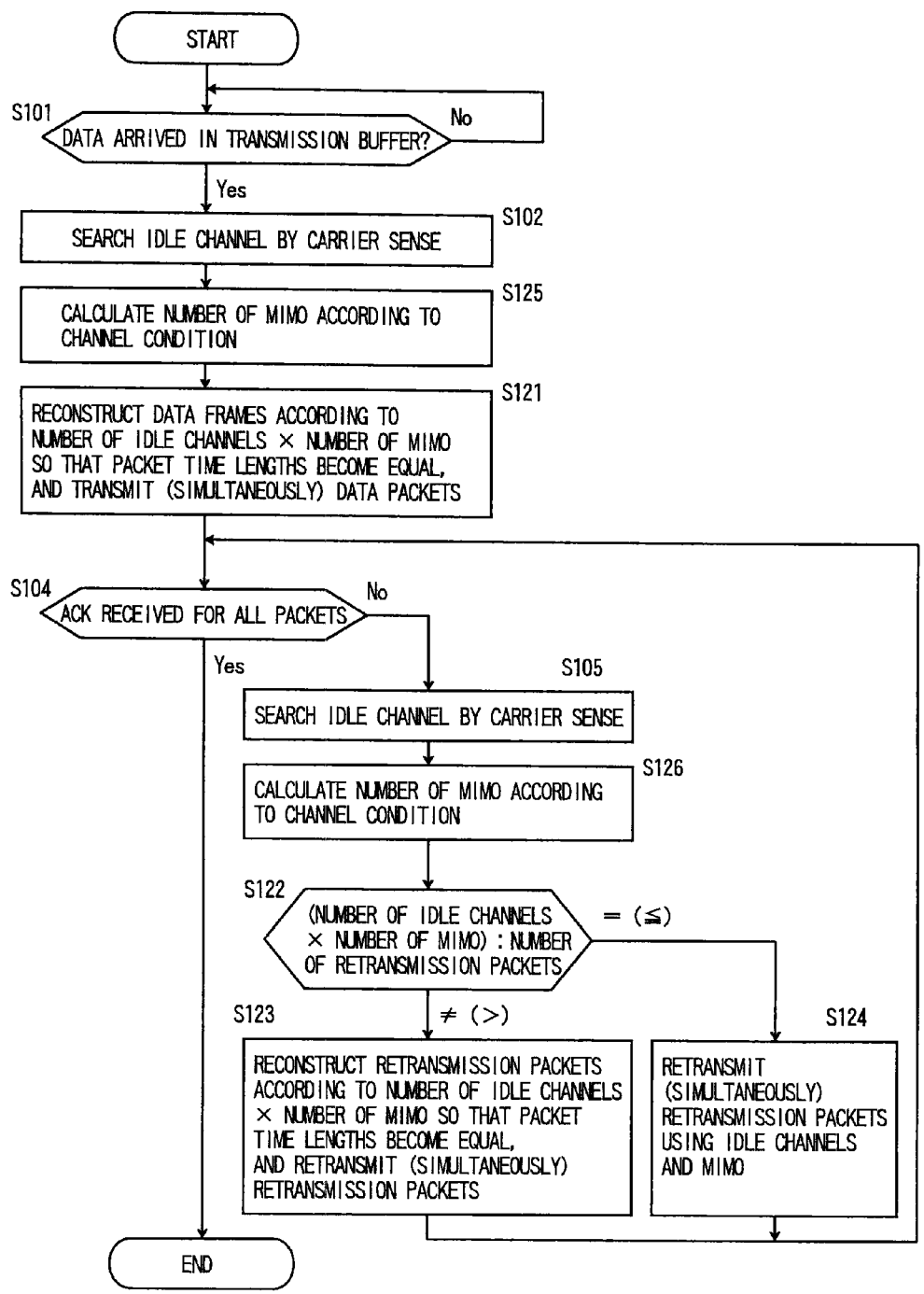
FIG. 6 is a flowchart showing a processing procedure of a fourth embodiment of the present invention.

FIG. 6 shows a flowchart of a fourth embodiment of the present invention. This embodiment is characterized in that as for the number of MIMOs used at S121, S122 to S124 of the third embodiment, antenna correlation is found based on a propagation coefficient, and the number of MIMOs multiplexable in one channel is calculated according to a predetermined threshold value (S125, S126). The other is the same as that of the third embodiment. This is similarly applicable to the number of MIMOs used at S112 of the second embodiment.

[Fifth Embodiment]

Figure 7:
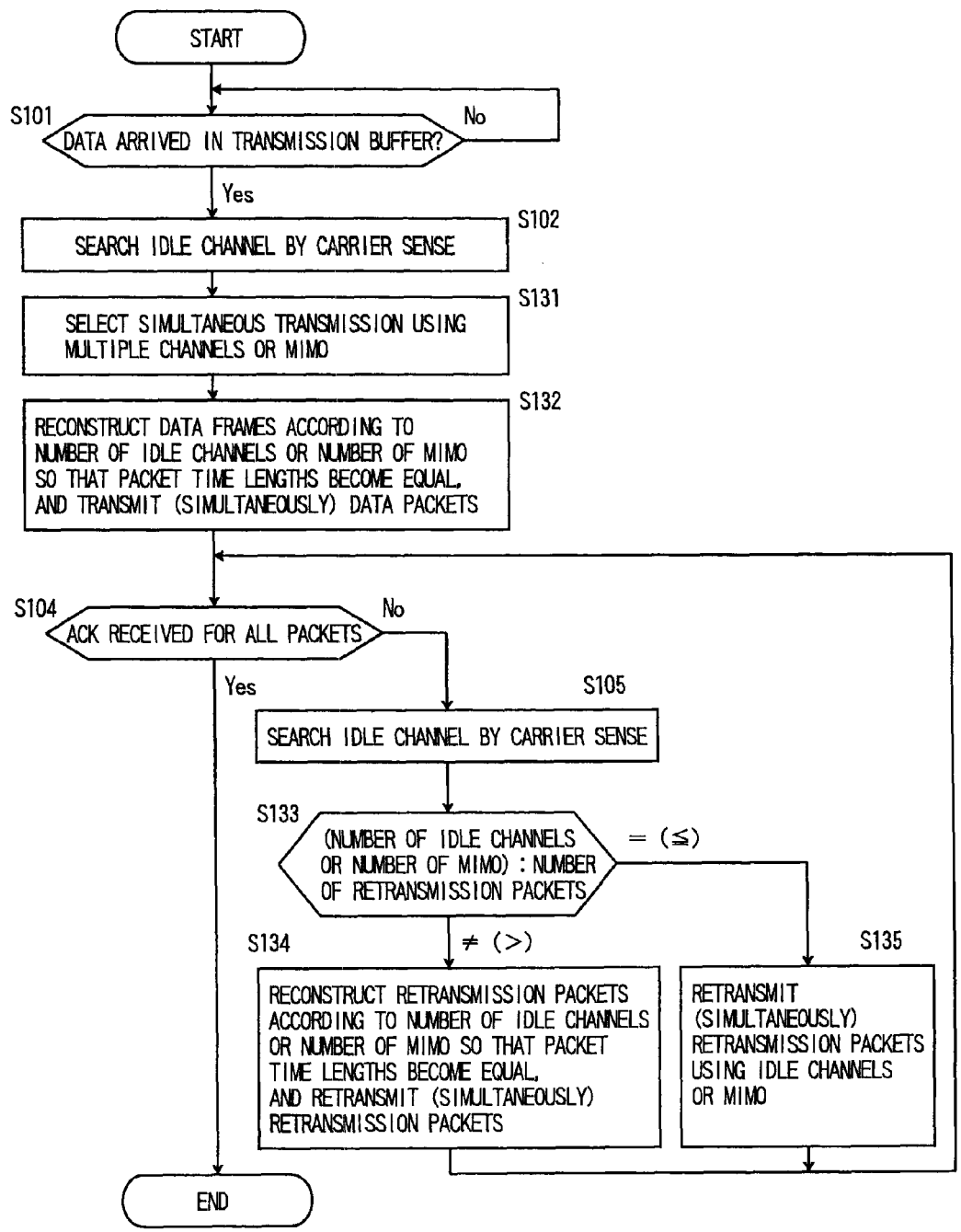
FIG. 7 is a flowchart showing a processing procedure of a fifth embodiment of the present invention.

FIG. 7 shows a flowchart of a fifth embodiment of the present invention. This embodiment is characterized in that simultaneous transmission using multiple wireless channels or simultaneous transmission using MIMO is selected based on the number of data arriving in a transmission buffer or the number of MIMOs that depends on a channel condition (S131). In response to this selection, packets are reconstructed to those with the same packet time length according to the number of idle channels (or the number of MIMOs), and the reconstructed packets are assigned to the respective wireless channels (or respective antennas of the MIMO) to be (simultaneously) transmitted (S132).

Next, it is confirmed for all the simultaneously transmitted packets whether or not ACK packets are received within a predetermined time from the transmission (S104), and a packet for which the ACK packet is not received within the predetermined time is subjected to retransmission processing (S105, S133 to S135). In the retransmission processing, it is first searched by carrier sense if there is any idle wireless channel (S105). Next, the number of the idle channels (or the number of MIMOs) and the number of retransmission packets are compared (S133), and when both of the numbers are different (the number of the idle channels≠the number of the retransmission packets (or the number of MIMOs≠the number of the retransmission packets)), the packets are reconstructed into those with the same packet time length in order to use all the idle channels (or respective antennas of the MIMO) for the retransmission, and the reconstructed packets are assigned to the respective wireless channels (or the respective antennas of the MIMO) to be (simultaneously) retransmitted (S134).

On the other hand, when the number of the idle channels (or the number of MIMOs) and the number of the retransmission packets are equal, the retransmission packets are not reconstructed but assigned to the respective wireless channels (or the respective antennas of the MIMO) to be (simultaneously) retransmitted (S135). Thereafter, the above-described retransmission processing is repeated until the ACK packets are received for all the packets.

[Sixth Embodiment]

Figure 8:
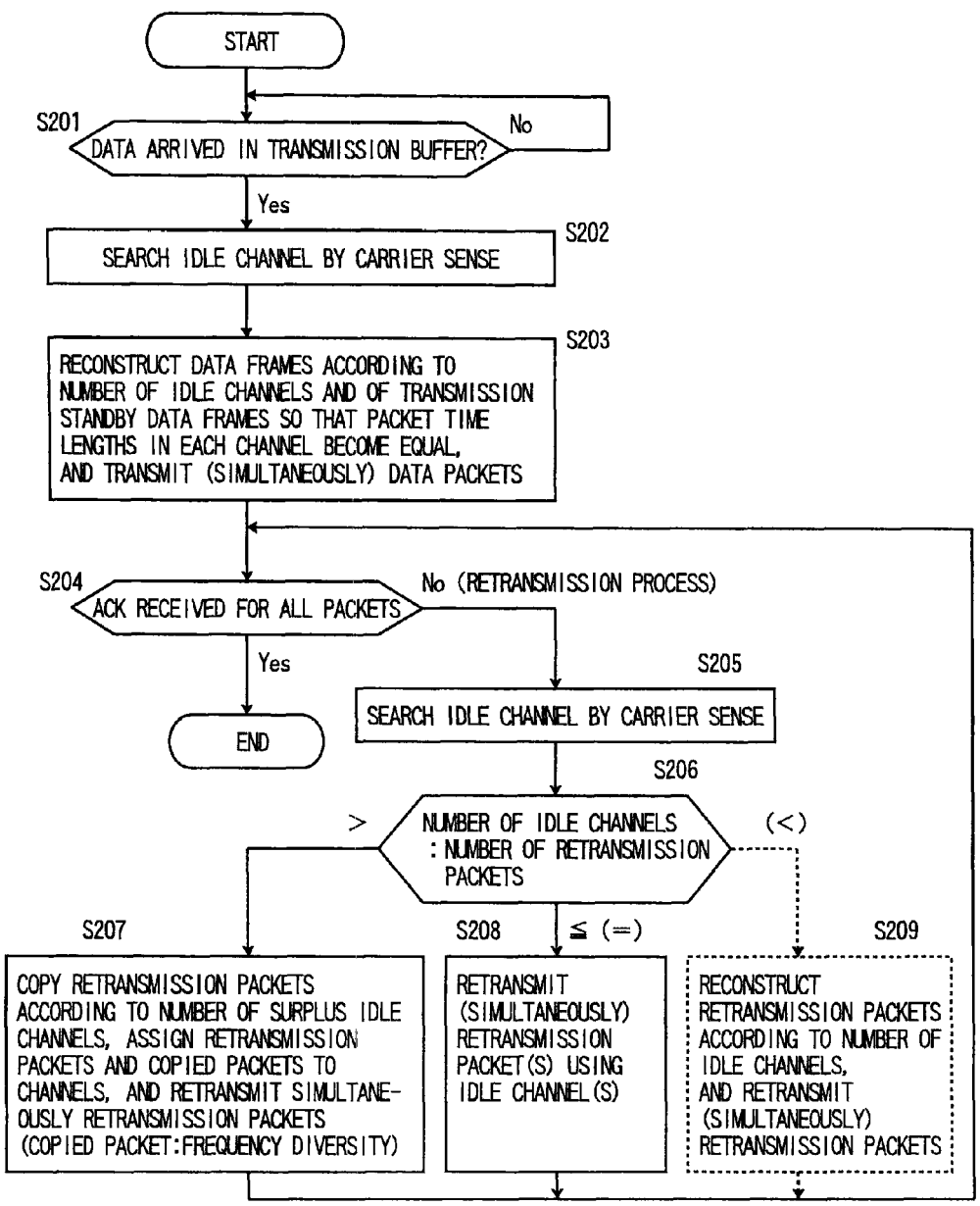
FIG. 8 is a flowchart showing a processing procedure of a sixth embodiment of the present invention.
Figure 9:
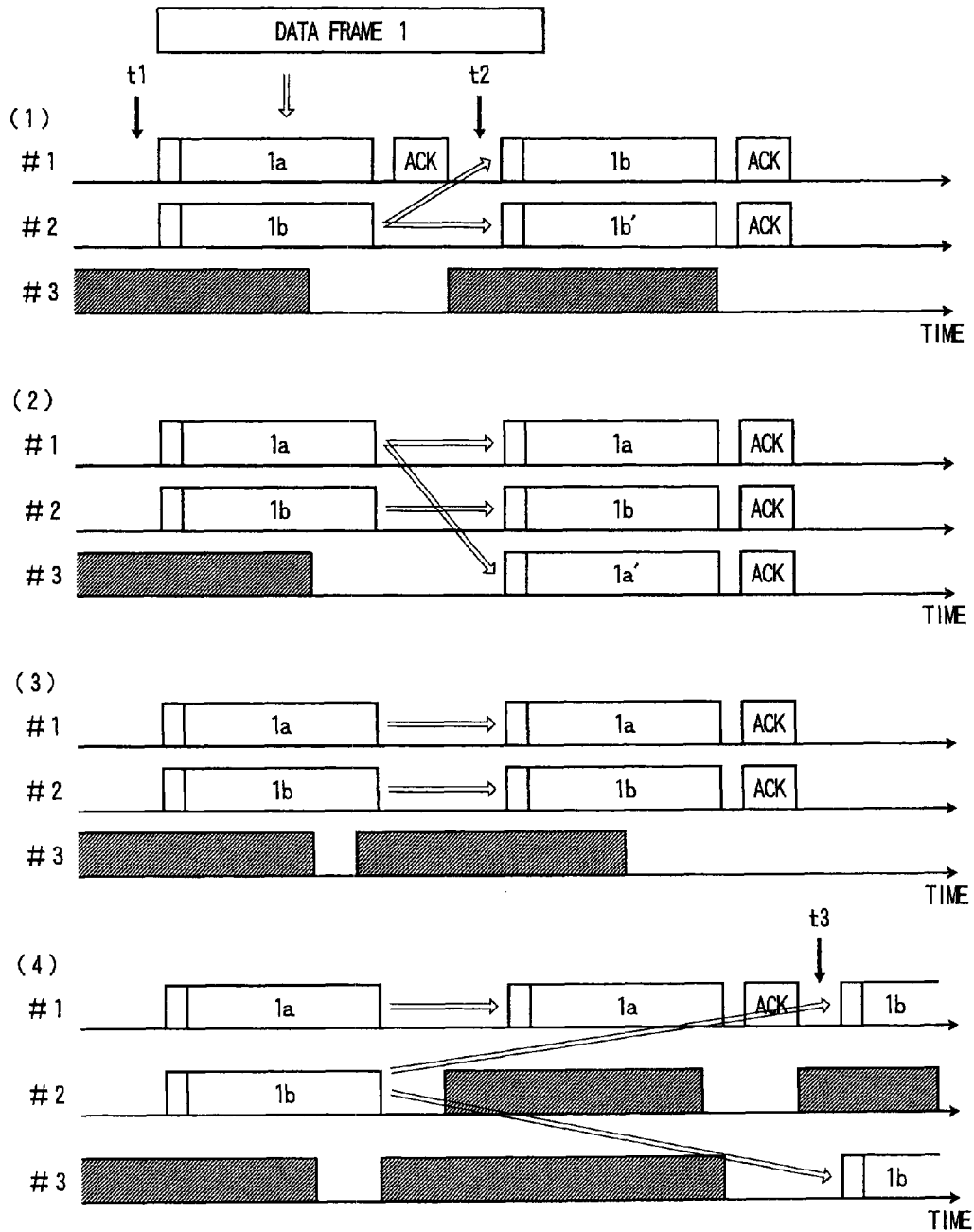
FIG. 9 are time charts showing operation examples of the sixth embodiment of the present invention.

FIG. 8 shows a flowchart of a sixth embodiment of the present invention. FIG. 9 show operation examples of the sixth embodiment of the present invention. It is assumed here that wireless channels #1, #2, #3 are prepared.

When data arrives in a transmission buffer, it is first searched by carrier sense if there is any idle wireless channel (S201, S202). Here, at a transmission data occurrence timing t1, the wireless channel #3 is busy and the wireless channels #1 and the wireless channel #2 are retrieved as idle. Next, according to the number of the idle channels and the number of transmission-standby data packets, the data packets are reconstructed so that packet time lengths in the respective wireless channels become equal, and the reconstructed packets are assigned to the respective wireless channels to be (simultaneously) transmitted (S203).

In the examples shown in FIG. 9, which are cases where there is one data frame to be transmitted while there are two idle channels, a data frame 1 is divided (1a, 1b) by the method shown in FIG. 49(1) so that two data packets are generated, and the data packets are assigned to the respective wireless channels to be simultaneously transmitted.

Next, it is confirmed for all the simultaneously transmitted packets whether or not ACK packets are received within a predetermined time after the transmission (S204), and a packet for which the ACK packet is not received within the predetermined time is subjected to retransmission processing (S205 to S209). In the retransmission processing, it is first searched by carrier sense if there is any idle wireless channel (S205). Next, the number of the idle channels and the number of retransmission packets are compared, and when the number of the idle channels is larger than the number of the retransmission packets, the retransmission packets are copied according to the number of surplus idle channels over the number of the retransmission packets, and the retransmission packets and a copy packet are assigned to the wireless channels to be simultaneously retransmitted (S207). Incidentally, as the copy packet, a new packet that is generated by copying a payload portion of the retransmission packet may be used. As for the retransmission packet whose copy packet is transmitted, a frequency diversity effect can be obtained. On the other hand, when the number of the idle channels is equal to or smaller than the number of the retransmission packets, the retransmission packets are assigned to the respective wireless channels to be (simultaneously) retransmitted (S208). Thereafter, the above-described retransmission processing is repeated until the ACK packets are received for all the packets.

FIG. 9(1) is a case where the ACK packet for the data packet 1b transmitted via the wireless channel #2 is not received though the ACK packet for the data packet 1a transmitted via the wireless channel #1 is received, and therefore, the data packet 1b is subjected to the retransmission processing. Here, since the number of the idle channels is 2 at a retransmission processing start time t2 while the number of the retransmission packets is 1, the data packet 1b is copied (1b, 1b'), and they are assigned to the wireless channels #1, #2 respectively to be simultaneously retransmitted (FIG. 8, S207).

FIG. 9(2) is a case where the ACK packets are not received for the data packets 1a, 1b transmitted via the wireless channels #1, #2, and therefore, the data packets 1a, 1b are subjected to the retransmission processing. Here, the number of the idle channels at the retransmission processing start time t2 is 3 while the number of the retransmission packets is 2, and therefore, for example, the data packet 1a out of the data packets 1a, 1b is copied (1a, 1b, 1a') and they are assigned to the wireless channels #1, #2, #3 respectively to be simultaneously retransmitted (FIG. 8, S207).

FIG. 9(3) is a case where the ACK packets are not received for the data packets 1a, 1b transmitted via the wireless channels #1, #2, and therefore, the data packets 1a, 1b are subjected to the retransmission processing. Here, the number of the idle channels is 2 at the retransmission processing start time t2 while the number of the retransmission packets is 2, and therefore, the data packets 1a, 1b are assigned to the respective wireless channels #1, #2 to be simultaneously retransmitted (FIG. 8, S208).

FIG. 9(4) is a case where the ACK packets are not received for the data packets 1a, 1b transmitted via the wireless channels #1, #2, and therefore, the data packets 1a, 1b are subjected to the retransmission processing. Here, while the number of the retransmission packets is 2, the number of the idle channels at the retransmission processing start time t2 is 1, which is smaller than the number of the data packets, and therefore, the data packet 1a is first assigned to the wireless channel #1 to be retransmitted (FIG. 8, S208). At a next retransmission processing start time t3, the number of the idle channels is 2 while the number of the retransmission packets is 1, and therefore, the data packet 1b is copied (1b, 1b'), and they are assigned to the wireless channels #1, #2 respectively to be simultaneously retransmitted (FIG. 8, S207).

Incidentally, when the number of the idle channels becomes smaller than the number of the retransmission packets at the time of the retransmission processing, the retransmission packets may be reconstructed according to the number of the idle channels (parenthesized notes in the determination branches at S206 in FIG. 8, S209).

[Seventh Embodiment]

Figure 10:
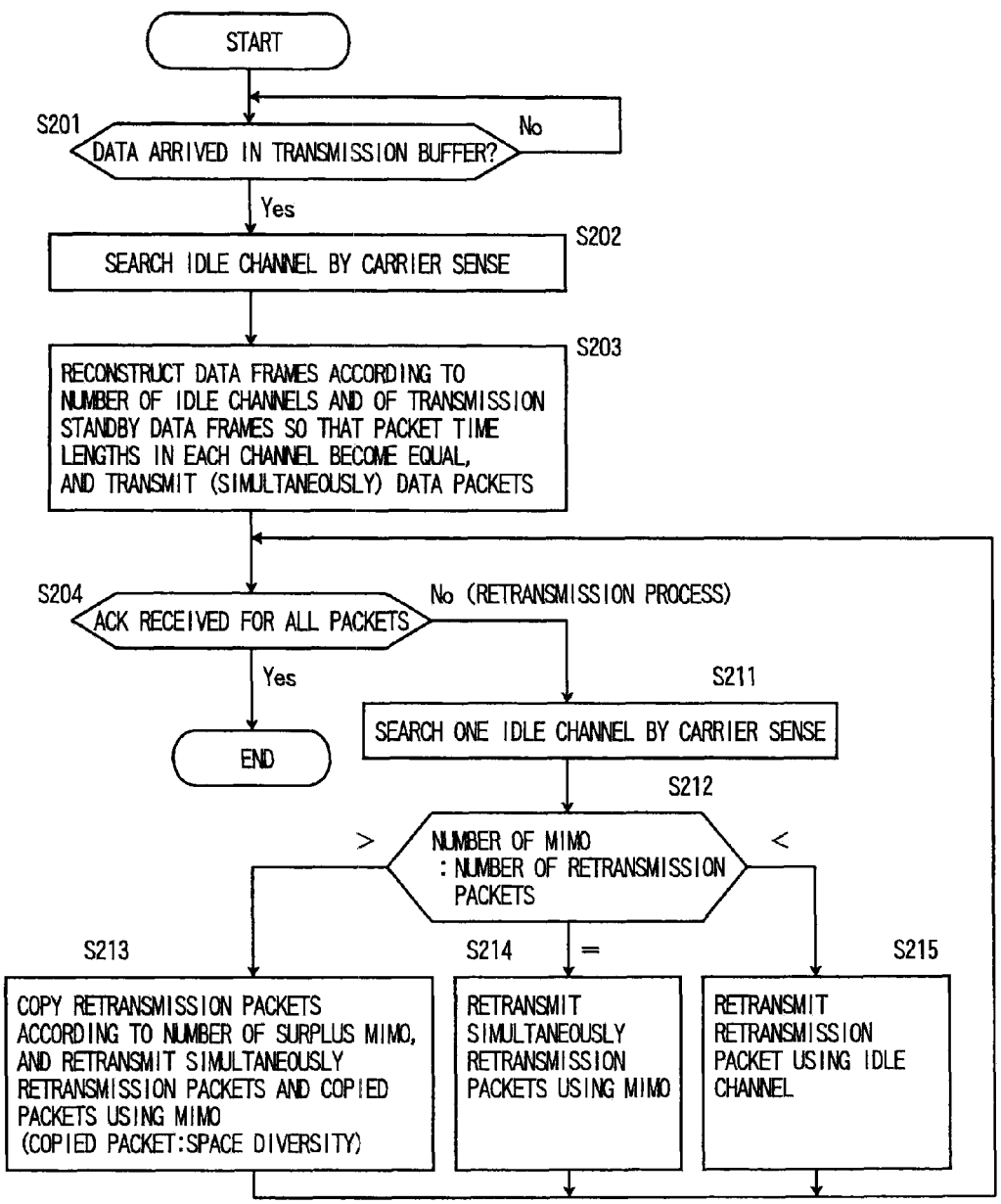
FIG. 10 is a flowchart showing a processing procedure of a seventh embodiment of the present invention.

FIG. 10 shows a flowchart of a seventh embodiment of the present invention. This embodiment is characterized in that, in the sixth embodiment, a MIMO system is utilized for the retransmission of data packets.

When data arrives in a transmission buffer, it is first searched by carrier sense if there is any idle wireless channel (S201, S202). Next, according to the number of the idle channels and the number of transmission-standby data packets, the data is reconstructed so that packet time lengths in the respective wireless channels become equal, and the reconstructed packets are assigned to the respective wireless channels to be (simultaneously) transmitted (S203).

Next, it is confirmed for all the simultaneously transmitted packets whether or not ACK packets are received within a predetermined time after the transmission (S204), and a packet for which the ACK packet is not received within the predetermined time is subjected to retransmission processing (S211 to S215). In the retransmission processing, it is first searched by carrier sense if there is any idle wireless channel (S211). Here, one idle wireless channel is selected. Next, the number of MIMOs in the selected wireless channel and the number of retransmission packets are compared (S212), and when the number of MIMOs is larger than the number of the retransmission packets, the retransmission packet is copied according to the number of surplus MIMOs over the number of the retransmission packets, and the retransmission packets and a copy packet are assigned to respective antennas of the MIMO to be simultaneously retransmitted (S213). Note that as the copy packet, a new packet that is generated by copying a payload portion of the retransmission packet is used. As for the retransmission packet whose copy packet is transmitted, a space diversity effect can be obtained.

When the number of MIMOs is equal to the number of the retransmission packets (provided that the number of the retransmission packets is equal to or larger than 2), the retransmission packets are assigned to the respective antennas of the MIMO to be simultaneously retransmitted (S214). On the other hand, when the number of MIMOs is smaller than the number of the retransmission packets (including a case where the number of the retransmission packets is 1), the MIMO is not used but the idle channel is used to retransmit the retransmission packets in sequence (S215). Thereafter, the above-described retransmission processing is repeated until the ACK packets are received for all the packets. Incidentally, when the number of MIMOs is smaller than the number of the retransmission packets, the retransmission packets may be reconstructed according to the number of MIMOs to be simultaneously retransmitted.

[Eighth Embodiment]

Figure 11:
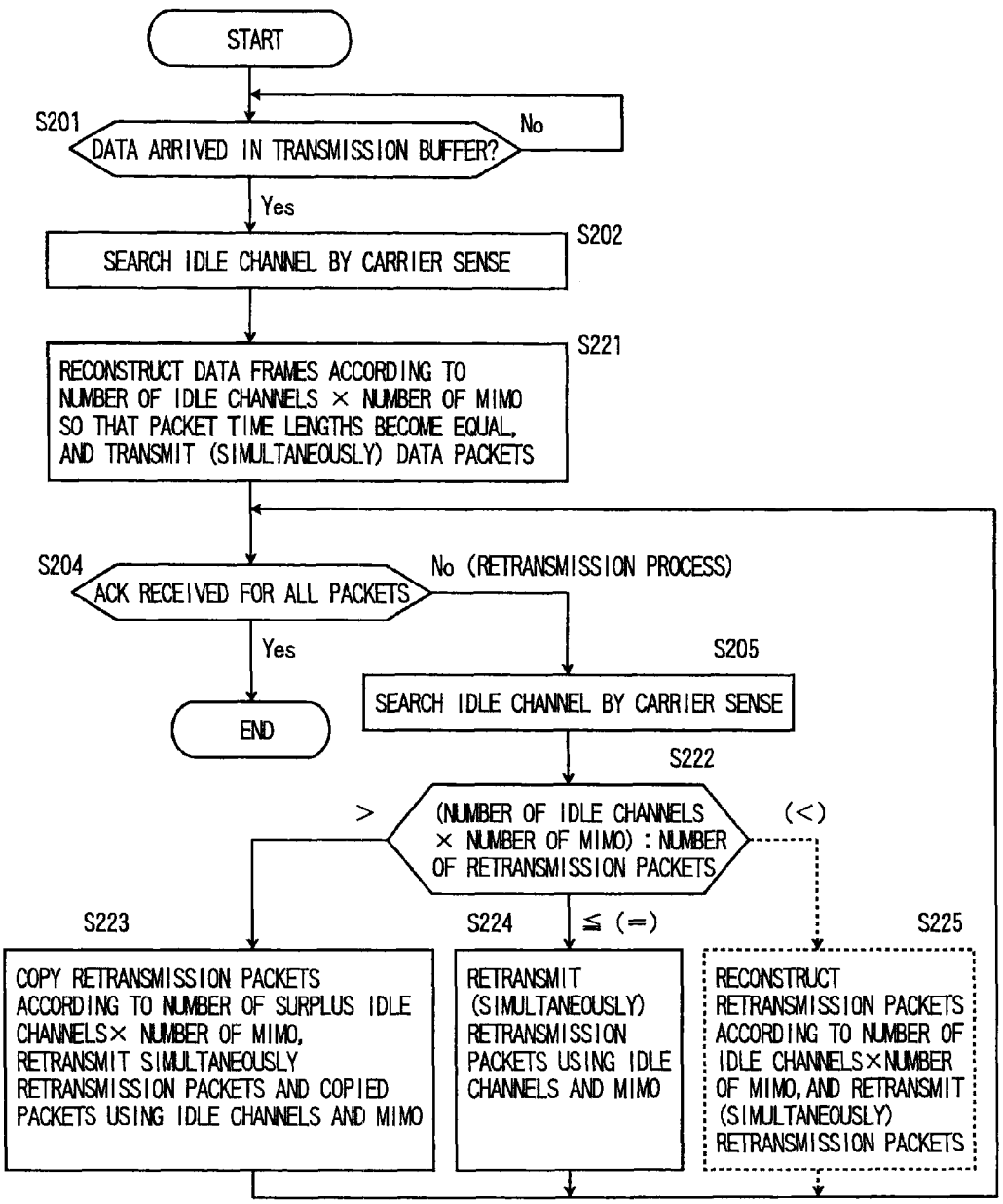
FIG. 11 is a flowchart showing a processing procedure of an eighth embodiment of the present invention.

FIG. 11 shows a flowchart of an eighth embodiment of the present invention. This embodiment is characterized in that, in the sixth embodiment, a MIMO system is used for both the simultaneous transmission and retransmission of data packets.

When data arrives in a transmission buffer, it is first searched by carrier sense if there is any idle wireless channel (S201, S202). Next, the data is reconstructed to packets with the same length according to the number of the idle channels× the number of MIMOs, and the packets are (simultaneously) transmitted by using the respective wireless channels and the MIMO (S221).

Next, it is confirmed for all the simultaneously transmitted packets whether or not ACK packets are received within a predetermined time after the transmission (S204), and a packet for which the ACK packet is not received within the predetermined time is subjected to retransmission processing (S205, S222 to S225). In the retransmission processing, it is first searched by carrier sense if there is any idle wireless channel (S205). Next, the number of the idle channels×the number of MIMOs is compared with the number of retransmission packets (S222), and when the number of the idle channels×the number of MIMOs is larger than the number of the retransmission packets, the retransmission packets are copied according to a surplus number in the number of the idle channels×the number of MIMOs over the number of the retransmission packets, and the retransmission packets and a copy packet are assigned to the wireless channels and respective antennas of the MIMO to be simultaneously retransmitted (S223). When the copy packet is assigned to the wireless channel, a frequency diversity effect can be obtained, and when the MIMO is used, a space diversity effect can be obtained.

On the other hand, when the number of the idle channels× the number of MIMOs is equal to or smaller than the number of the retransmission packets, the respective wireless channels and the MIMO are used to (simultaneously) retransmit the retransmission packets (S224). Thereafter, the above-described retransmission processing is repeated until the ACK packets are received for all the packets.

Also in this embodiment, when the number of the idle channels×the number of MIMOs is smaller than the number of the retransmission packets, the retransmission packets may be reconstructed according to the number of the idle channels×the number of MIMOs (parenthesized notes in the determination branches at S222 in FIG. 11, S225).

[Ninth Embodiment]

Figure 12:
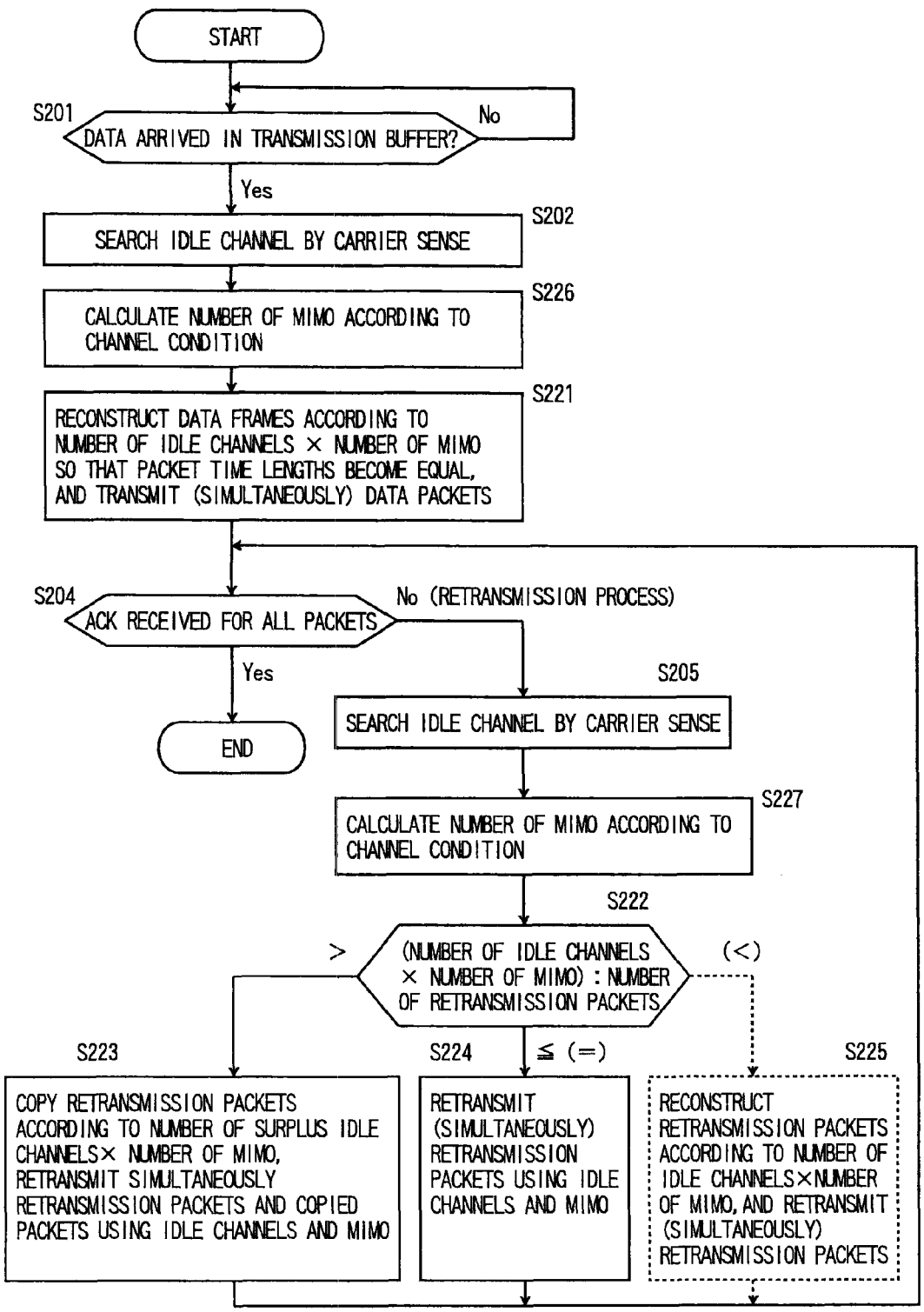
FIG. 12 is a flowchart showing a processing procedure of a ninth embodiment of the present invention.

FIG. 12 shows a flowchart of a ninth embodiment of the present invention. This embodiment is characterized in that as for the number of MIMOs used at S221, S222 to S225 in the eighth embodiment, antenna correlation is found according to a propagation coefficient, and the number of MIMOs multiplexable in one channel is calculated based on a predetermined threshold value (S226, S227). The other is the same as that of the eighth embodiment. This is similarly applicable to the number of MIMOs used at S212 of the seventh embodiment.

[Tenth Embodiment]

Figure 13:
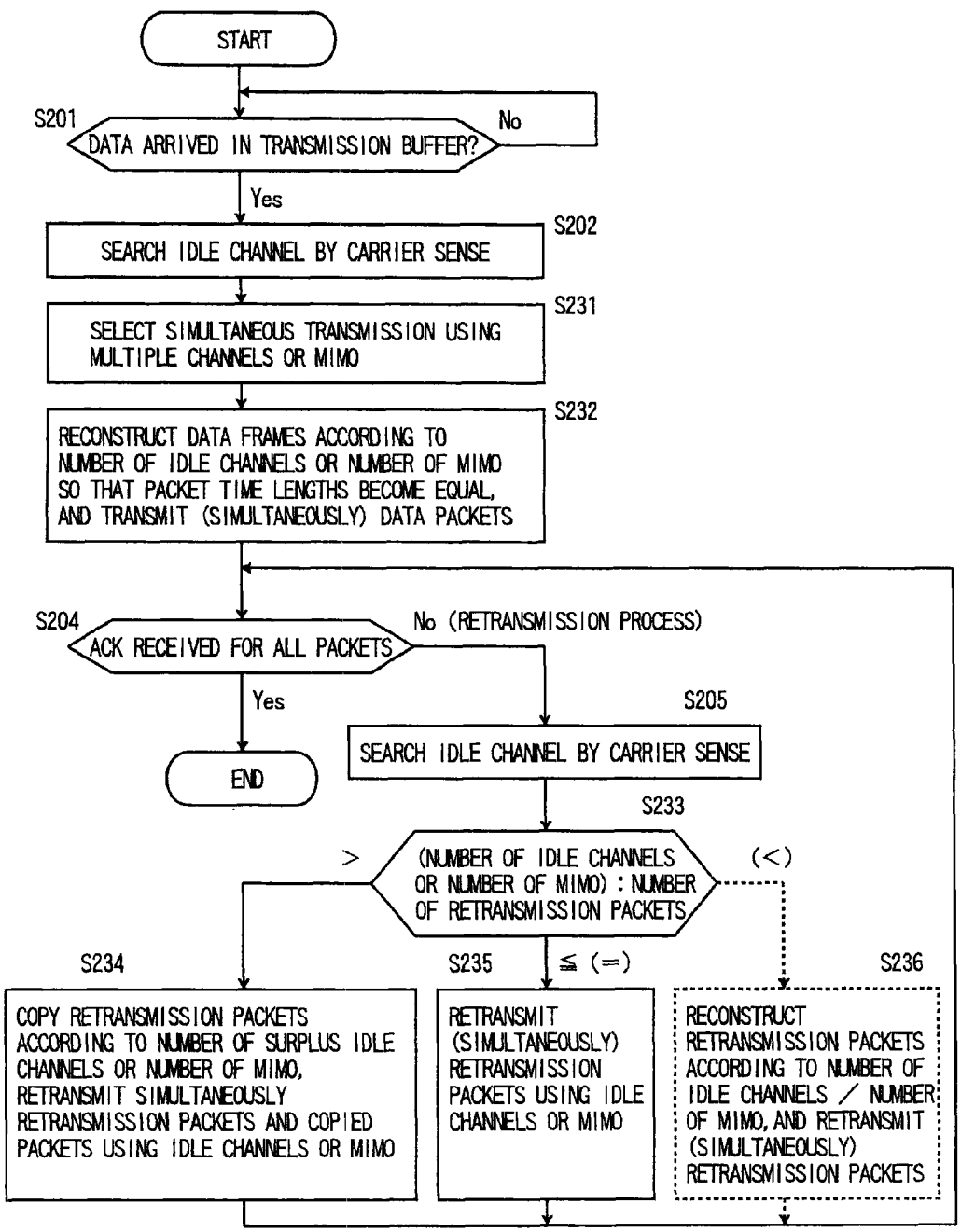
FIG. 13 is a flowchart showing a processing procedure of a tenth embodiment of the present invention.

FIG. 13 shows a flowchart of a tenth embodiment of the present invention. This embodiment is characterized in that simultaneous transmission using multiple wireless channels or simultaneous transmission using a MIMO system is selected according to the number of data arriving in a transmission buffer or the number of MIMOs that depends on a channel condition (S231). In response to this selection, the data is reconstructed to packets with the same length according to the number of the idle channels (or the number of MIMOs), and the reconstructed packets are assigned to the respective wireless channels (or respective antennas of the MIMO) to be (simultaneously) transmitted (S232).

Next, it is confirmed for all the simultaneously transmitted packets whether or not ACK packets are received within a predetermined time after the transmission (S204), and a packet for which the ACK packet is not received within the predetermined time is subjected to retransmission processing (S205, S233 to S235). In the retransmission processing, it is first searched by carrier sense if there is any idle wireless channel (S205). Next, the number of the idle channels (or the number of MIMOs) and the number of retransmission packets are compared (S233), and when the number of the idle channels (or the number of MIMOs) is larger than the number of the retransmission packets, the retransmission packets are copied according to the number of surplus idle channels (or the number of surplus MIMOs) over the number of the retransmission packets, and the retransmission packets and a copy packet are assigned to the respective wireless channels (or the respective antennas of the MIMO) to be (simultaneously) retransmitted (S234).

On the other hand, when the number of the idle channels (or the number of MIMOs) is equal to or smaller than the number of the retransmission packets, the retransmission packets are not copied but assigned to the respective wireless channels (or the respective antennas of the MIMO) to be (simultaneously) retransmitted (S235). Thereafter, the above-described retransmission processing is repeated until the ACK packets are received for all the packets.

Also in this embodiment, when the number of the idle channels (or the number of MIMOs) is smaller than the number of the retransmission packets, the retransmission packets may be reconstructed according to the number of the idle channels (or the number of MIMOs) (parenthesized notes in the determination branches at S233 in FIG. 13, S236).

[Processing for Receiving Retransmission Packets and Copy Packet]

When the retransmission packets and the copy packet are assigned to different wireless channels at the time of the simultaneous transmission of the retransmission packets and the copy packet, a frequency diversity effect can be obtained. When the retransmission packets and the copy packet are assigned to the respective antennas of the MIMO, a space diversity effect can be obtained. Meanwhile, when the retransmission packets and the copied packet are diversity-received, selection diversity shown in FIG. 14(1) or diversity combining shown in FIG. 14(2) can be used.

First, as a common receiving operation, reception and demodulation are executed in unit of each wireless channel in a case of frequency diversity using multiple wireless channels, while in a case of space diversity in which packets are assigned to respective antennas of MIMO, reception and demodulation are executed in unit of each antenna. In the selection diversity, it is confirmed whether or not the packets subjected to reception processing include packets with the same sequence number, and one of the packets with the same sequence number is selected and the other is discarded. Then, an arrival ACK packet Ack corresponding to the sequence number of the selected packet is transmitted. On the other hand, in the diversity combining, signal correlation of packets subjected to the reception processing is found and packets (the retransmission packet and the copied packet) having a value exceeding a predetermined threshold value are combined to be subjected to combining processing. Then, an arrival ACK packet Ack corresponding to a sequence number of the combined packet is transmitted.

Incidentally, the arrival ACK packet is transmitted via the wireless channel or the antenna used both for the retransmission packet and the copied packet, or is transmitted via the wireless channel or the antenna used for one of the packets. A transmit-side STA of the retransmission packet confirms the sequence number of the transmitted packet to recognize the arrival of the corresponding retransmission packet, and then finishes the retransmission processing.

[Eleventh Embodiment]

Figure 15:
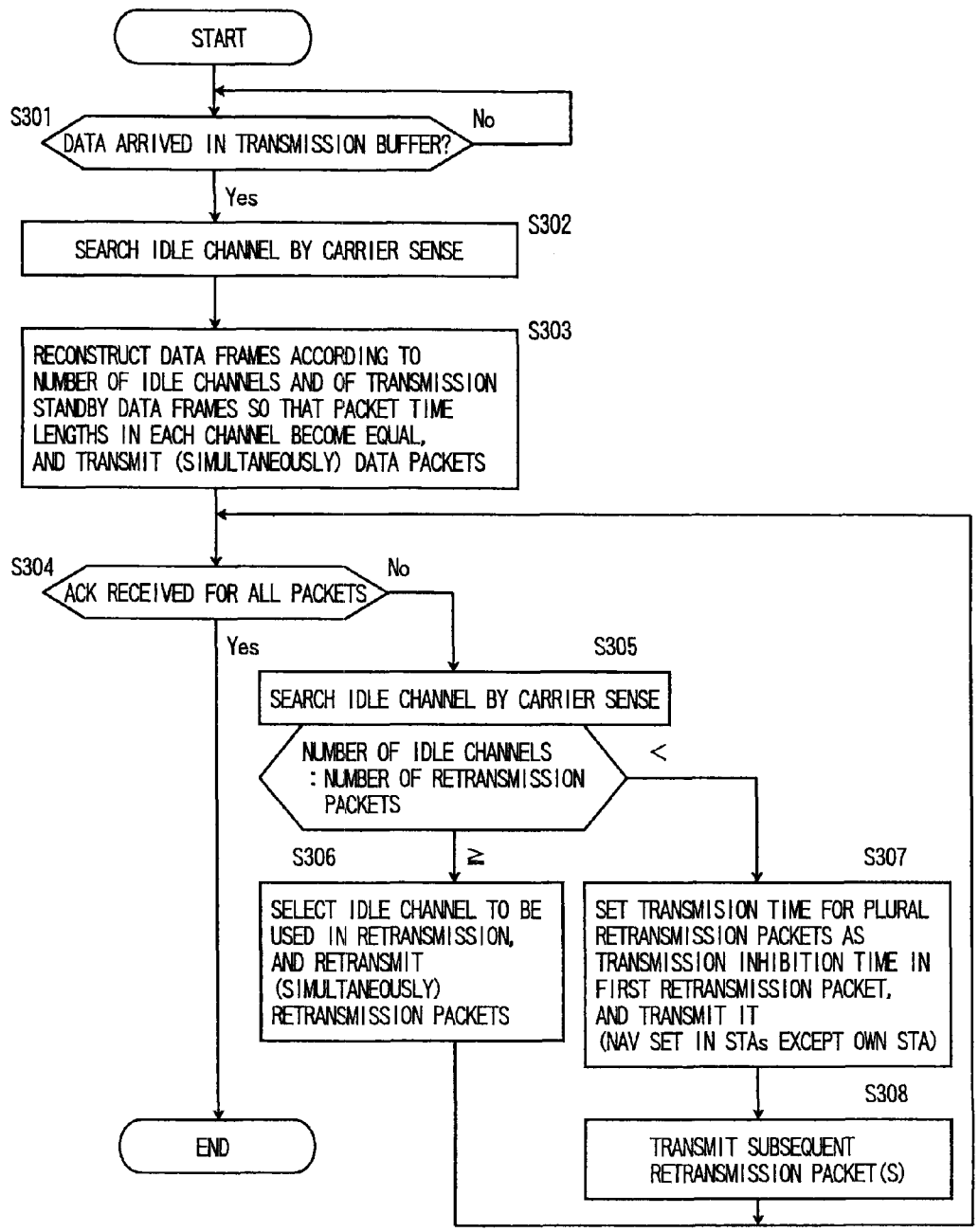
FIG. 15 is a flowchart showing a processing procedure of an eleventh embodiment of the present invention.
Figure 16:
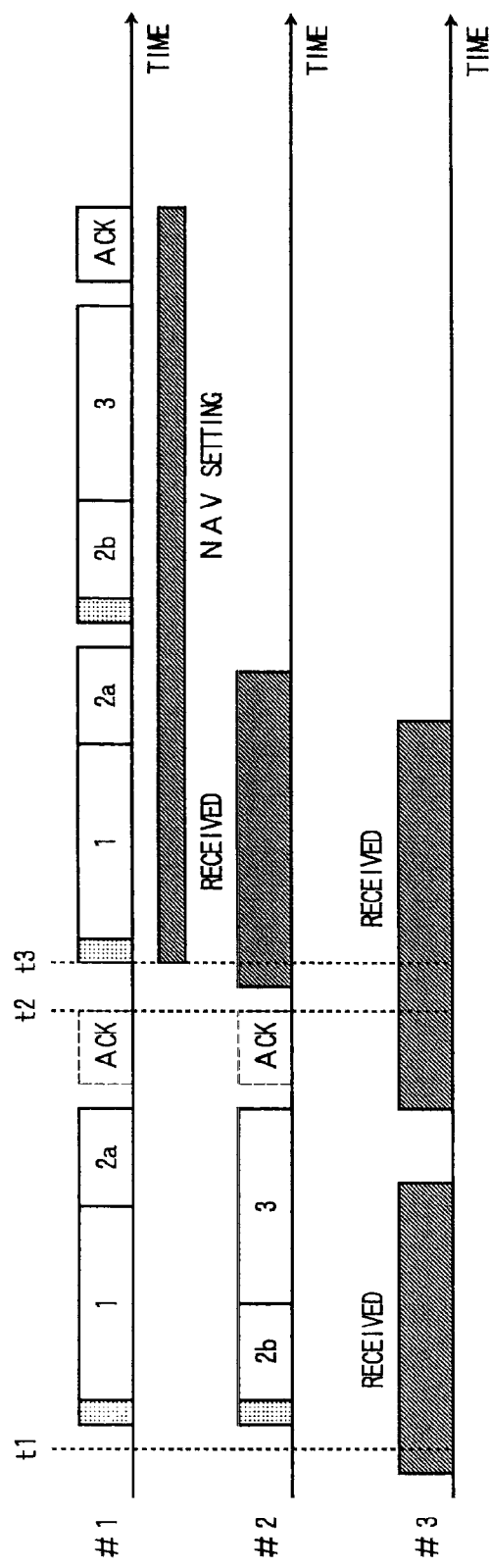
FIG. 16 is a time chart showing an operation example of the eleventh embodiment of the present invention.

FIG. 15 shows a flowchart of an eleventh embodiment of the present invention. FIG. 16 shows an operation example of the eleventh embodiment of the present invention. It is assumed here that wireless channels #1, #2, #3 are prepared.

When data arrives in a transmission buffer, it is first searched by carrier sense if there is any idle wireless channel (S301, S302). In FIG. 16, at a timing the data is generated t1, the wireless channel #3 is busy, and the wireless channel #1 and the wireless channel #2 are retrieved as idle. Next, according to the number of the idle channels and the number of transmission-standby data packets, packets are generated by, for example, any one of the methods shown in FIG. 49, so that the packet time lengths in the respective wireless channels become equal, and the data packets are assigned to the respective wireless channels to be (simultaneously) transmitted (S303).

In the example shown in FIG. 16, which is a case where there are three data frames to be transmitted while there are two idle channels, a data frame 2 is divided into two (2a, 2b) by the method shown in FIG. 49(2) and they are combined with a data frame 1 and a data frame 3 respectively, so that data packets (1+2a), (2b+3) are generated to be assigned to the respective wireless channels and are simultaneously transmitted.

Next, it is confirmed for all the simultaneously transmitted data packets whether or not ACK packets are received within a predetermined time after the transmission (S304), and a data packet for which the ACK packet is not received within the predetermined time is subjected to retransmission processing (S305 to S308). In the retransmission processing, it is first searched by carrier sense if there is any idle wireless channel, and the number of the idle channels and the number of retransmission packets are compared (S305). When the number of the idle channels is equal to or larger than the number of the retransmission packets, idle channels to be utilized in the retransmission processing are selected and the retransmission packets are assigned to the respective selected idle channels to be (simultaneously) transmitted (S306).

On the other hand, when the number of the idle channels is smaller than the number of the retransmission packets, a retransmission packet to be transmitted first is selected, and as a transmission inhibition time (occupation time) to be written in this transmission packet, the total transmission time for this retransmission packet and the remaining retransmission packet is set (S307). Next, after the transmission of the selected retransmission packet is completed, the subsequent retransmission packet is continuously transmitted by using the relevant wireless channel (S308). Thereafter, the above-described retransmission processing is repeated until the ACK packets are received for all the packets.

FIG. 16 is a case where the ACK packets for the data packets (1+2a), (2b+3) transmitted via the wireless channels #1, #2 are not received by an ACK timeout t2, and the data packets (1+2a), (2b+3) are subjected to the retransmission processing. Here, only the wireless channel #1 is idle at a retransmission processing start time t3, and thus while the number of the retransmission packets is 2, the number of the idle channels is 1, which is smaller than the number of the retransmission packets, so that the retransmission packet (1+2a) is first assigned to the wireless channel #1 to be transmitted (FIG. 15: S307).

At this time, as the transmission inhibition time, the sum of the transmission time for its own transmission and the transmission time for the retransmission packet (2b+c) is set in the retransmission packet (1+2a). According to this retransmission packet (1+a), a NAV is set for the wireless channel #1 until the transmission of the next retransmission packet (2b+c) is completed. Consequently, the transmission to the wireless channel #1 from another STA is inhibited, so that the wireless channel #1 is in a state of being occupied by the own STA. Therefore, when the transmission of the retransmission packet (1+2a) is completed, the retransmission packet (2b+c) can be continuously transmitted via the wireless channel #1 (FIG. 15: S308).

Here, the NAV (Network Allocation Vector) will be briefly explained. As a carrier sense method, two kinds of methods are used: one of the methods is a physical carrier sense method of measuring received power of a wireless channel with a RSSI (Received Signal Strength Indicator) or the like to detect whether or not another STA is using the wireless channel for transmitting a data packet; and the other method is a virtual carrier sense method of utilizing the occupation time of a wireless channel used for transmission/reception of a data packet, the occupation time being written in a header of the data packet, to thereby setting the wireless channel as busy only during the occupation time.

An STA has a timer called a NAV indicating the time taken for a wireless channel to become idle. When the NAV indicates 0, it signifies that the wireless channel is idle, and when the NAV does not indicate 0, it signifies that the wireless channel is found busy by virtual carrier sense. When a data packet transmitted from another wireless channel is received, the occupation time written in the header of the data packet is read, and when this value is larger than a current value of the NAV, this value is set in the NAV.

At this time, by setting the actual transmission time of the data packet as the occupation time to be written in the header of the data packet, the physical carrier sense with the RSSI and the virtual carrier sense by the NAV both indicate a busy state, so that the carrier senses by the aforesaid two methods serve substantially the same function. On the other hand, by writing in the header the occupation time that is longer than the actual transmission time of the data packet, the wireless channel is found busy by the virtual carrier sense even at the time after the reception completion of the data packet, which brings about an effect that the transmission using the wireless channel can be inhibited. The occupation time in this case can be said as the transmission inhibition time, and hence, is referred to as the "transmission inhibition time" in the description of the present invention. An STA transmitting the data packet determines that the wireless channel is idle to execute the transmission only when the wireless channel is found idle by the two carrier senses.

[Twelfth Embodiment]

Figure 17:
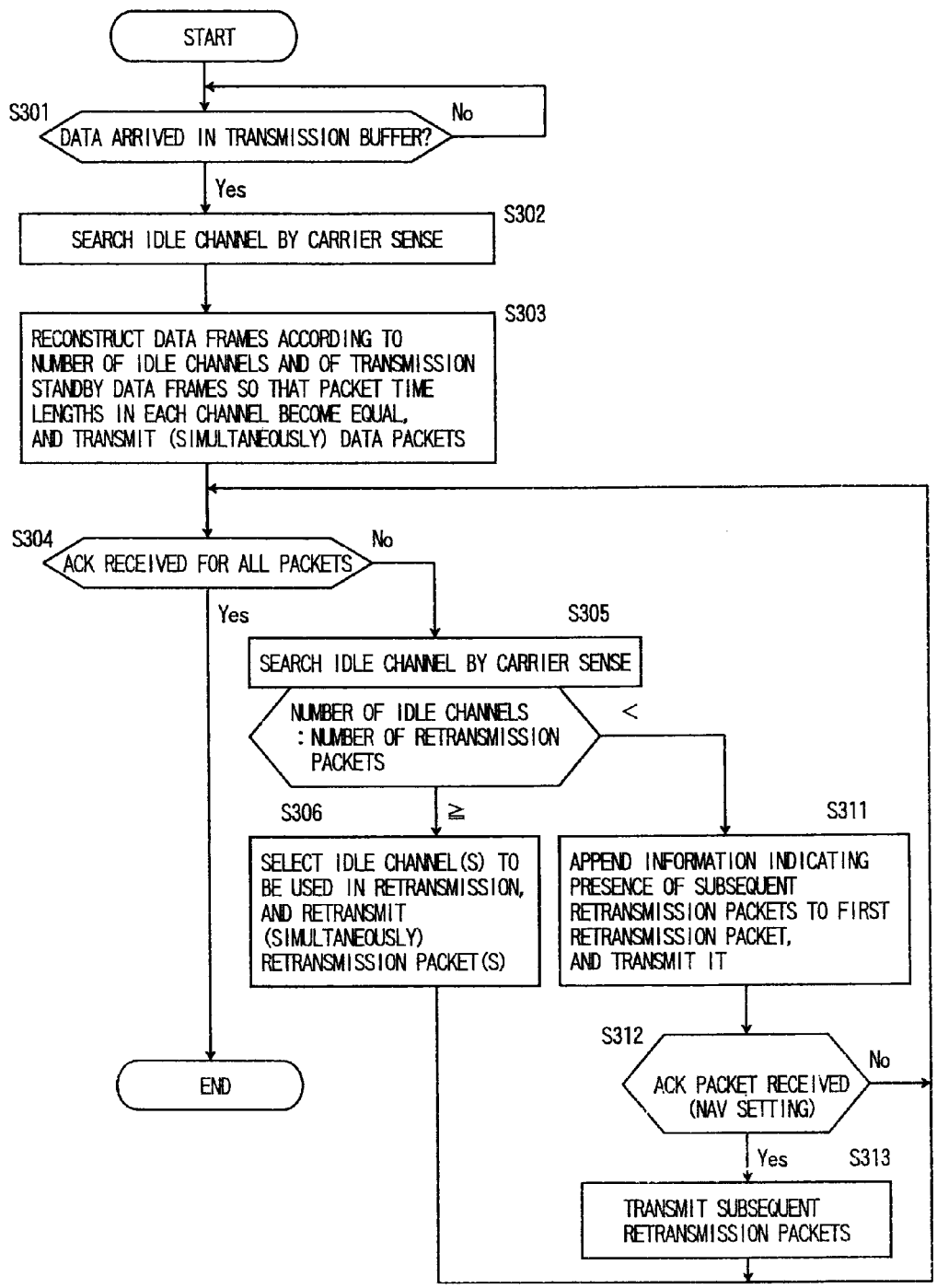
FIG. 17 is a flowchart showing a processing procedure in a transmit-side STA of a twelfth embodiment of the present invention.
Figure 18:
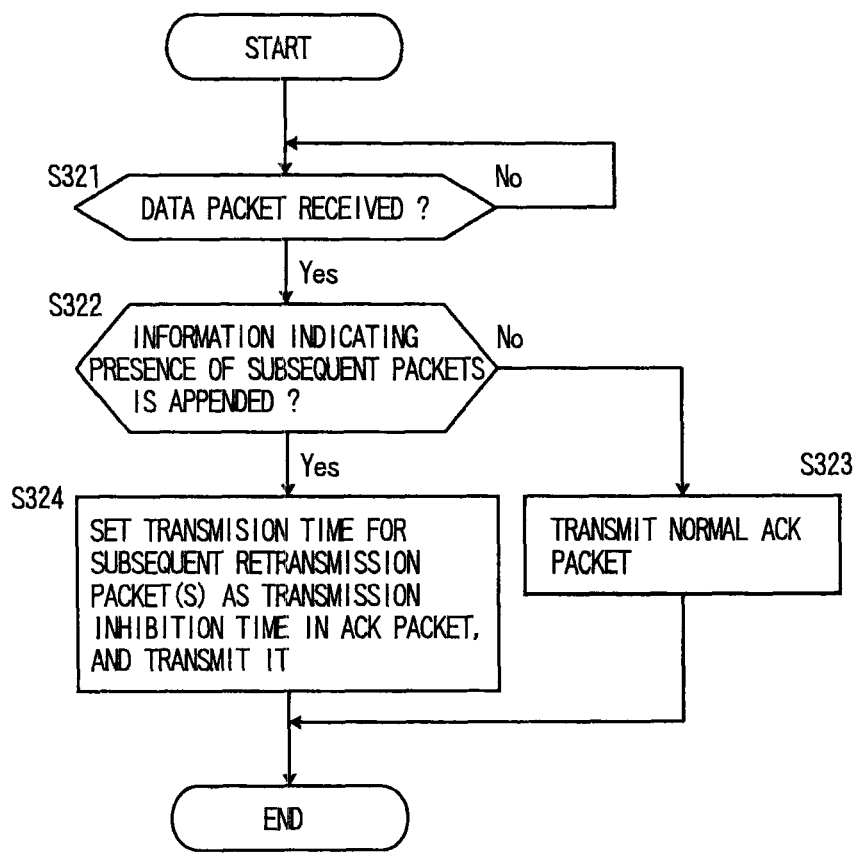
FIG. 18 is a flowchart showing a processing procedure in a receive-side STA of the twelfth embodiment of the present invention.
Figure 19:
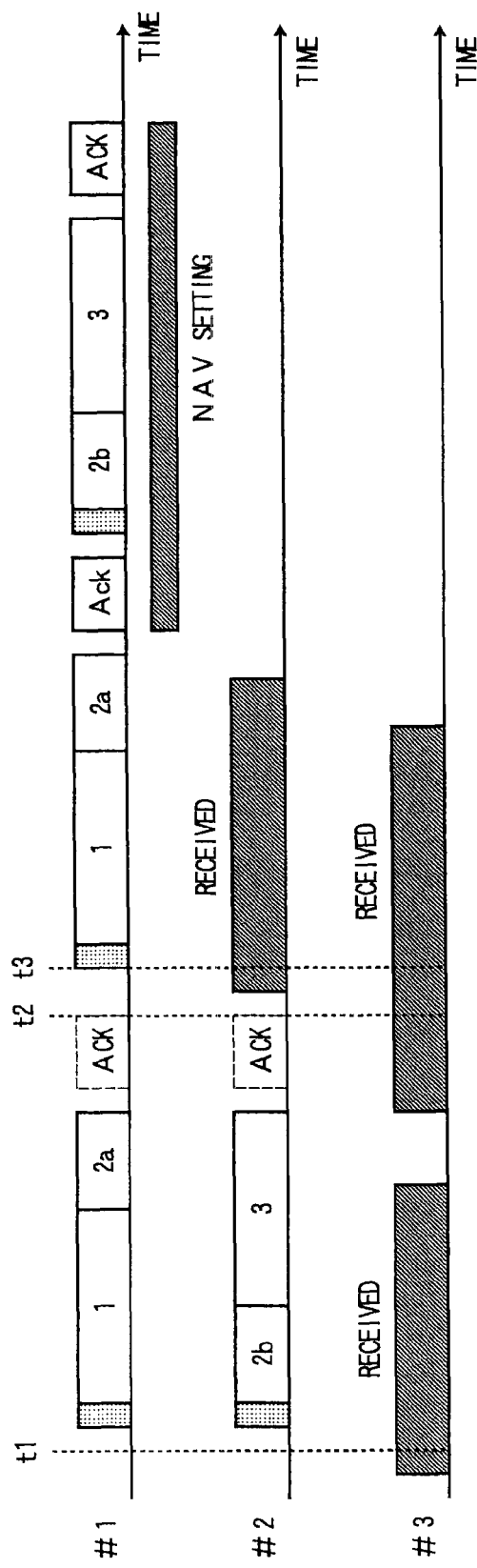
FIG. 19 is a time chart showing an operation example of the twelfth embodiment of the present invention.

FIG. 17 and FIG. 18 show flowcharts of a twelfth embodiment of the present invention. FIG. 17 shows processing in a transmit-side STA and FIG. 18 shows processing in a receive-side STA. FIG. 19 shows an operation example of the twelfth embodiment. It is assumed here that wireless channels #1, #2, #3 are prepared. This embodiment is characterized in that a NAV is set not from the transmit-side STA but from the receive-side STA.

In the transmit-side STA, when data arrives in a transmission buffer, it is first searched by carrier sense if there is any idle wireless channel (FIG. 17: S301, S302). Next, according to the number of the idle channels and the number of transmission-standby data packets, data packets are generated by, for example, any one of the methods shown in FIG. 49 so that the packet time lengths in the respective wireless channels become equal, and the data packets are assigned to the respective wireless channels to be (simultaneously) transmitted (FIG. 17: S303).

Next, it is confirmed for all the simultaneously transmitted data packets whether or not ACK packets are received within a predetermined time from the transmission (FIG. 17: S304), and a data packet for which the ACK packet is not received within the predetermined time is subjected to retransmission processing (FIG. 17: S305, S306, S311 to S313). In the retransmission processing, it is first searched by carrier sense if there is any idle wireless channel, and the number of the idle channels and the number of retransmission packets are compared (FIG. 17: S305). When the number of the idle channels is equal to or larger than the number of the retransmission packets, idle channels to be utilized in the retransmission processing are selected and the retransmission packets are assigned to the respective selected idle channels to be (simultaneously) transmitted (FIG. 17: S306). On the other hand, when the number of the idle channels is smaller than the number of the retransmission packets, a retransmission packet to be transmitted first is selected, and when this retransmission packet is transmitted, information indicating the presence of the subsequent retransmission packet is appended thereto (FIG. 17: S311).

When receiving the data packet, the receive-side STA determines whether or not the information indicating the presence of the subsequent data packet (retransmission packet) is appended to this data packet (FIG. 18: S321, S322). When there is no subsequent data packet, a normal ACK packet is transmitted in response (FIG. 18: S323). On the other hand, when there is any subsequent data packet, the transmission time for the subsequent retransmission packet notified by the transmit-side STA is set as a transmission inhibition time to be written in the normal ACK packet, and the ACK packet is transmitted in response (FIG. 18: S324). STAs receiving the ACK packet in which this transmission inhibition time is written set the transmission inhibition time in the NAV of the relevant wireless channel to refrain from transmission.

When receiving, as a reply to the previously transmitted data packet, the ACK packet in which the transmission inhibition time is set, the transmit-side STA sets the transmission inhibition time in the NAV as is done in the other STAs, but ignores this to continuously transmit the subsequent retransmission packet by using the relevant wireless channel (without carrier sense) (FIG. 17: S312, S313). Alternatively, it is also possible that the setting of the NAV itself is not performed in response to the reception of the ACK packet in which the transmission inhibition time is set. Thereafter, the above-described retransmission processing is repeated until the ACK packets are received for all the packets.

FIG. 19 is a case where the ACK packets for data packets (1+2a), (2b+3) transmitted via the wireless channels #1, #2 are not received by an ACK timeout t2 and therefore, the data packets (1+2a), (2b+3) are subjected to the retransmission processing. Here, while the number of the retransmission packets is 2, the number of the idle channels at a retransmission processing start time t3 is 1, which is smaller than the number of the retransmission packets, and therefore, the retransmission packet (1+2a) is first assigned to the wireless channel #1 to be transmitted. At this time, the information indicating the presence of the subsequent retransmission packet is appended to the retransmission packet (1+2a) (FIG. 17: S311).

Thereafter, according to the transmission inhibition time set in an ACK packet for this retransmission packet (1+2a), the NAV is set for the wireless channel #1 until the transmission of the next retransmission packet (2b+3) is completed, so that the transmission using the wireless channel #1 is inhibited. However, an STA transmitting the retransmission packet (1+2a) ignores the NAV that is set for the wireless channel #1 according to the ACK packet, and continuously transmits the subsequent retransmission packet (2b+3) by using the wireless channel #1 (FIG. 17: S312, S313). Consequently, it is possible to continuously transmit the retransmission packets (1+2a), (2b+3).

[Thirteenth Embodiment]

In the eleventh embodiment, the NAV is set from the transmit-side STA continuously transmitting a plurality of retransmission packets, and in the twelfth embodiment, the NAV is set from the receive-side STA based on the request from the transmit-side STA continuously transmitting a plurality of retransmission packets. Such NAV setting puts the wireless channel #1 into an occupied state, enabling continuous transmission of the plural retransmission packets. However, STAs involved in the NAV setting are limited to STAs capable of receiving the first retransmission packet from the transmit-side STA or limited to STAs capable of receiving the ACK packet from the receive-side STA. That is, they are limited to STAs being in the vicinity of the transmit-side STA or STAs in the vicinity of the receive-side STA. Therefore, in order to widen a range of STAs involved in this NAV setting, the eleventh embodiment and the twelfth embodiment are combined to be a thirteenth embodiment.

Figure 20:
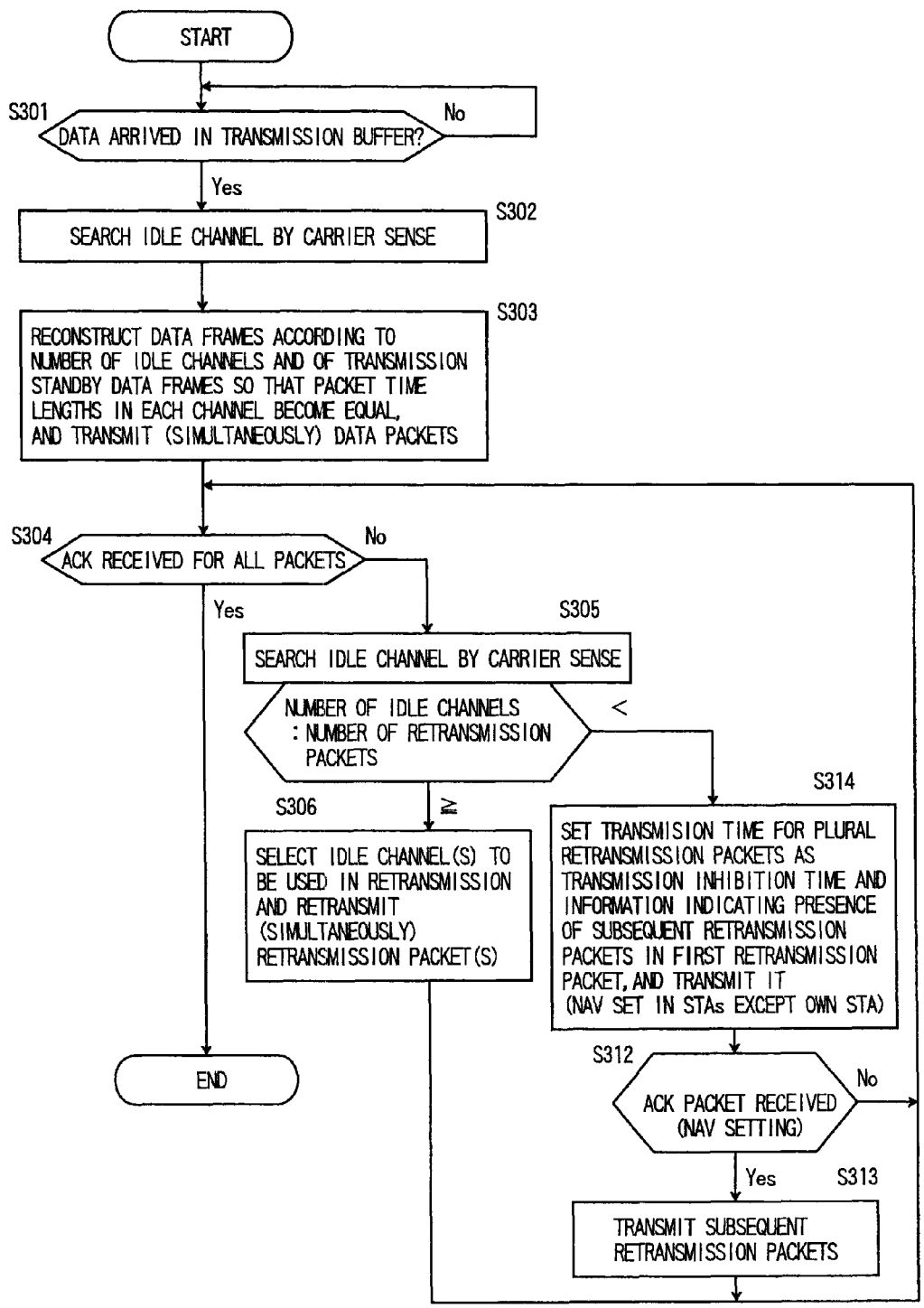
FIG. 20 is a flowchart showing a processing procedure of a thirteenth embodiment of the present invention.
Figure 21:
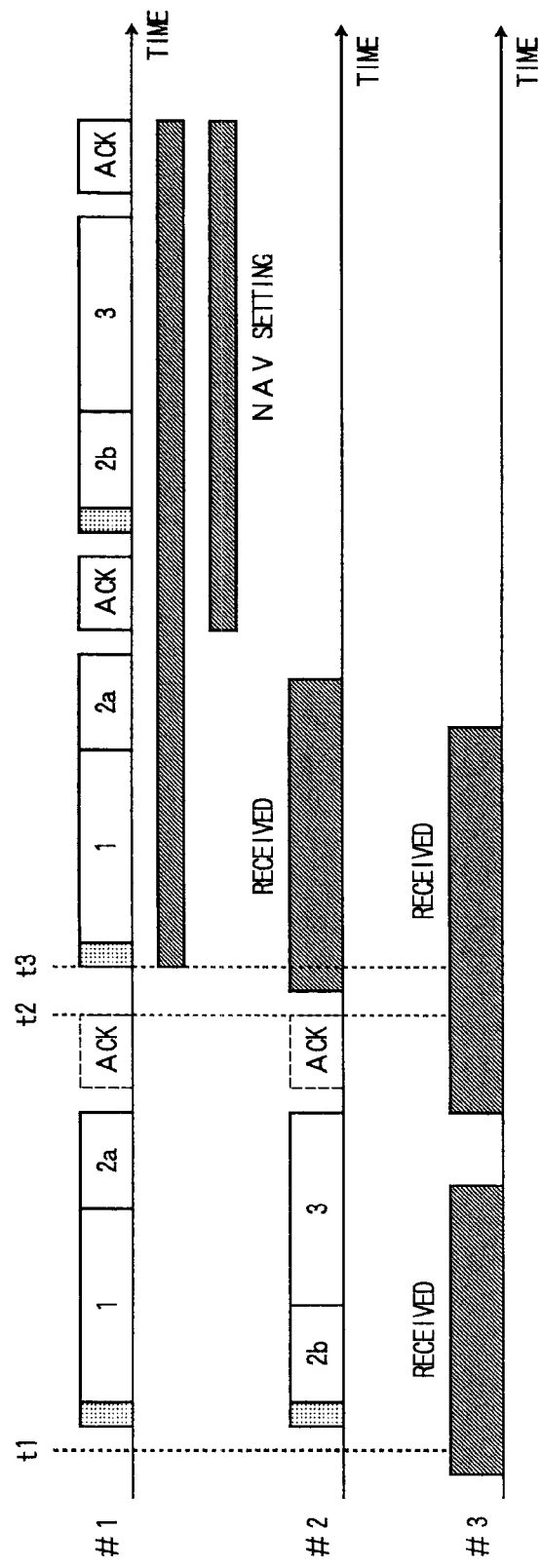
FIG. 21 is a time chart showing an operation example of the thirteenth embodiment of the present invention.

FIG. 20 shows a flowchart of the thirteenth embodiment of the present invention. FIG. 21 shows an operation example of the thirteenth embodiment of the present invention. It is assumed here that wireless channels #1, #2, #3 are prepared. Description of S301 to S304 which are the same as those of the eleventh embodiment and the twelfth embodiment will be omitted.

In retransmission processing, it is first searched by carrier sense if there is any idle wireless channel, and the number of the idle channels and the number of retransmission packets are compared (S305). Here, when the number of the idle channels is smaller than the number of the retransmission packets, a retransmission packet to be transmitted first is selected, and when this retransmission packet is transmitted, the total transmission time for this retransmission packet and the remaining retransmission packet is set as a transmission inhibition time (occupation time) to be written in this retransmission packet, and information indicating the presence of the subsequent retransmission packet is further appended (S314).

A function of a receive-side STA and a procedure for NAV setting by this function are the same as those of the twelfth embodiment, and each STA receiving the ACK packet-sets the transmission inhibition time in a NAV for a relevant wireless channel to refrain from transmission. Thereafter, the retransmission packet is continuously transmitted by using the relevant wireless channel. Incidentally, it is also possible to notify the presence of the subsequent retransmission packet to the receive-side STA by the transmission inhibition time set in the retransmission packet. In this case, the receive-side STA transmits the ACK packet in which the time obtained by subtracting the transmission time of the first retransmission packet from the notified transmission inhibition time (the transmission time for the subsequent retransmission packet) is set as the transmission inhibition time.

FIG. 21 is a case where the ACK packets for data packets (1+2a), (2b+3) transmitted via the wireless channels #1, #2 are not received by an ACK timeout t2, and therefore, the data packets (1+2a), (2b+3) are subjected to retransmission processing. Here, while the number of the retransmission packets is 2, the number of the idle channels at a retransmission processing start time t3 is 1, which is smaller than the number of the retransmission packets, and therefore, the retransmission packet (1+2a) is first assigned to the wireless channel #1 to be transmitted. At this time, in the retransmission packet (1+2a), the sum of the transmission time for itself and transmission time for the retransmission packet (2b+c) is set as the transmission inhibition time (FIG. 20: S314).

Thereafter, according to the transmission inhibition time set in the ACK packet for this retransmission packet (1+2a), the NAV is set for the wireless channel #1 until the transmission of the next retransmission packet (2b+3) is completed, so that the transmission using the wireless channel #1 is inhibited. However, an STA transmitting the retransmission packet (1+2a) ignores the NAV that is set for the wireless channel #1 according to the ACK packet, and continuously transmits the subsequent retransmission packet (2b+3) by using the wireless channel #1 (FIG. 20: S312, S313). Consequently, the retransmission packets (1+2a), (2b+3) can be continuously transmitted.

[Fourteenth Embodiment]

Figure 22:
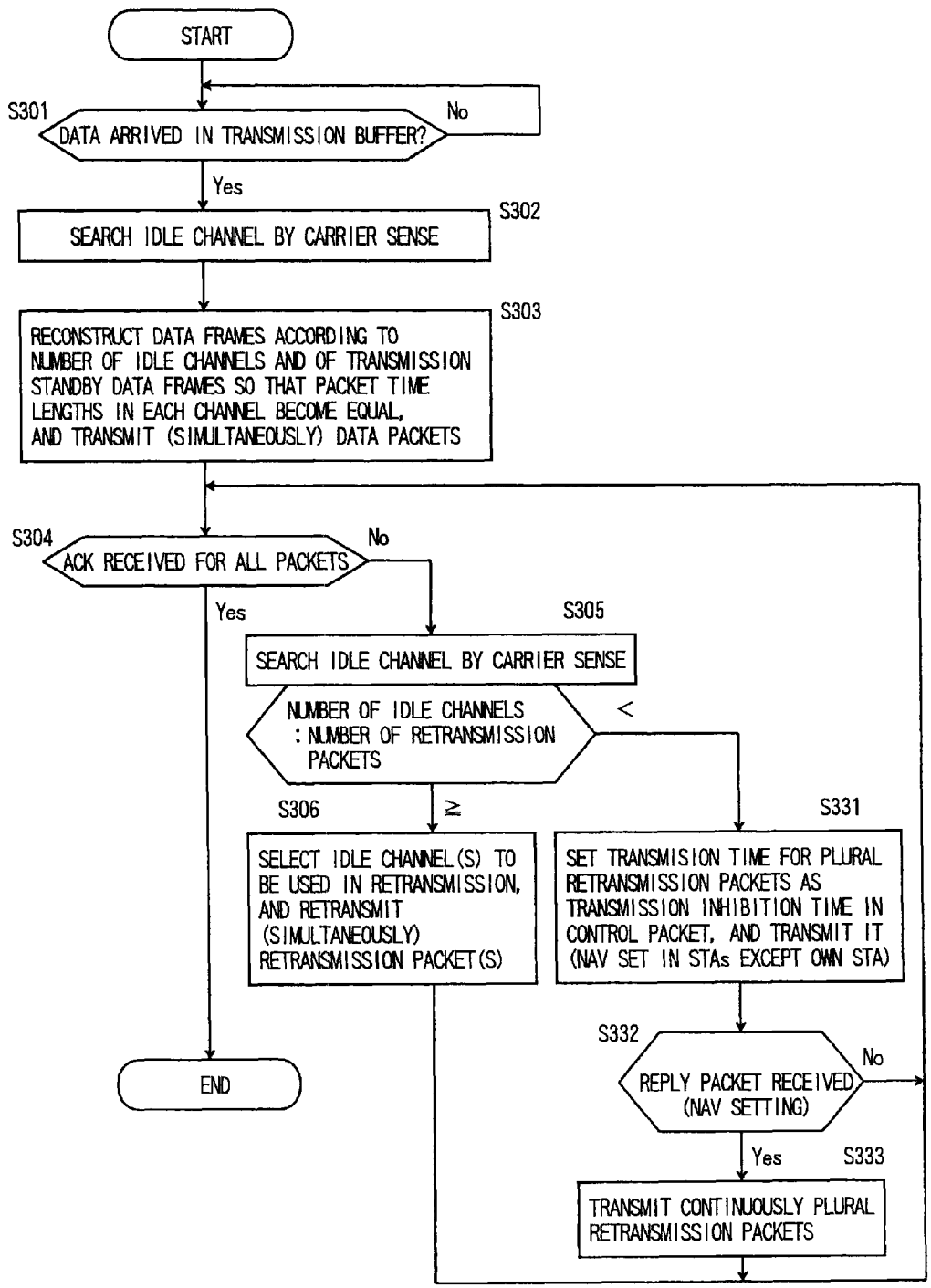
FIG. 22 is a flowchart showing a processing procedure of a fourteenth embodiment of the present invention.
Figure 23:
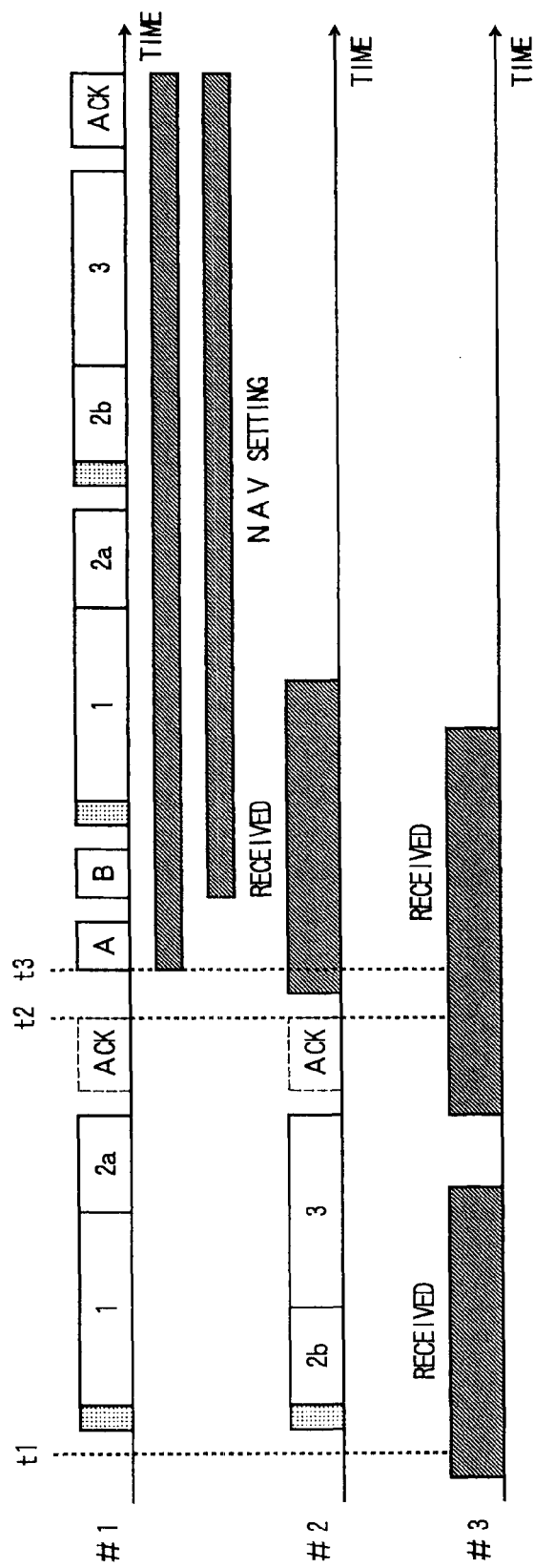
FIG. 23 is a time chart showing an operation example of the fourteenth embodiment of the present invention.

FIG. 22 shows a flowchart of a fourteenth embodiment of the present invention. FIG. 23 shows an operation example of the fourteenth embodiment of the present invention. It is assumed here that wireless channels #1, #2, #3 are prepared. This embodiment is characterized in that a control packet for setting a NAV is exchanged in advance when a plurality of retransmission packets are transmitted separately at a plurality of transmission timings.

When data arrives in a transmission buffer, it is first searched by carrier sense if there is any idle wireless channel (S301, S302). Next, according to the number of the idle channels and the number of transmission-standby data packets, data packets are generated by, for example, any one of the methods shown in FIG. 49 so that the packet time lengths in the respective wireless channels are equal, and the data packets are assigned to the respective wireless channels to be (simultaneously) transmitted (S303).

Next, it is confirmed for all the simultaneously transmitted data packets whether or not ACK packets are received within a predetermined time from the transmission (S304), and a data packet for which the ACK packet is not received within the predetermined time is subjected to retransmission processing (S305, S306, S331 to S333). In the retransmission processing, it is first searched by carrier sense if there is any idle wireless channel, and the number of the idle channels and the number of retransmission packets are compared (S305). When the number of the idle channels is equal to or larger than the number of the retransmission packets, idle channels to be utilized for the retransmission processing are selected and the retransmission packets are assigned to the respective selected idle channels to be (simultaneously) transmitted (S306).

On the other hand, when the number of the idle channels is smaller than the number of the retransmission packets, the channel which is currently idle is used to transmit the control packet in which the transmission time for the plural retransmission packets is set as a transmission inhibition time (S331). Thereafter, a receive-side STA sets the transmission inhibition time in a reply packet for the control packet to transmit the reply packet. When receiving the reply packet, an STA transmitting the control packet performs the same processing as that of the twelfth and thirteenth embodiments, that is, it selects and transmits a retransmission packet to be transmitted first and further continuously transmits the subsequent retransmission packet by using the relevant wireless channel (S332, S333). Thereafter, the above-described retransmission processing is repeated until the ACK packets are received for all the packets. Incidentally, the processing for setting the transmission inhibition time in the reply packet may be optional.

FIG. 23 is a case where the ACK packets for data packets (1+2a), (2b+3) transmitted via the wireless channels #1, #2 are not received by an Ack timeout t2, and therefore, the data packets (1+2a), (2b+3) are subjected to the retransmission processing. Here, only the wireless channel #1 is idle at a retransmission processing start time t3, that is, while the number of the retransmission packets is 2, the number of the idle channels is 1, which is smaller than the number of the retransmission packets, and therefore, the control packet for setting the NAV is first transmitted by using the wireless channel #1 (FIG. 22: S331). The transmission time for all the retransmission packets (1+2a), (2b+3) is set in this control packet as the transmission inhibition time. Further, the same transmission inhibition time is also set in the reply packet for the control packet. According to the control packet and the reply packet, the NAV is set for the wireless channel #1 until the transmission of the retransmission packets (1+2a), (2b+3) is completed, so that the wireless channel #1 becomes in an occupied state. Consequently, when the transmission of the retransmission packet (1+2a) is completed, the retransmission packet (2b+3) can be continuously transmitted via the wireless channel #1 (FIG. 22: S333).

In the embodiments described hitherto, the acknowledgement of reception by means of the ACK packet may be replaced by transmission of a NACK request packet from the transmit-side STA and response of a NACK packet from the receive-side STA.

[Fifteenth Embodiment]

An embodiment to be described below corresponds to a case where there is no change in the number of idle channels at the time of initial transmission and at the time of retransmission processing (the aforesaid problem 2 at the time of retransmission).

Figure 24:
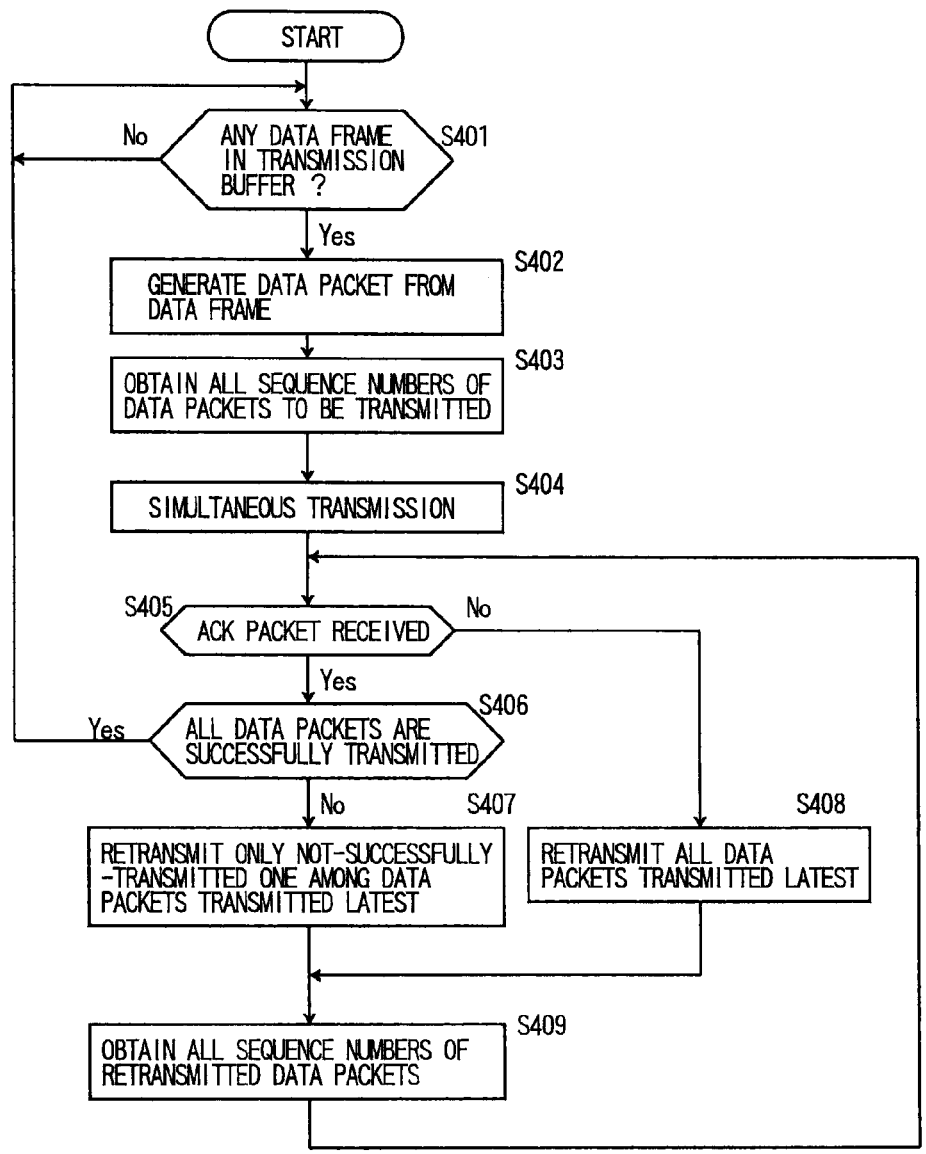
FIG. 24 is a flowchart showing a processing procedure of a fifteenth embodiment of the present invention.
Figure 25:
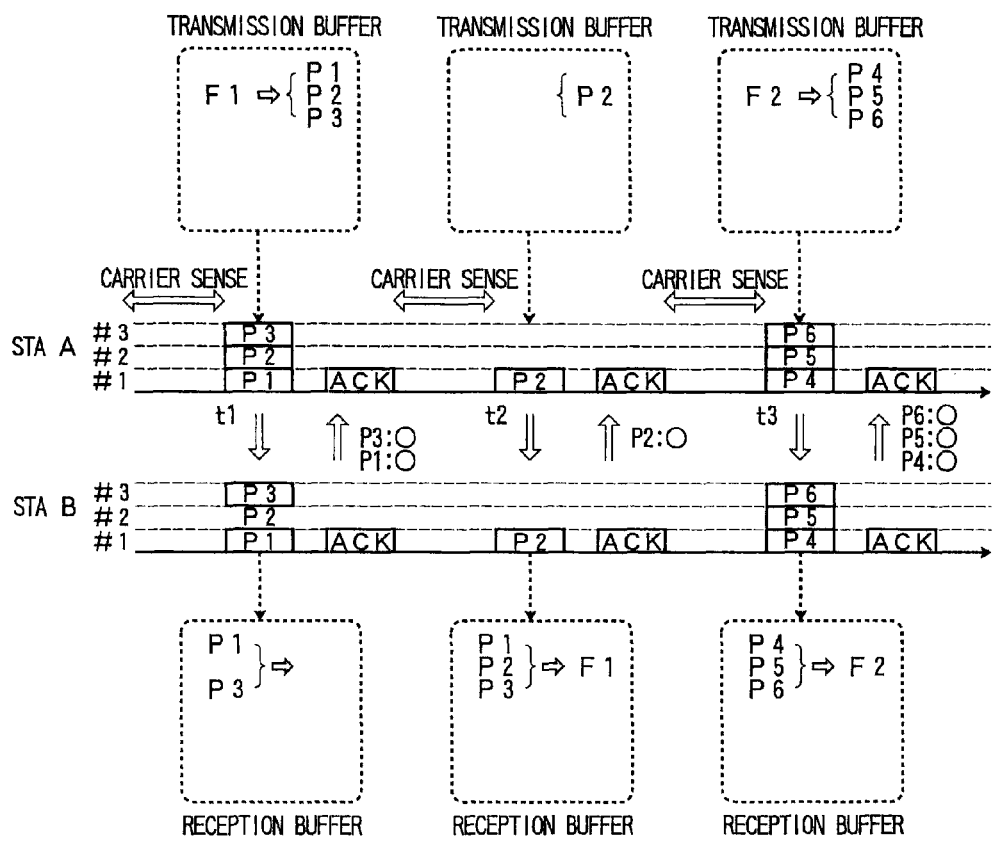
FIG. 25 is a time chart showing an operation example of the fifteenth embodiment of the present invention.

FIG. 24 shows a flowchart of a fifteenth embodiment of the present invention. FIG. 25 shows an operation example of the fifteenth embodiment. It is assumed here that wireless channels #1, #2, #3 are prepared, and the number 3 of simultaneously transmittable data packets does not change at transmission timings t1, t2, t3 obtained by carrier sense.

In a transmit-side STA, when a data frame arrives in a transmission buffer, data packets corresponding to the simultaneously transmittable number are generated from a data frame (S401, S402). At the transmission timing t1 shown in FIG. 25, data packets P1, P2, P3 are generated from a data frame F1. The data packets are equal in packet time length. Any number of data frames can be used for generating the data packets, and as shown in, for example, FIGS. 49(2), (3), two data packets may be generated from three data frames. Next, all sequence numbers of the data packets to be transmitted are obtained (S403). Note that P1 to P3 are assumed to correspond to the sequence numbers of the respective data packets.

Next, the generated data packets P1 to P3 are simultaneously transmitted (S404). Thereafter, all the data packets transmission successes/failures are confirmed by an ACK packet from a receive-side STA (S405, S406). In the example shown in FIG. 25, information on the ratio of the successful transmissions to the total transmissions in the past for each simultaneously transmitted data packet is written in one ACK packet, which is transmitted by using one wireless channel (#1 here). Such an extension-type ACK packet utilizes the Group ACK protocol that has been under consideration in, for example, IEEE802.11TGe and so on.

By this ACK packet, a transmission success of the data packets P1, P3 and a transmission failure of the data packet P2 are confirmed. Then, at the next transmission timing t2 obtained by the carrier sense, only the not-successfully-transmitted data packet (P2 here) out of the data packets P1 to P3 transmitted latest is retransmitted (S406, S407). Further, when the ACK packet is not received even after a predetermined time from the simultaneous transmission of the data packets P1 to P3, all the data packet transmission failures are confirmed and the data packets P1 to P3 are retransmitted (S405, S408). Next, all the sequence numbers of the retransmitted data packets are obtained (S409).

Thereafter, based on an ACK packet from the receive-side STA, transmission successes/failures of all the simultaneously transmitted data packets are confirmed (S405, S406). When a transmission success of the data packet P2 is confirmed by this ACK packet, this means that the transmission successes of all the simultaneously transmitted data packets P1 to P3 are confirmed, and the flow returns to Step S401, where generation and transmission processing of subsequent data packets are started. In FIG. 25, data packets P4, P5, P6 are generated from a data frame F2 and they are simultaneously transmitted at the transmission timing t3. Meanwhile, the receive-side STA restores the data frame F1 when receiving all the data packets P1, P2, P3.

[Sixteenth Embodiment]

Figure 27:
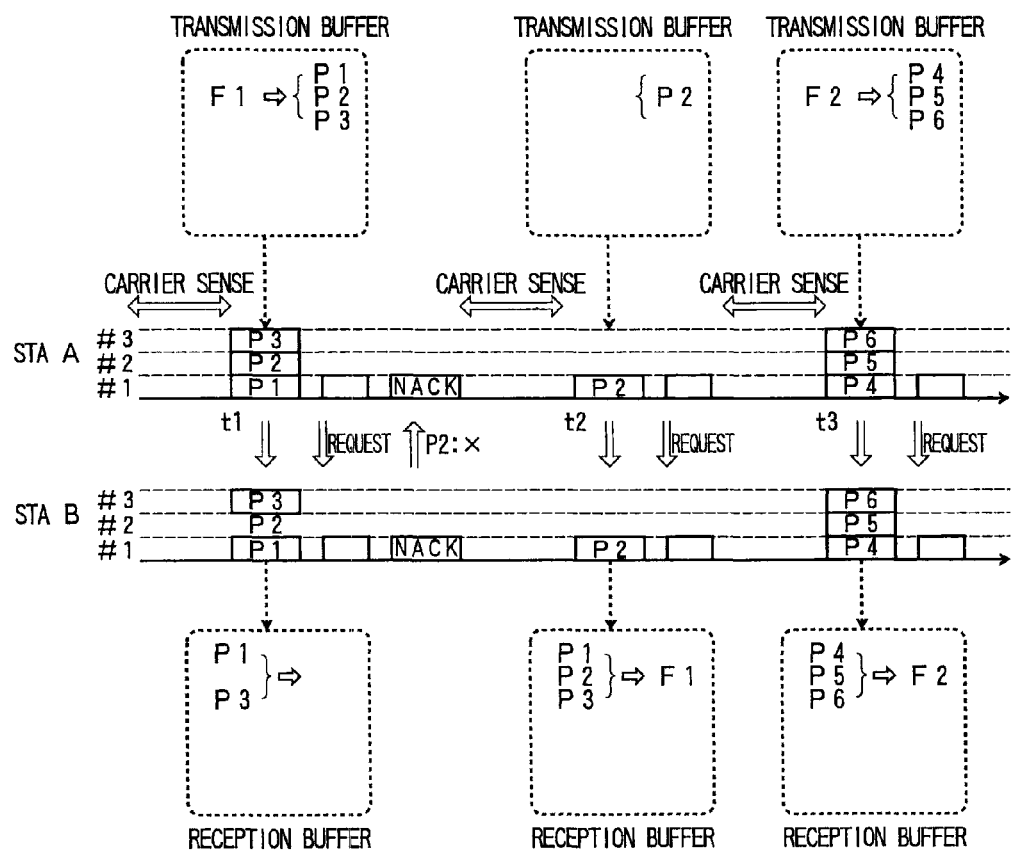
FIG. 27 is a time chart showing an operation example of the sixteenth embodiment of the present invention.

FIG. 26 shows a flowchart of a sixteenth embodiment of the present invention. FIG. 27 shows an operation example of the sixteenth embodiment.

This embodiment is characterized in that, in the fifteenth embodiment, after a transmit-side STA A transmits data packets to a receive-side STA B, the STA A transmits a NACK request packet to the STA B and receives a NACK packet transmitted from the STA B. This NACK request packet includes information on the data packets transmitted from the STA A to the STA B. The STA B does not transmit the NACK packet in response to the NACK request packet when normally receiving the data packets, and when there is any data packet not normally received, it transmits the NACK packet including information on this data packet in response. Therefore, the STA A determines that the data packets previously transmitted were successfully transmitted when the NACK packet does not arrive from the STA B after the transmission of the NACK request packet. On the other hand, when the NACK packet is received, it is determined that the data packet written therein was not-successfully-transmitted. The other retransmission processing of data packets is the same as that of the first embodiment.

When a data frame arrives in a transmission buffer, the transmit-side STA generates data packets from the data frame according to the simultaneously transmittable number (S401, S402). At a transmission timing t1 shown in FIG. 27, data packets P1, P2, P3 are generated from a data frame F1. Next, all sequence numbers of the data packets to be transmitted are obtained (S403), and the data packets P1 to P3 are simultaneously transmitted (S404). Next, the NACK request packet for requesting reception successes/failures of the plural data packets that have been simultaneously transmitted is transmitted to the addresses of the data packets (S411).

Thereafter, transmission successes/failures of all the data packets are confirmed by the NACK packet from the receive-side STA (S412). Note that the example shown in FIG. 27 shows a case where the NACK request packet and the corresponding NACK packet are transmitted/received by using one wireless channel (#1 here), and the information on the data packets in the wireless channels whose transmission failed is collectively written in the NACK packet. Such an extended-type NACK request packet and NACK packet utilize the Group ACK protocol having been under consideration in, for example, IEEE802.11TGe and so on.

A failure of transmission of the data packet P2 is confirmed by this NACK packet. Then, at a next transition timing t2 obtained by carrier sense, only the not-successfully-transmitted data packet (P2 here) is retransmitted (S412, S407). Next, all the sequence numbers of the retransmitted data packets are obtained (S409) and the NACK request packet is transmitted to the addresses of the data packets (S411).

Thereafter, based on the NACK packet from the receive-side STA, transmission successes/failures of all the data packets are confirmed (S412), but in the example shown in FIG. 27, the retransmission success of the data packet P2 is confirmed according to non-input of the NACK packet from the receive-side STA. Consequently, transmission successes of all the simultaneously transmitted data packets P1 to P3 are confirmed, and the flow returns to Step S401, where the generation and transmission processing of subsequent data packets are started. In FIG. 27, data packets P4, P5, P6 are generated from a data frame F2 and are simultaneously transmitted at a transmission timing t3. Meanwhile, the receive-side STA restores the data frame F1 when receiving all the data packets P1, P2, P3.

[Seventeenth Embodiment]

Figure 28:
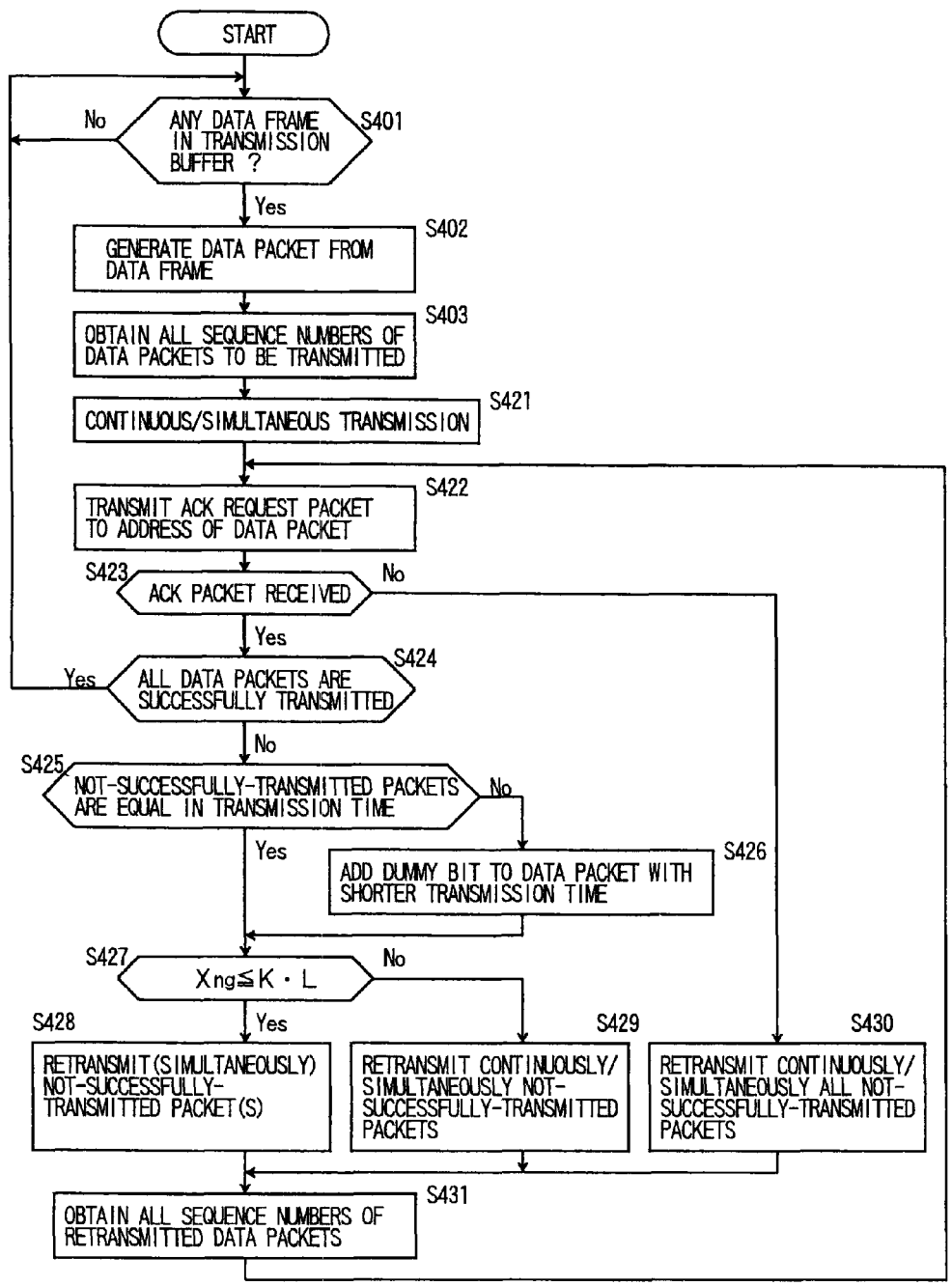
FIG. 28 is a flowchart showing a processing procedure of a seventeenth embodiment of the present invention.
Figure 29:
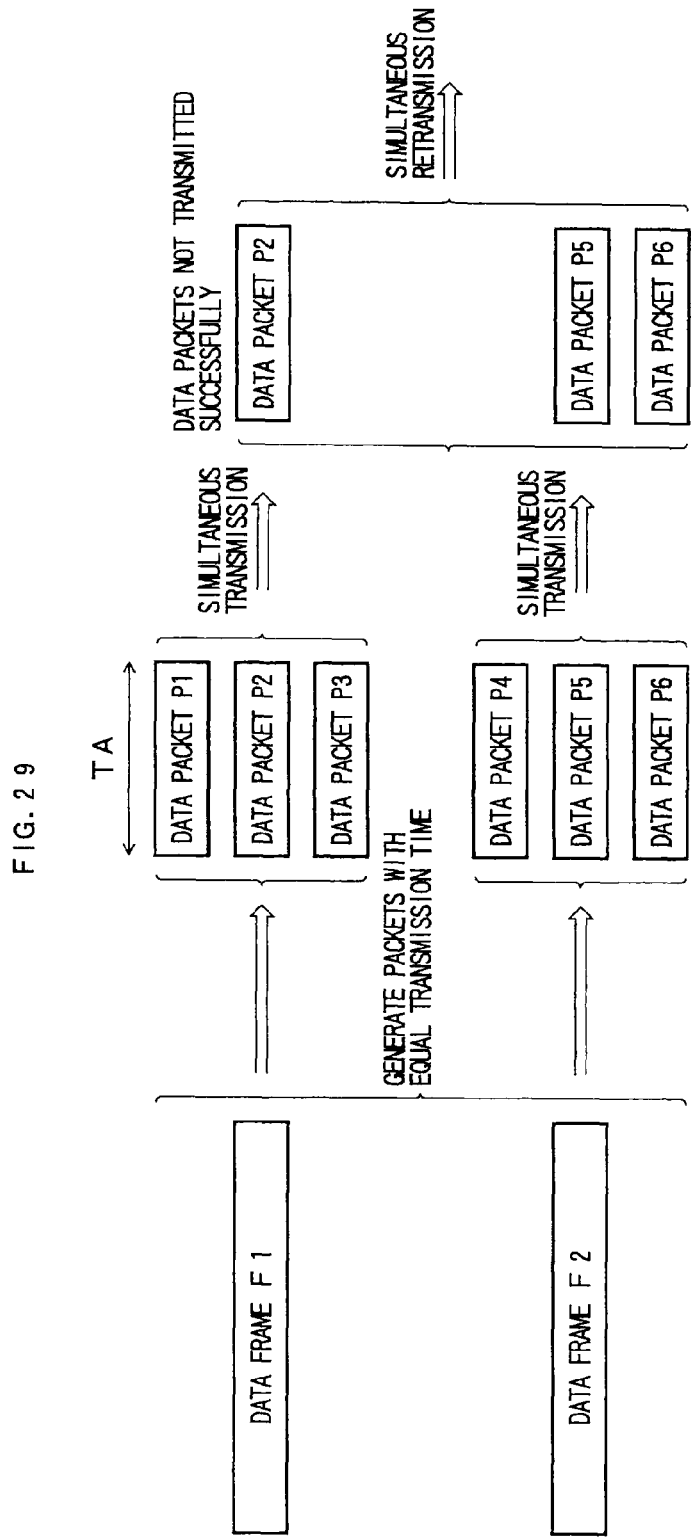
FIG. 29 is a chart showing an example 1 of generating/transmitting/retransmitting a plurality of data packets in the seventeenth embodiment of the present invention.
Figure 30:
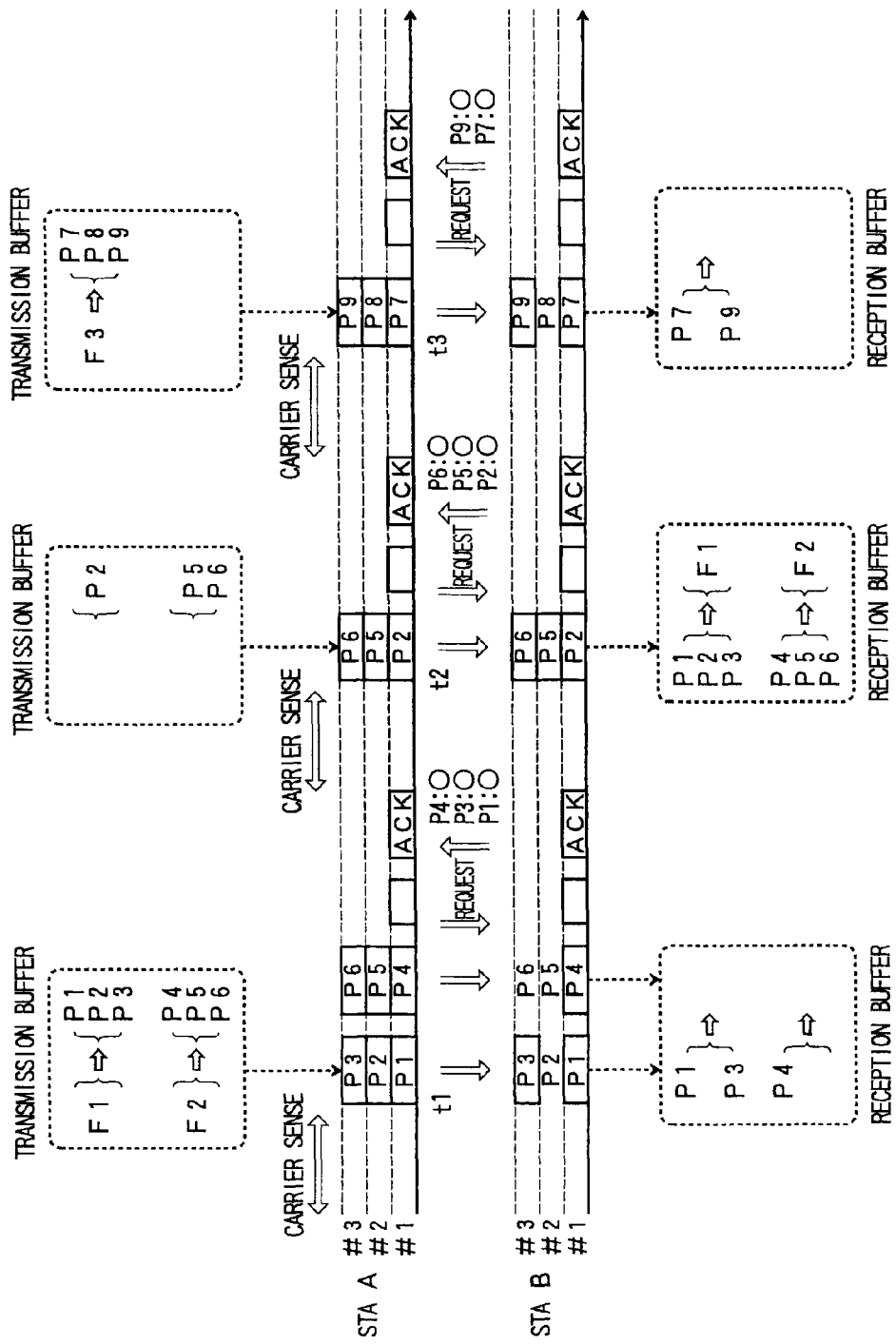
FIG. 30 is a time chart showing an operation example of the example 1 of generating/transmitting/retransmitting the data packets in the seventeenth embodiment of the present invention.

FIG. 28 shows a flowchart of a seventeenth embodiment of the present invention. FIG. 29 shows an example 1 of generating/transmitting/retransmitting a plurality of data packets in the seventeenth embodiment. FIG. 30 shows an operation example of the example 1 of generating/transmitting/retransmitting the plural data packets in the seventeenth embodiment.

This embodiment is characterized in that a plurality of data packets equal in the transmission time are generated in unit of the simultaneously transmittable number from data frames accumulated in a transmission buffer, and the data packets are continuously simultaneously transmitted in unit of the simultaneously transmittable number.

When a data frame arrives in a transmission buffer, a transmit-side STA generates data packets from the data frame according to the simultaneously transmittable number (S401, S402). Here, as shown in FIG. 29, each of two data frames F1, F2 is divided, so that three data packets P1, P2, P3 and three data packets P4, P5, P6 whose transmission time TA are equal are generated. Next, all sequence numbers of the data packets to be transmitted are obtained (S403), the data packets P1 to P3 and the data packets P4 to P6 are continuously simultaneously transmitted (S421), and an ACK request packet is transmitted to addresses of the data packets (S422). Note that the continuous transmission of the data packets can be conducted through the utilization of the Group ACK protocol that has been under consideration in, for example, IEEE802.11TGe and so on.

Thereafter, based on an ACK packet from the receive-side STA, of all the data packet transmission successes/failures are confirmed (S423, S424). The example shown in FIG. 30 shows a case where the ACK request packet and the corresponding ACK packet are transmitted/received by using one wireless channel (#1 here), and information on the ratio of the successful data packet transmissions to the total transmissions in the past is written in this ACK packet. Such an extended-type ACK request packet and ACK packet utilize the Group ACK protocol that has been under consideration in, for example, IEEE802.11TGe and so on.

By this ACK packet, transmission successes of the data packets P1 P3, P4 and transmission failures of the data packets P2, P5, P6 are confirmed. Then, at a next transmission timing t2 obtained by carrier sense, retransmission processing of only the not-successfully-transmitted data packets (P2, P5, P6 here) out of the data packets P1 to P6 transmitted latest is started (S425 to S431).

First, it is discriminated whether or not the not-successfully-transmitted data packets are all equal in the transmission time, and when they are not equal, a dummy packet is added to a data packet requiring a shorter time for transmission so that the plural data packets to be simultaneously retransmitted require the same time for transmission (S425, S426). Incidentally, in this embodiment, since the data packets P1 to P3 and the data packets P4 to P6 generated from the data frames F1, F2 are all equal in the transmission time, the not-successfully-transmitted data packets P2, P5, P6 are also equal in the transmission time, and therefore, the dummy bit need not be added at the time of simultaneous retransmission.

Next, the number Xng of the not-successfully-transmitted data packets and the simultaneously transmittable number K·L (K: the number of MIMOs, L: the number of idle wireless channels) are compared, and it is determined whether or not continuous retransmission is necessary (S427). In a case of Xng≤K·L, one-time retransmission (in a case of Xng=1) or simultaneously retransmission (in a case of Xng>1) is executed (S428), while in a case of Xng>K·L, continuous simultaneously retransmission is executed (S429). In the examples shown in FIG. 29 and FIG. 30, the simultaneously transmittable number is 3 and the number of the not-successfully-transmitted data packets is also 3, so that the data packets are simultaneously retransmitted at one processing.

On the other hand, when the ACK packet is not received even after a predetermined time from the continuous/simultaneous transmission of the data packets P1 to P6, all the data packets transmission failures are confirmed, and continuous/simultaneously retransmission of the data packets P1 to P6 is executed (S423, S430). Next, all the sequence numbers of the retransmitted data packets are obtained (S431), and the ACK request packet is transmitted to the addresses of the data packets (S422).

Thereafter, based the ACK packet from the receive-side STA, transmission successes/failures of all the simultaneously transmitted data packets are confirmed (S423, S424). When transmission successes of the data packets P2, P5, P6 are confirmed by this ACK packet, this means that transmission successes of the data packets P1 to P3 and the data packets P4 to P6 continuously simultaneously transmitted are confirmed, so that the flow returns to Step S401, where the generation and transmission processing of subsequent data packets are started. In FIG. 30, data packets P7, P8, P9 are generated from a data frame F3 and are simultaneously transmitted at a transmission timing t3. Meanwhile, the receive-side STA restores the data frames F1, F2 when receiving all the data packets P1 to P3 and data packets P4 to P6.

In this embodiment, there is some case where the data frame F2 is first restored and the data frame F1 is restored later, but since the transmission and retransmission processing are executed in unit of the data packets P1 to P3 and in unit of the data packets P4 to P6 that are generated at one time, there is no such a case where the data packets P7 and the subsequent data packets generated at a next occasion are transmitted/received first and the data frame F3 is first restored. That is, the restoration order of the data frames is not greatly changed, and the reception buffer size can be determined according to the number of data frames or the number of data packets to be handled at one time, so that a relatively small reception buffer is usable.

Figure 31:
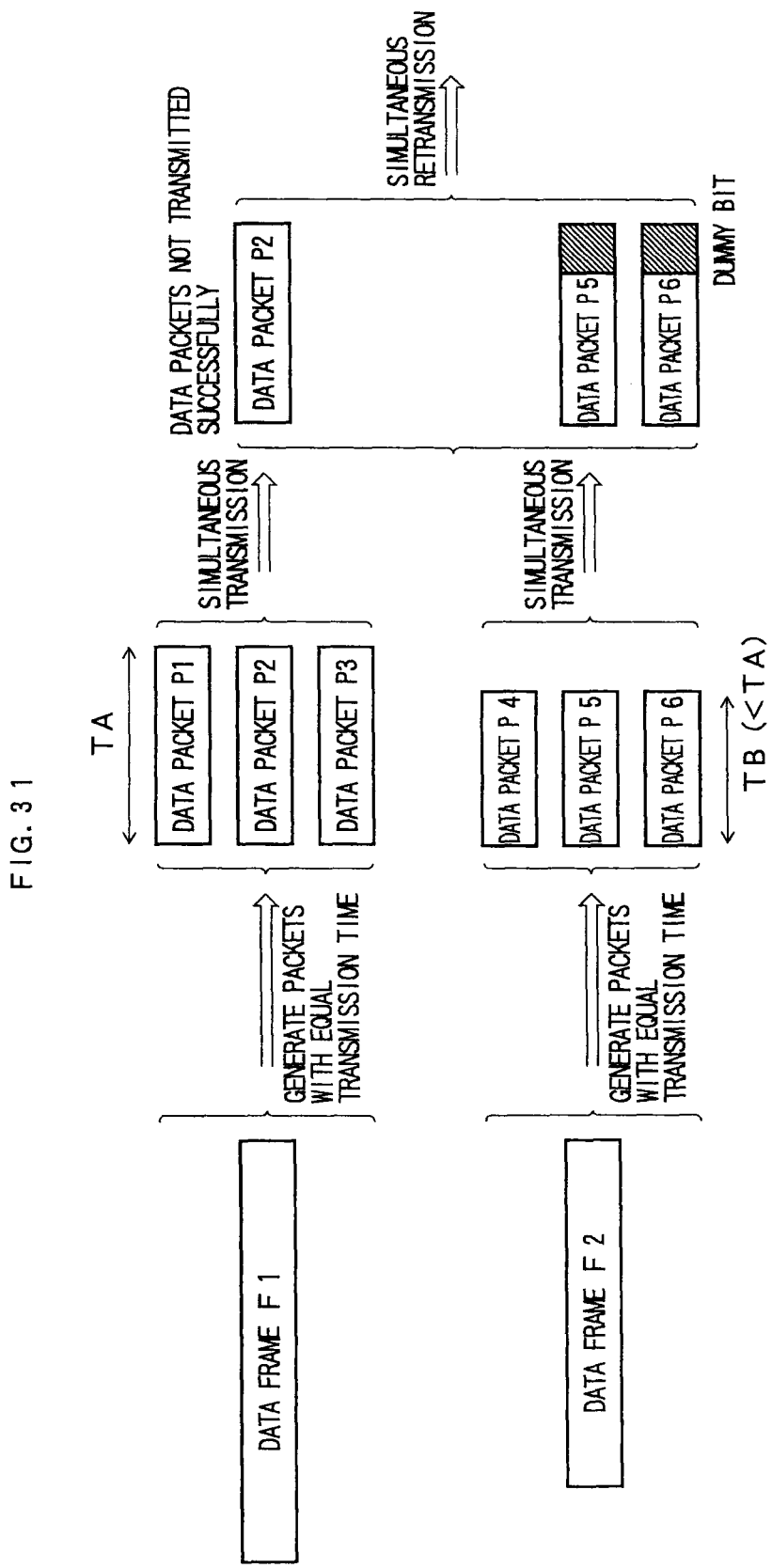
FIG. 31 is a chart showing an example 2 of generating/transmitting/retransmitting a plurality of data packets in the seventeenth embodiment of the present invention.
Figure 32:
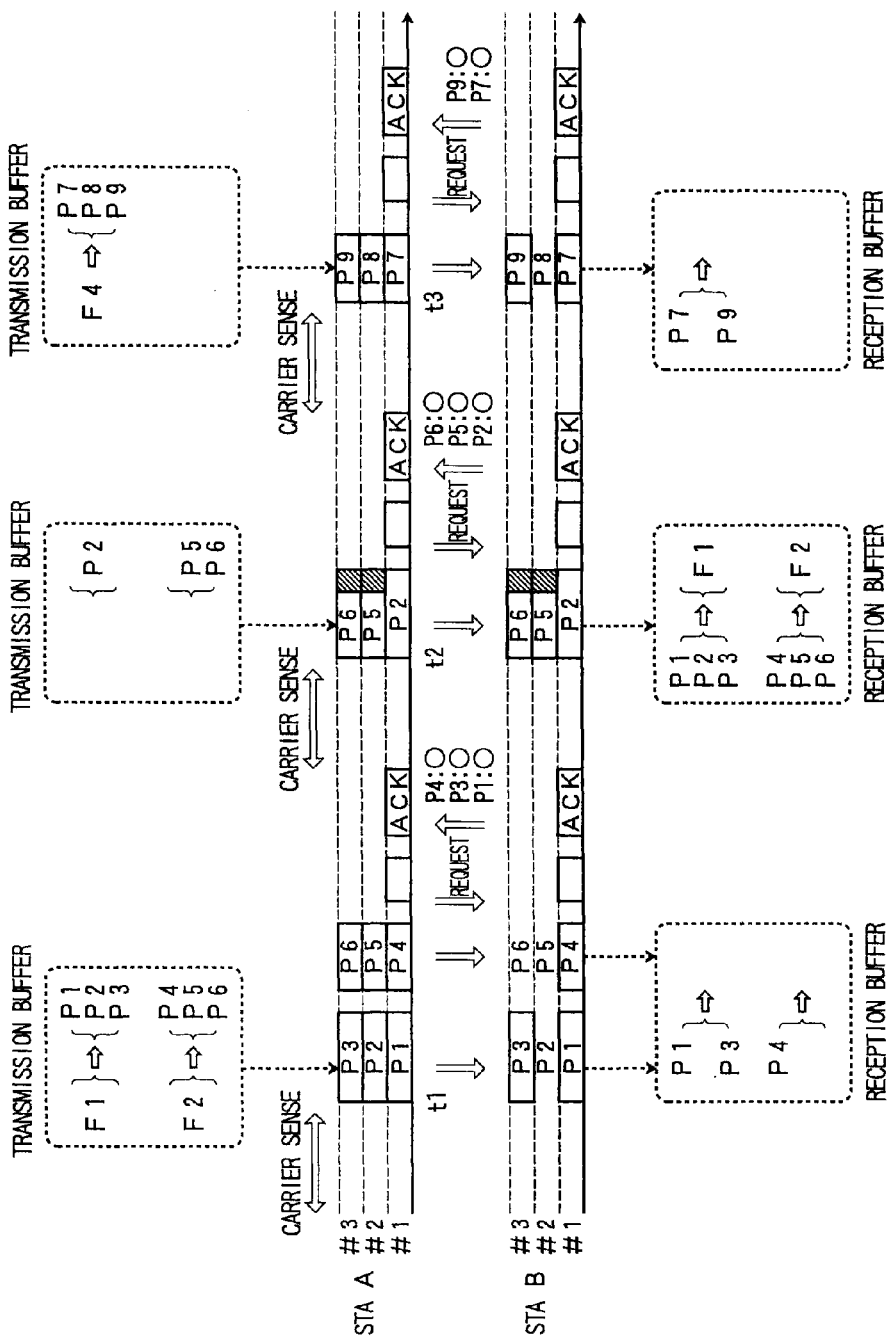
FIG. 32 is a time chart showing an operation example of the example 2 of generating/transmitting/retransmitting the plural data packets in the seventeenth embodiment of the present invention.

FIG. 31 shows an example 2 of generating/transmitting/retransmitting a plurality of data packets in the seventeenth embodiment. FIG. 32 shows an operation example of the example 2 of generating/transmitting/retransmitting the plural data packets in the seventeenth embodiment.

Here, as shown in FIG. 31, a data frame F1 is divided so that three data packets P1, P2, P3 requiring the same time TA for transmission are generated, and a data frame F2 is also divided so that three data packets P4, P5, P6 requiring the same time TB for transmission are generated. However, since the data frames F1, F2 are different in frame size, the transmission times TA and TB of the data packets generated in unit of the simultaneously transmittable number are different (TA>TB). That is, this is a case where, even though the plural data packets requiring the same time for transmission are generated in unit of the simultaneously transmittable number, the transmission time for the plural data packets continuously simultaneously transmitted is different depending on each unit of the simultaneously transmittable number.

When the transmission time for the data packets P1 to P3 generated at one time and the transmission time for the data packets P4 to P6 generated at one time are thus different, the data packet P2 and the data packets P5, P6 which were not-successfully-transmitted are different in the transmission time, and therefore, it is necessary to add a dummy bit at the time of the simultaneously retransmission to the data packets P5, P6 that require a shorter time for transmission, thereby making the data packets P5, P6 and the data packet P2 equal in the transmission time (S425, S426).

[Eighteenth Embodiment]

Figure 33:
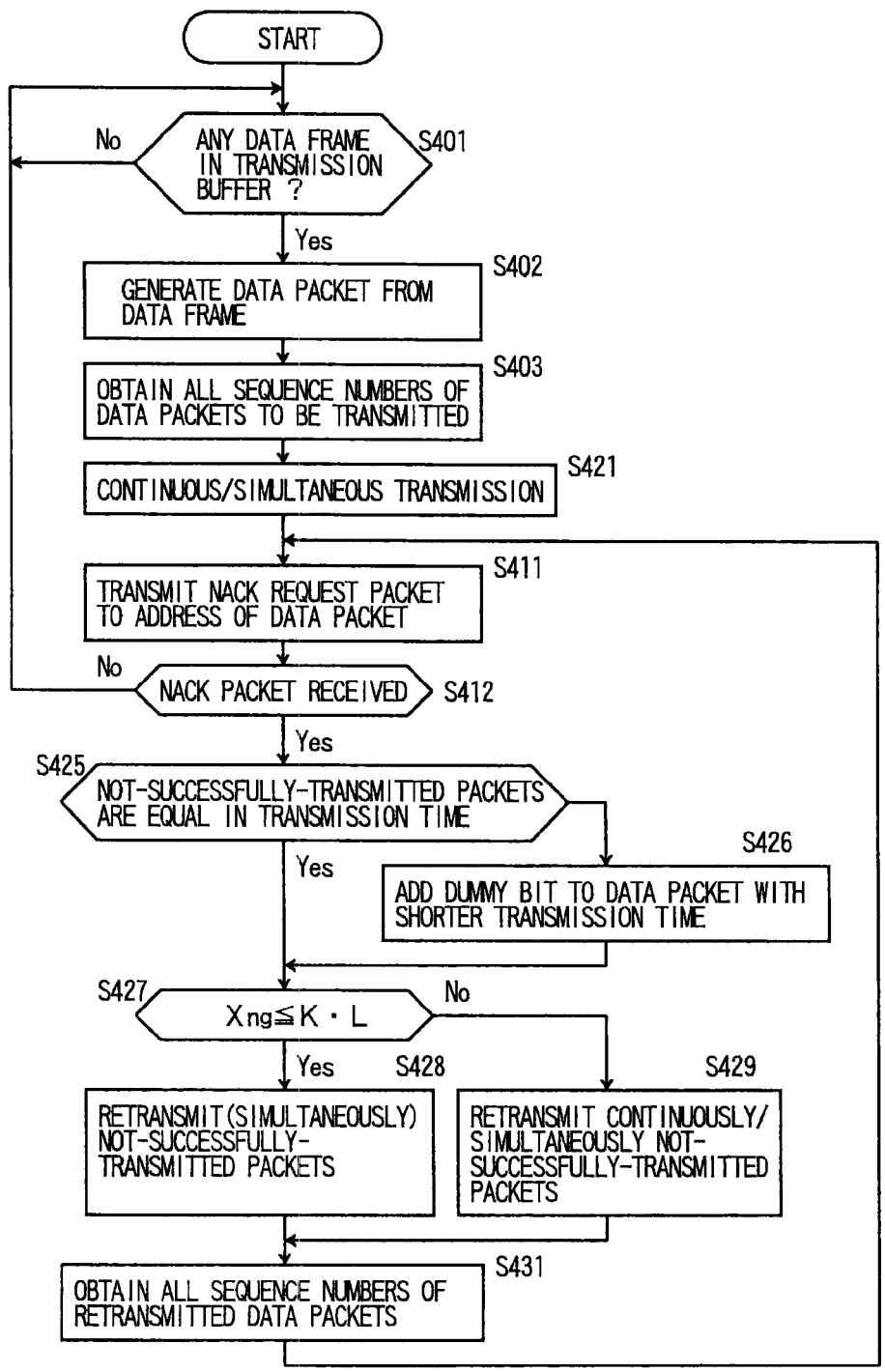
FIG. 33 is a flowchart showing a processing procedure of an eighteenth embodiment of the present invention.
Figure 34:
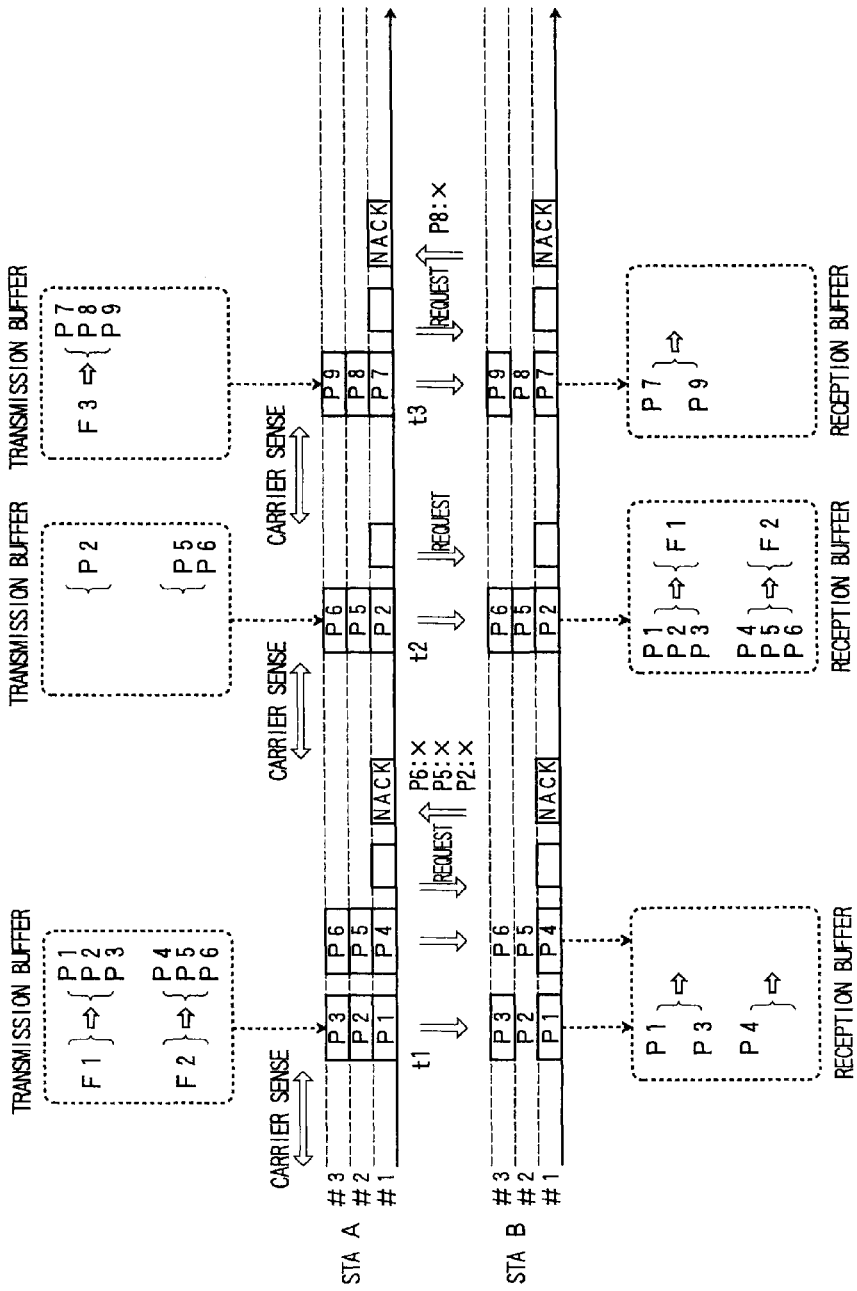
FIG. 34 is a time chart showing an operation example of the eighteenth embodiment of the present invention.

FIG. 33 shows a flowchart of an eighteenth embodiment of the present invention. FIG. 34 shows an operation example of the eighteenth embodiment.

This embodiment is characterized in that, in the seventeenth embodiment, after data packets are transmitted from a transmit-side STA A to a receive-side STA B, the STA A transmits a NACK request packet to the STA B to receive a NACK packet transmitted from the STA B. This NACK request packet includes information on the data packets transmitted from the STA A to the STA B. The STA B does not transmit the NACK packet in response to the NACK request packet when normally receiving the data packets, and when there is any one of the data packets not normally received, it transmits the NACK packet including the information on this data packet in response. Therefore, when the NACK packet does not arrive from the STA B after the transmission of the NACK request packet, the STA A determines that the previously transmitted data packets were successfully transmitted. On the other hand, when receiving the NACK packet, it determines that the transmission of the data packet written therein failed. The other retransmission processing of data packets is the same as that of the seventeenth embodiment.

Note that the operation example shown in FIG. 34 corresponds to the example 1 of generating/transmitting/retransmitting a plurality of data packets shown in FIG. 29 and FIG. 30, but this operation example also applies to the examples 2 of generating/transmitting/retransmitting a plurality of data packets shown in FIG. 31 and FIG. 32.

[Nineteenth Embodiment, Twentieth Embodiment]

Figure 35:
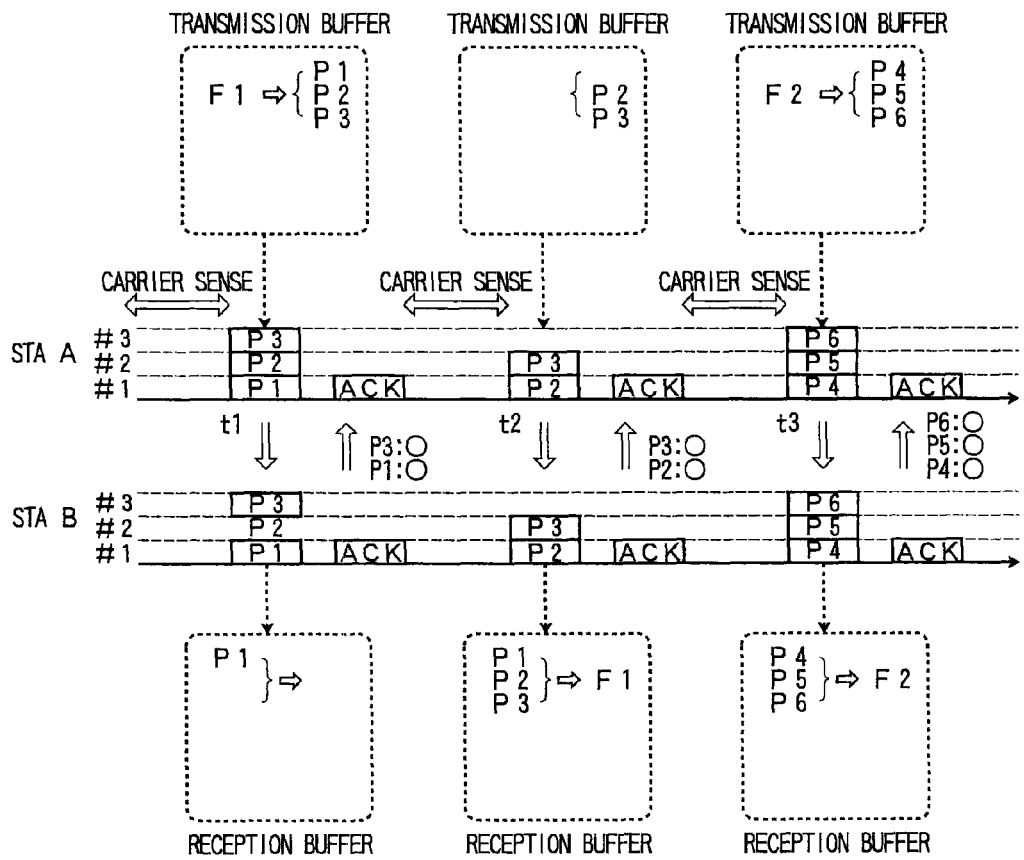
FIG. 35 is a time chart showing an operation example of a nineteenth embodiment of the present invention.
Figure 36:
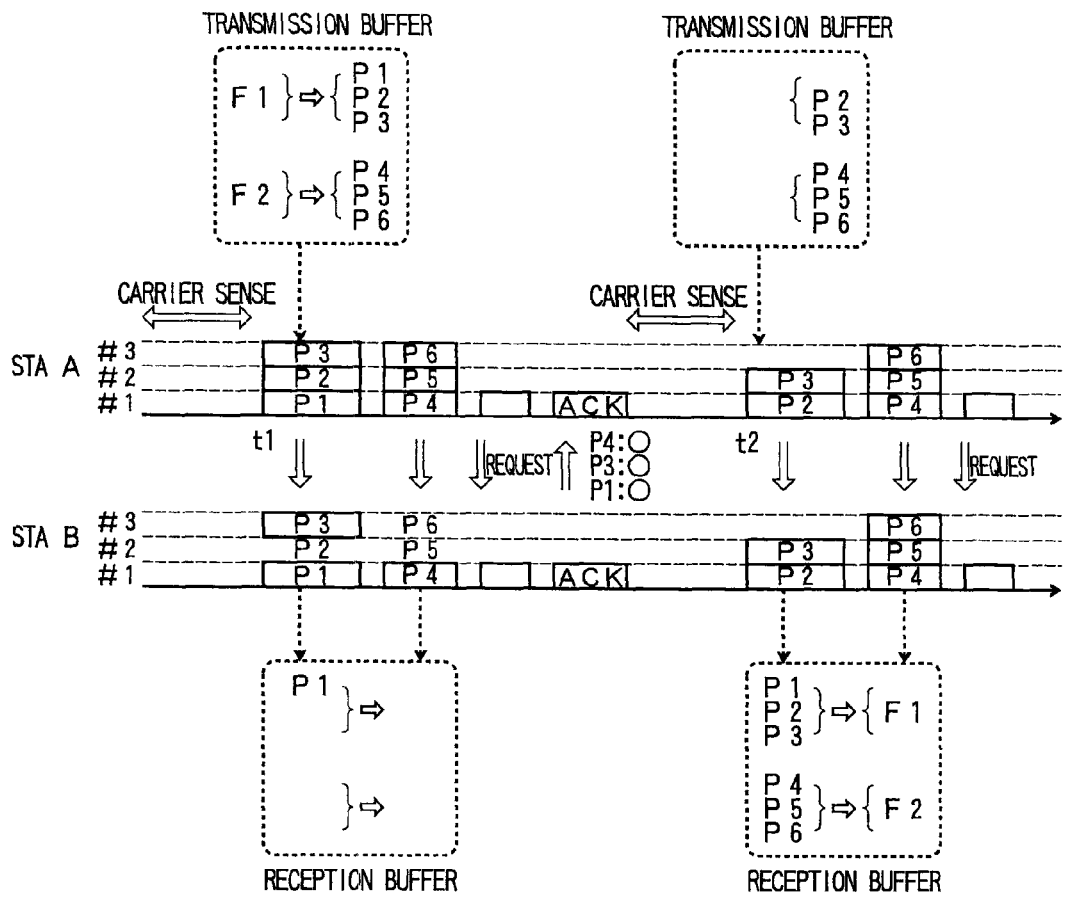
FIG. 36 is a time chart showing an operation example of a twentieth embodiment of the present invention.

FIG. 35 shows an operating example of a nineteenth embodiment of the present invention. FIG. 36 shows an operation example of a twentieth embodiment of the present invention.

The fifteenth embodiment to the eighteenth embodiment show situations where out of the data packets P1 to P3 generated from the data frame F1, the data packets P1, P3 are successfully transmitted and the data packet P2 is retransmitted due to the transmission failure. In this case, the data frame F1 is restored after the data packets P1, P3 arriving first and the data packet P2 arriving later are rearranged in the proper order.

In the nineteenth embodiment, in order to simplify the data frame restoration processing involving the order rearrangement on the receive-side STA in the fifteenth embodiment and the sixteenth embodiment, the processing at Step S407 in FIG. 24 and FIG. 26 is changed such that the data packet with a smallest sequence number among the not-successfully-transmitted data packets and subsequent data packets (P2, P3 here) are retransmitted. This can facilitate the restoration of the data frame F1.

In the twentieth embodiment, in order to simplify the data frame restoration processing involving the rearrangement on the receive-side STA in the seventeenth embodiment and the eighteenth embodiment, the processing at Step S428 and the processing at S429 in FIG. 28 and FIG. 33 are changed such that the data packet with a smallest sequence number among the not-successfully-transmitted data packets and subsequent data packets (P2, P3, P4, P5, P6 here) are retransmitted. Accordingly, the operations of making the data packets equal in the transmission time at Steps S425, S426 are not executed.

Specifically, when the transmission time is different between the data packets P1 to P3 and the data packets P4 to P6 as shown in FIG. 31, the transmission time is also different between the data packets P2 to P3 and the data packets P4-P6 which are to be retransmitted. Therefore, instead of executing the operation of making the data packets equal in the transmission time, the data packets P2 to P3 and the data packets P4 to P6 are continuously simultaneously transmitted. This can facilitate restoring the data frames F1, F2.

[Structure of Data Packet]

Figure 37:
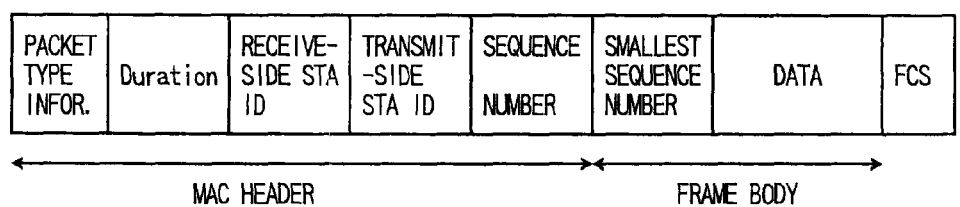
FIG. 37 is a view showing a structure of a data packet.

FIG. 37 shows a structure of a data packet. The data packet is composed of packet type information, identification information (ID) of a destination STA, identification information (ID) of a transmit-side STA, a sequence number assigned to discriminate each of a plurality of simultaneously transmitted data packets, the smallest sequence number among the sequence numbers of the plural data packets simultaneously transmitted, a data portion, and a FCS field.

[Structures of Extended-type ACK Packet]

Figure 38:
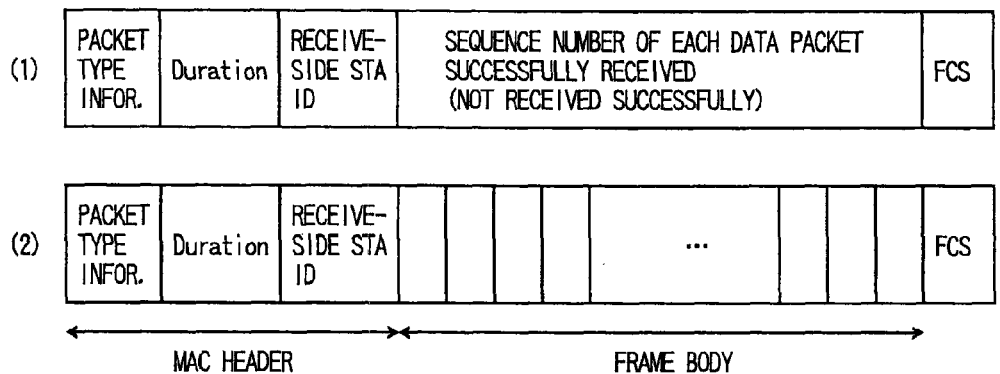
FIG. 38 are views showing structures of extension-type ACK packets.

FIG. 38 show structures of extended-type ACK packets. The extended-type ACK packet is intended for collectively transmitting information on the ratio of the successful transmissions to the total transmissions in the past for each simultaneously transmitted data packet as shown in FIG. 25 and so on, and this applies also to the extension-type NACK packet shown in FIG. 27 and so on.

The ACK packet in an example (1) is composed of packet identification information, identification information (ID) of a destination STA (data packet transmit-side STA), sequence numbers of successfully received data packets, and a FCS field. In the ACK packet in an example (2), instead of writing the sequence numbers of the successfully received data packets, a bit map is prepared, and bits corresponding to the sequence numbers of the data packets are given values according to reception successes/failures, thereby expressing reception successes of the packets. Note that the head bit of the bit map corresponds to the data packet with the smallest sequence number among the plural data packets simultaneously transmitted.

[Structures of Extended-type ACK Request Packet]

Figure 39:
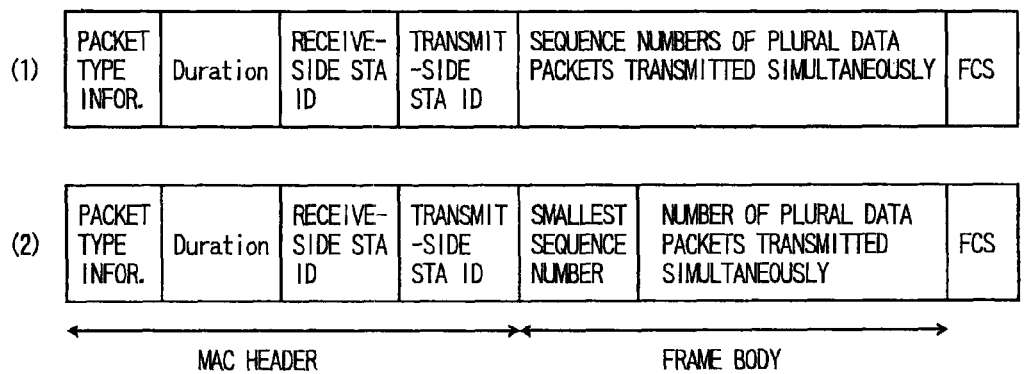
FIG. 39 are views showing structures of extension-type ACK request packets.

FIG. 39 show structures of extension-type ACK request packets. The extension-type ACK request packet is intended for collectively transmitting information requesting reception successes/failures of a plurality of data packets which are simultaneously transmitted as shown in FIG. 30 and so on, and this also applies to the extension-type NACK request packet shown in FIG. 27 and so on.

The ACK request packet in an example (1) is composed of packet classification information, identification information (ID) of a destination STA (data packet destination STA), identification information (ID) of a transmit-side STA (data packet transmit-side STA), sequence numbers of all simultaneously transmitted data packets, and a FCS field. In the ACK request packet in an example (2), instead of writing the sequence numbers of all the simultaneously transmitted data packets, the smallest sequence number among the sequence numbers of the simultaneously transmitted data packets and the number of the simultaneously transmitted data packets are written.

[Twenty-First Embodiment]

Figure 40:
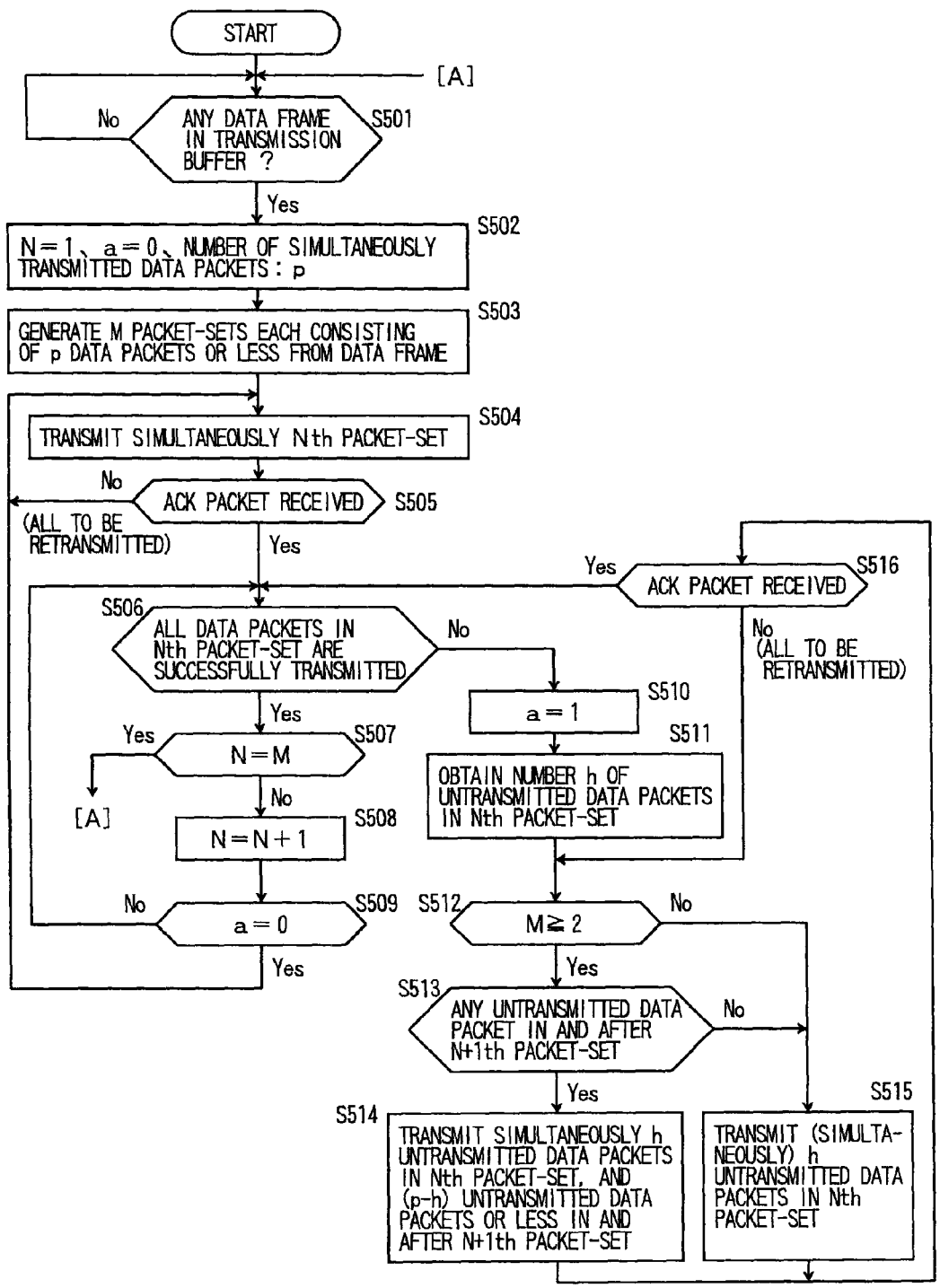
FIG. 40 is a flowchart showing a processing procedure of a twenty-first embodiment of the present invention.
Figure 41:
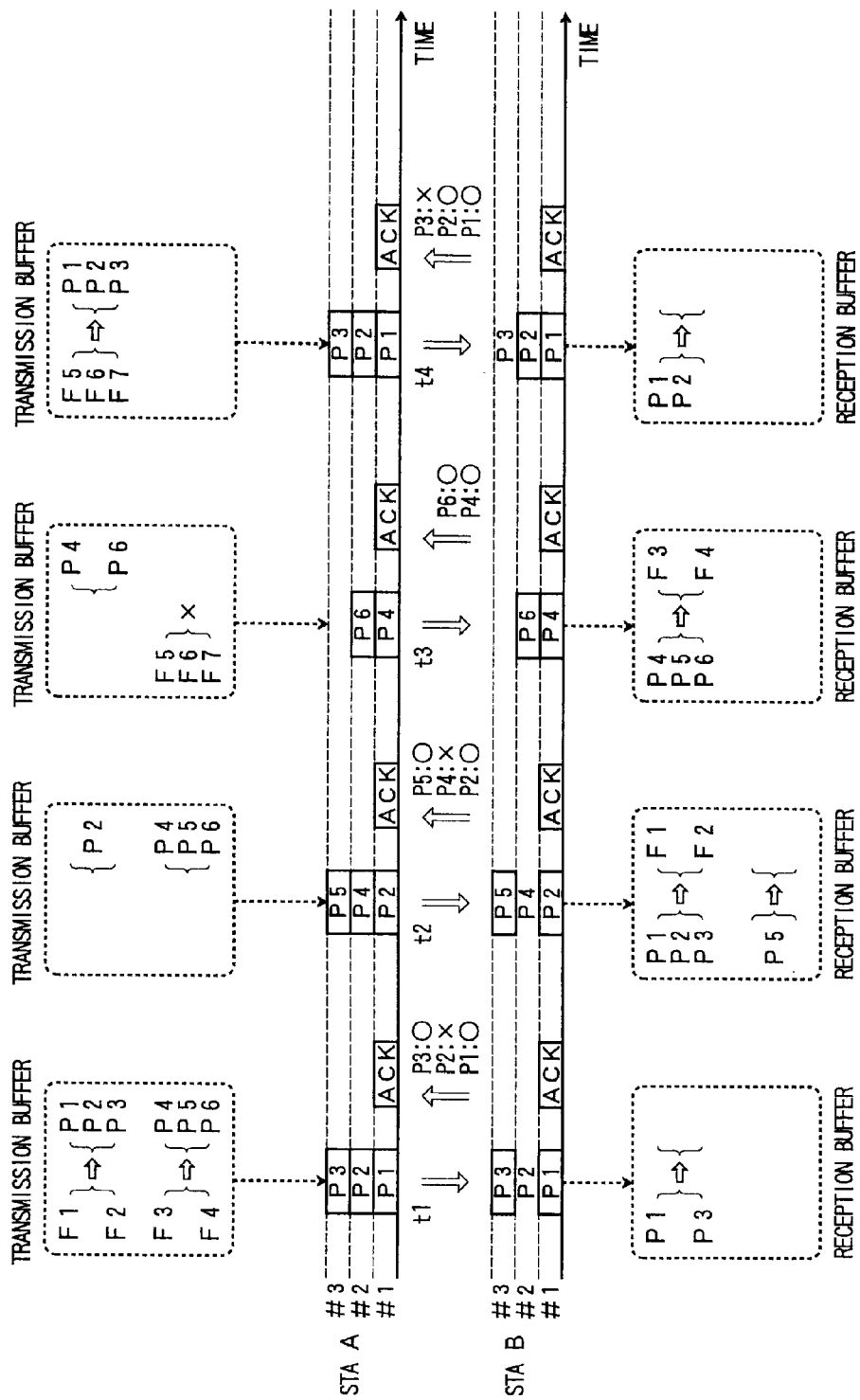
FIG. 41 is a time chart showing an operation example of the twenty-first embodiment of the present invention.

FIG. 40 shows a flowchart of a twenty-first embodiment of the present invention. FIG. 41 shows an operation example of the twenty-first embodiment of the present invention. It is assumed here that wireless channels #1, #2, #3 are prepared and the number p (=3) of simultaneously transmittable data packets does not change at transmission timings t1, t2, t3, t4 obtained by carrier sense. Further, when data packets are generated from a data frame, a packet-set consisting of p pieces of data packets or less is defined as a unit, the number of packet-sets generated at one time is defined as M, and a sequence number N is assigned to each packet-set, in addition to a sequence number of each data packet.

When data frames arrive in a transmission buffer, a transmit-side STA generates M packet-sets each consisting of p pieces of data packets or less (S501 to S503). At the transmission timing t1 shown in FIG. 41, data packets P1, P2, P3 are generated as a first packet-set from data frames F1, F2 and data packets P4, P5, P6 are generated as a second packet-set from data frames F3, F4, which means that totally two packet-sets (M=2) are generated. The data packets are equal in packet time length. Note that it is only necessary that the data packets are generated in unit of a packet-set, and the number of corresponding data frames may be any.

At the transmission timing t1, the first (N=1) packet-set (data packets P1 to P3) is simultaneously transmitted (S504). Thereafter, transmission successes/failures of all the data packets in the first packet-set are confirmed by an ACK packet from a receive-side STA (S505, S506). In the example shown in FIG. 41, the successful data packet transmissions to the total transmissions in the past is written in one ACK packet, which is transmitted by return using one wireless channel (#1 here).

When a failure of transmission of the data packet P2 is confirmed by this ACK packet, the number h (1 here) of untransmitted data packets in the first (Nth) packet-set is obtained (S506, S510, S511). Note that the "untransmitted data packet" means both a data packet whose transmission has not been completed due to a transmission failure and a transmission-standby data packet. The meaning of a flag a at S510 will be described later. Then, when the number M of the packet-sets simultaneously generated is 2 or more, it is determined whether or not there is any untransmitted data packet in and after the second (N+1th) packet-set (S512, S513), and when there is any untransmitted data packet, h pieces of the untransmitted data packets in the first packet-set (not-successfully-transmitted data packet P2) and (p−h) pieces of untransmitted data packets or less (P4, P5) selected from the second and subsequent packet-sets are simultaneously transmitted at the next transmission timing t2 (S514). Note that the data packet P2 and the data packets P4, P5 are generated at the same generation timing and thus have the same packet time length, so that no problem occurs even when they are simultaneously transmitted.

Thereafter, transmission successes/failures of all the data packets in the first (Nth) packet-set are confirmed by an ACK packet from a receive-side STA (S516, S506). If a transmission success of the data packet P2 is confirmed by this ACK packet, this means that a transmission success of the first (Nth) packet-set (P1 to P3) is confirmed. Then, the sequence number N of the packet-set is incremented until transmission successes of all the packet-sets are confirmed (S506, S507, S508), and the flow shifts to the processing of the second (N+1th) packet-set. The receive-side STA restores the data frames F1, F2 when the data packets P1, P2, P3 are all received.

Here, regarding the first (Nth) packet-set whose data packets are all successfully transmitted, it is determined by using the flag a whether they are successfully transmitted simultaneously or are successfully transmitted by the retransmission and the simultaneous transmission with data packets in another packet-set (S509, S510). Specifically, when the data packets in the first (Nth) packet-set are successfully transmitted simultaneously, a=0 is maintained, so that the simultaneous transmission of the second (N+1th) packet-set is immediately started (S509, S504). On the other hand, when part of the data packets in the first (Nth) packet-set is to be retransmitted, a=1 is set at S510, and the part of the data packets is simultaneously transmitted with untransmitted data packets in and after the second (N+1th) packet-set. Thereafter, when all the data packets in the first (Nth) packet-set are successfully transmitted, part or all of the data packets in the second (N+1th) packet-set have been already transmitted. Therefore, the flow returns from S509 to S506, where transmission successes/failures of all the data packets in the second (N+1th) packet-set are determined, and if there is still any untransmitted data packet, the same processing is repeated while data packets in and after the third (N+2th) packet-set are combined.

In the example shown in FIG. 41, after the data packet P2 and the data packets P4, P5 are simultaneously transmitted at the transmission timing t2, the transmission of the first packet-set is completed because the data packet P2 is successfully transmitted. On the other hand, since the data packet P4 is not successfully transmitted, the flow shifts from S506 to S511 for the second packet-set, and the number h (2 here) of the untransmitted data packets in the second packet-set is calculated. Further, since the number M of the generated packet-sets is 2 and thus there is no third and subsequent packet-sets, the two untransmitted data packets (P4, P6) in the second packet-set are selected to be simultaneously transmitted at the next transmission timing t3 (S513, S515). Note that, when the number of packet-sets simultaneously generated is 1 (M=1), the processing flows from S512 to S515. Further, at the transmission timing t3, though data frames F5, F6, F7 have arrived in the transmission buffer, data packets are not generated until the transmission of the two packet-sets first generated is completed.

Thereafter, when transmission successes of all the data packets in the second packet-set are confirmed by an ACK packet from the receive-side STA, transmission successes of all the packet-sets first generated are confirmed (N=M), and therefore, the flow returns from S507 to S501. Consequently, at the transmission timing t4, data packets P1, P2, P3 are newly generated as one (M=1) packet-set from the data frames F5, F6, F7. Note that the data packets P1 to P6 generated at the transmission timing t1 and the data packets P1 to P3 generated at the transmission timing t4 are independent from each other and generally have different packet time lengths.

Further, when the ACK packet cannot be received in the processing at S505 and S516, all the data packets previously transmitted are to be retransmitted, and therefore, the flow returns to the processing at and after S504 or at and after S512 respectively.

[Twenty-second Embodiment]

Figure 42:
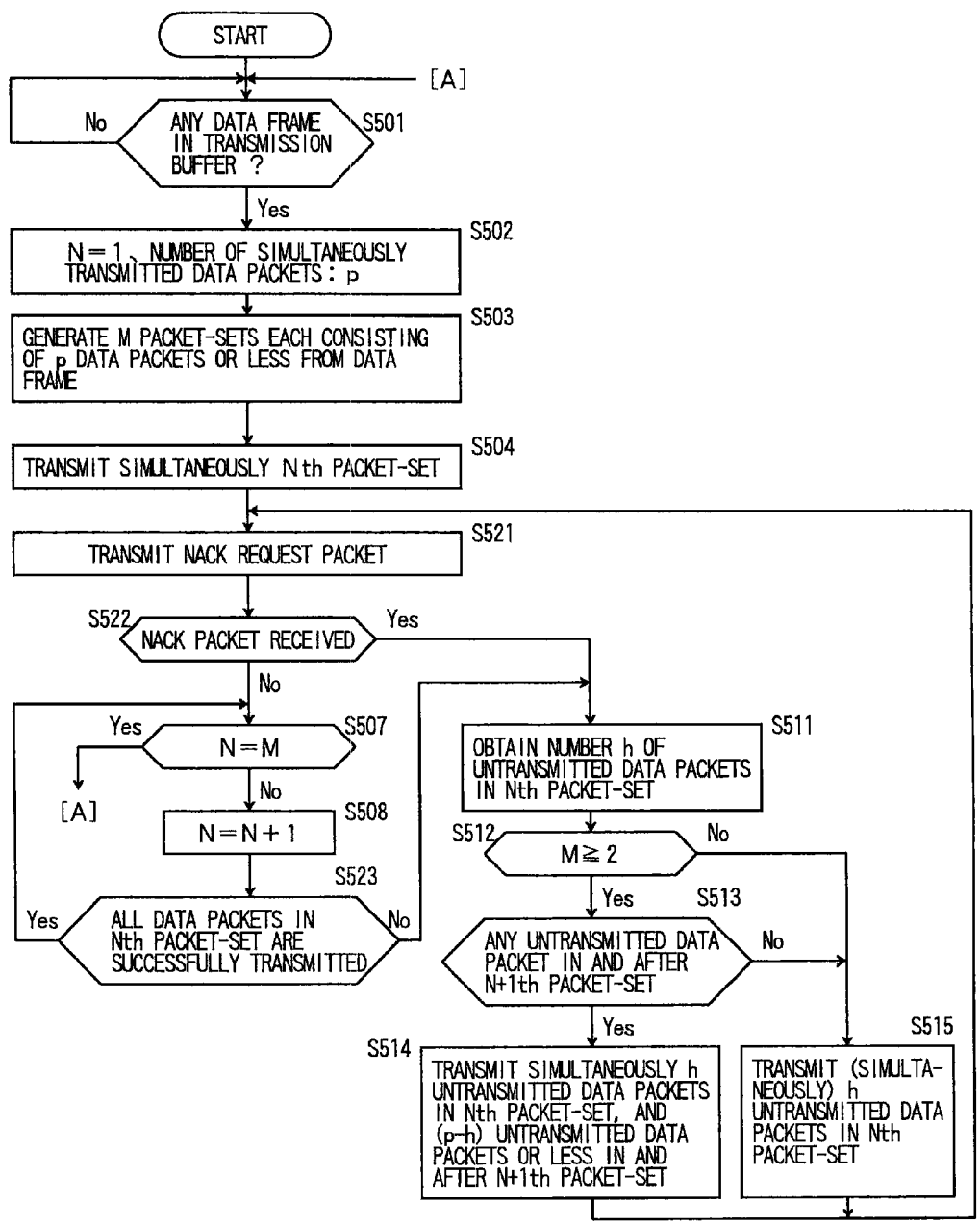
FIG. 42 is a flowchart showing a processing procedure of a twenty-second embodiment of the present invention.
Figure 43:
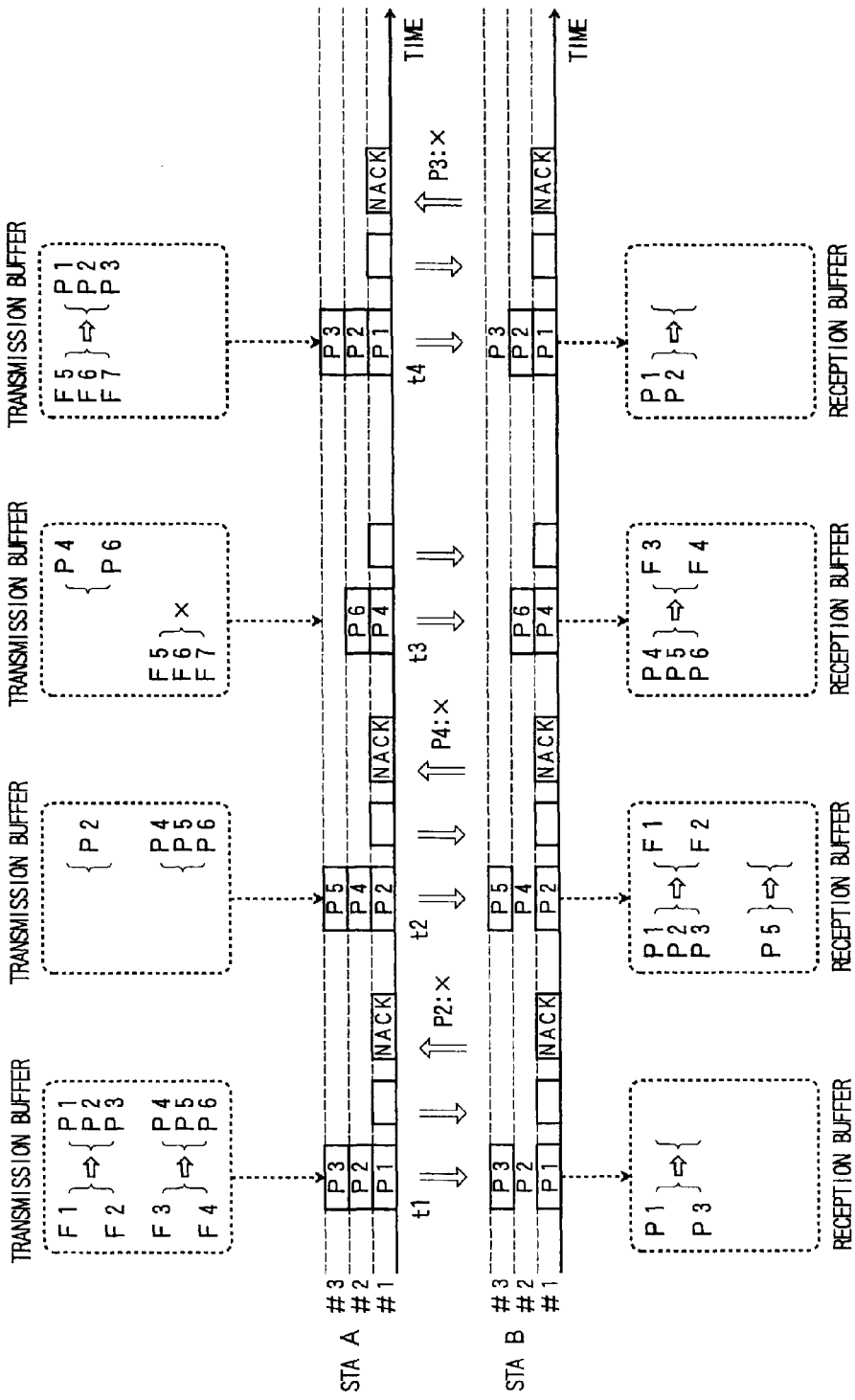
FIG. 43 is a time chart showing an operation example of the twenty-second embodiment of the present invention.

FIG. 42 shows a flowchart of a twenty-second embodiment of the present invention. FIG. 43 shows an operation example of the twenty-second embodiment of the present invention.

This embodiment is characterized in that, after data packets are transmitted from a transmit-side STA A to a receive-side STA B, the STA A transmits a NACK request packet to the STA B and receives a NACK packet transmitted from the STA B. When normally receiving the data packets, the STA B does not transmit the NACK packet in response to the NACK request packet, and when not normally receiving the data packets, it transmits the NACK packet to that effect in response. Therefore, the STA A determines that the data packets previously transmitted have been successfully transmitted when the NACK packet does not arrive from the STA B after the transmission of the NACK request packet. On the other hand, when receiving the NACK packet, it determines that the data packet written therein was not successfully transmitted. The other retransmission processing of data packets is the same as that of the twenty-first embodiment.

When data frames arrive in a transmission buffer, the transmit-side STA generates M packet-sets each consisting of p pieces of data packets or less (S501 to S503). At a transmission timing t1 shown in FIG. 43, data packets P1, P2, P3 are generated as a first packet-set from data frames F1, F2, and data packets P4, P5, P6 are generated as a second packet-set from data frames F3, F4, which means totally two (M=2) packet-sets are generated.

At the transmission timing t1, the first (N=1) packet-set (the data packets P1 to P3) is simultaneously transmitted (S504) and the NACK request packet is transmitted (S521). Thereafter, a transmission success/failure of the first packet-set is confirmed by the NACK packet NACK from the receive-side STA (S522). The example shown in FIG. 43 shows a case where one wireless channel (#1 here) is used for transmission/reception of the NACK request packet and the corresponding NACK packet NACK, and information on a not-successfully-transmitted data packet is written in the NACK packet NACK.

When a failure of transmission of the data packet P2 is confirmed by the NACK packet NACK, the number h (1 here) of the untransmitted data packets in the first (Nth) packet-set is obtained (S511). Then, when the number M of the packet-sets simultaneously generated is 2 or more, it is determined whether or not there is any untransmitted data packet in and after the second (N+1th) packet-set (S512, S513), and if there is any untransmitted data packet, the one untransmitted data packet in the first packet-set (the not-successfully-transmitted data packet P2) and (p−h) pieces of untransmitted data packets or less (P4, P5) selected from the second packet-set are simultaneously transmitted at a next transmission timing t2 (S514), and the NACK request packet is transmitted (S521).

Here, part of the data packets in the first packet-set is retransmitted, and part or all of the untransmitted data packets in and after the second (N+1th) packet-set are simultaneously transmitted together. When the NACK packet NACK is not received at S522, this indicates that all of these data packets are successfully transmitted and therefore, a transmission success of the first (Nth) packet-set (P1 to P3) is confirmed. Meanwhile, as for the second (N+1th) packet-set and subsequent packet-set, the sequence number N of the packet-set is incremented until transmission successes of all the packet-sets are confirmed (S522, S507, S508, S523). At S523, transmission successes/failures of all the data packets in the second (N+1th) packet-set is determined, and if there is still any untransmitted data packet, the same processing is repeated while data packets in and after the third (N+2nd) packet-set are combined.

In the example shown in FIG. 43, after the simultaneous transmission of the data packet P2 and the data packets P4, P5 at the transmission timing t2, the transmission of the first packet-set is completed since the data packet P2 is successfully transmitted. Meanwhile, since the data packet P4 is not successfully transmitted, the flow for the second packet-set shifts from S523 to S511, where the number h (2 here) of the untransmitted data packets in the second packet-set is calculated. Further, since the number M of the generated packet-sets is 2 and there is no third or subsequent packet-set, the two untransmitted data packets (P4, P6) in the second packet-set is selected to be simultaneously transmitted at a next transmission timing t3 (S513, S515). When the number of packet-sets simultaneously generated is 1 (M=1), the processing shifts from S512 to S515. Further, at the transmission timing t3, though data frames F5, F6, F7 have arrived in the transmission buffer, data packets are not generated until the transmission of the two packet-sets first generated is completed.

Thereafter, when transmission successes of all the data packets in the second packet-set are confirmed according to non-input of the NACK packet NACK from the receive-side STA, transmission successes of all the packet-sets first generated are confirmed (N=M), and therefore, the flow returns from S507 to S501. Consequently, at a transmission timing t4, data packets P1, P2, P3 are newly generated as one (M=1) packet-set from the data frames F5, F6, F7.

[Twenty-Third Embodiment]

A twenty-third embodiment is structured such that at Step S503 where packet-sets are generated from data frames in the twenty-first embodiment and the twenty-second embodiment, an upper limit value is set for the number M of packet-sets simultaneously generatable, and a surplus packet-set over the upper limit value is not generated. Then, a data frame not used for generating the packet-set is kept for a next packet-set generation.

Further, at Step S503 where packet-sets are generated from data frames in the twenty-first embodiment and the twenty-second embodiment, when the number F of data frames used for generating M packet-sets exceeds an upper limit value, the packet-set generation from a surplus data frame over the upper limit value is suspended. Then, a data frame not used for generating the packet-set is kept for a next packet-set generation.

[Twenty-Fourth Embodiment]

Figure 44:
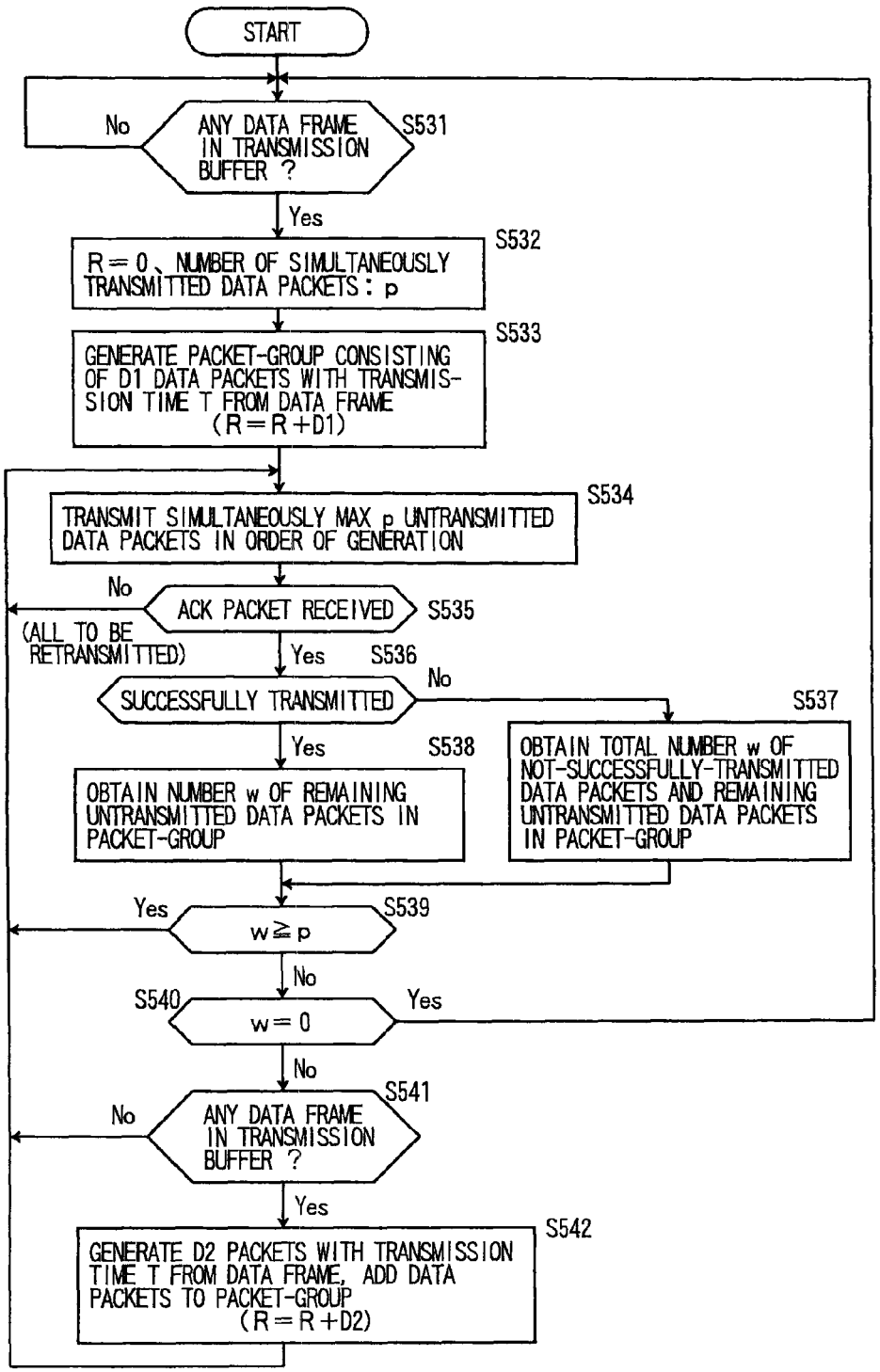
FIG. 44 is a flowchart showing a processing procedure of a twenty-fourth embodiment of the present invention.
Figure 45:
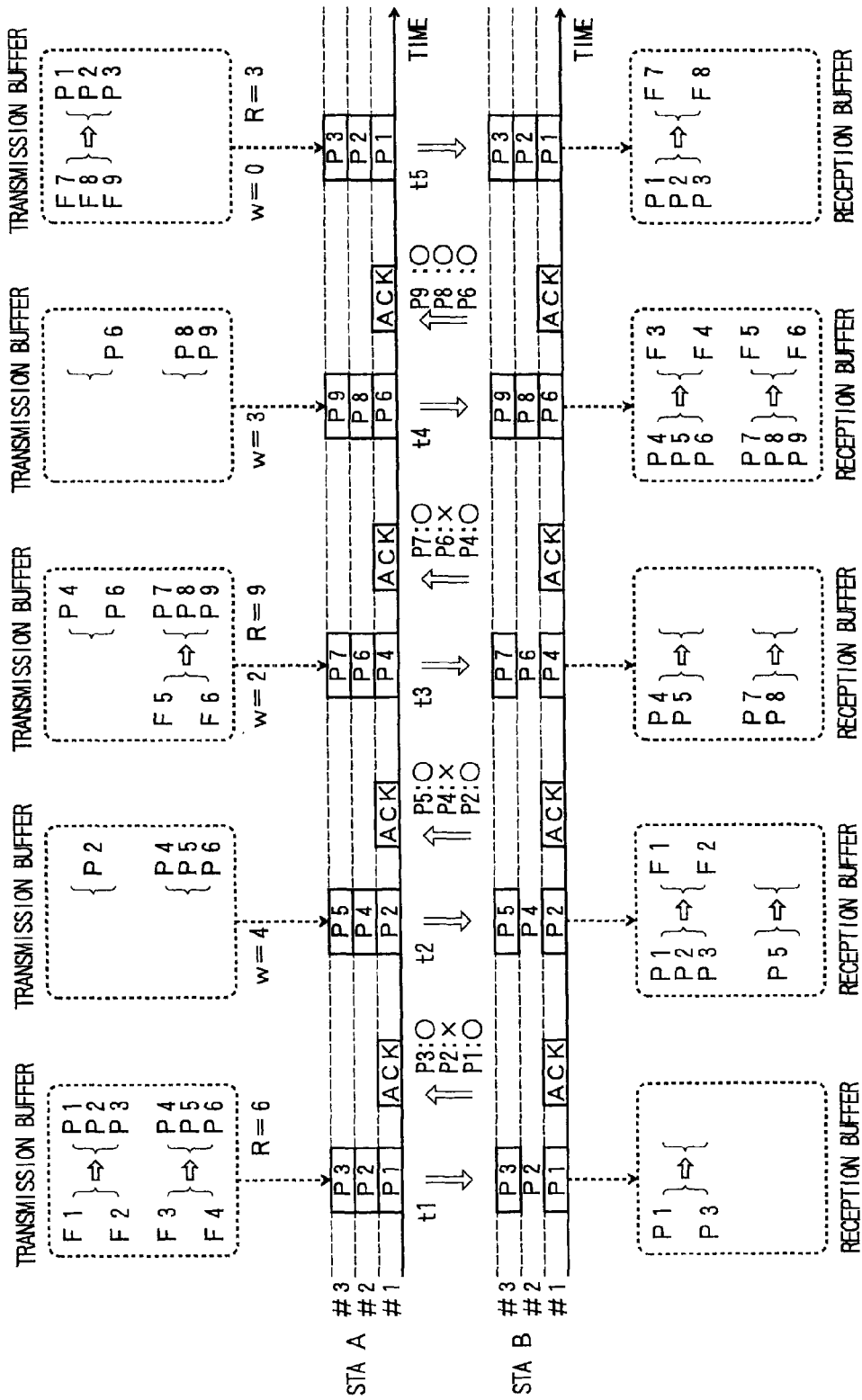
FIG. 45 is a time chart showing an operation example of the twenty-fourth embodiment of the present invention.

FIG. 44 shows a flowchart of a twenty-fourth embodiment of the present invention. FIG. 45 shows an operation example of the twenty-fourth embodiment of the present invention. It is assumed here that wireless channels #1, #2, #3 are prepared and the number p (=3) of simultaneously transmittable data packets does not change at transmission timings t1, t2, t3, t4, t5 obtained by carrier sense. Further, D pieces (D1 pieces, D2 pieces, . . . ) of data packets generated from data frames at one time are defined as a packet-group, and the cumulative number of data packets constituting the packet-group is defined as R. However, the cumulative number R in this embodiment may be any and is not directly involved in the control. Further, sequence numbers are assigned to the data packets constituting the packet-group in the order of generation, and they are subjected to transmission processing in the order of generation.

When data frames arrive in a transmission buffer, a transmit-side STA generates data packets each of which requires a time T for transmission, and D1 pieces of the generated data packets are defined as a packet-group (S531 to S533). At the transmission timing t1 shown in FIG. 45, data packets P1, P2, P3 are generated from data frames F1, F2 and data packets P4, P5, P6 are generated from data frames F3, F4, which means that a group of totally 6 (R=6) data packets are generated. The transmission time for each of the data packets is T. Note that the number of data frames used for generating the packet-group may be any.

At the transmission timing t1, the maximum of p pieces of the data packets (P1 to P3) out of the packet-group are simultaneously transmitted in the order of generation (S534). Thereafter, the data packet transmission successes/failures are confirmed by an ACK packet from a receive-side STA (S535, S536). In the example shown in FIG. 45, information on the ratio of the successful simultaneous data packet transmissions to the total transmissions in the past is written in one ACK packet, which is transmitted by return using one wireless channel (#1 here).

When a failure of transmission of the data packet P2 is confirmed by this ACK packet, the total number w (4 here) of the untransmitted data packets which were not successfully transmitted and the remaining untransmitted data packets in the packet-group is obtained (S536, S537). On the other hand, if there is no transmission failure, only the number w of the remaining untransmitted data packets in the packet-group is obtained (S536, S538). This number w and the simultaneously transmittable number p are compared, and if w≥p, the maximum of p pieces of the untransmitted data packets out of the packet-group are simultaneously transmitted in the order of generation (S539, S534). In the example shown in FIG. 45, the not-successfully-transmitted data packet P2 and the untransmitted data packets P4, P5 are simultaneously transmitted at the next transmission timing t2.

Thereafter, the data packet transmission successes/failures are confirmed by an ACK packet from the receive-side STA (S535, S536). Here, when the number w of the untransmitted data packets in the packet-group becomes smaller than the simultaneously transmittable number p (S537, S538, S539), some wireless channel usable for simultaneous transmission becomes idle, and therefore, if not w=0, new data packets are generated (S540, S541, S542). Specifically, it is determined whether or not the transmission buffer has any data frame (S541), and if there is any data frame therein, data packets each requiring the time T for transmission similarly to those generated first are generated, D2 pieces of the generated data packets are added to the packet-group (S542), and the maximum of p pieces of the data packets are simultaneously transmitted in the order of generation (S534). At this time, the cumulative number R in the packet-group becomes D1+D2. Further, when there is no data frame in the transmission buffer, the maximum of p pieces (w pieces) of data packets are simultaneously transmitted in the order of generation (S541, S534). On the other hand, when the number w of the untransmitted data packets in the packet-group is 0, the flow returns from S540 to S531, where data packets are newly generated from a data frame.

In the example shown in FIG. 45, the transmission of the data packet P4 out of the data packets P2, P4, P5 transmitted at the transmission timing t2 fails, so that the number w of the untransmitted data packets becomes 2 (w<p), namely, the data packets P4, P6. Meanwhile, when receiving all the data packets P1 to P3, the receive-side STA restores the data frames F1, F2. At the next transmission timing t3, data packets P7, P8, P9 each requiring the time T for transmission are generated from data frames F5, F6 and they are added to the packet-group, so that the cumulative number R becomes 9.

Further, when a failure of transmission of the data packet P6 is confirmed by an ACK packet from the receive-side STA after the simultaneous transmission of the data packets P4, P6 and the data packet P7 at the transmission timing t3, the number w of the untransmitted data packets becomes 3, namely, the data packets P6, P8, P9. The data packet P6 and the data packets P8, P9 are simultaneously transmitted at the next transmission timing t4, and when transmission successes thereof are confirmed and there remains no untransmitted data packet in the packet-group (w=0), the flow returns to the initial state (S531). Meanwhile, the receive-side STA restores the data frames F3, F4 from the data packets P4 to P6 and restores the data frames F5, F6 from the data packets P7 to P9. Then, at the transmission timing t5, data packets P1, P2, P3 each requiring the time T for transmission are newly generated from data frames F7, F8, F9. Note that the data packets P1 to P6 generated at the transmission timing t1 and the data packets P1 to P3 generated at the transmission timing t5 are independent from each other and are generally different in the transmission time T.

Further, when the ACK packet cannot be received in the processing at S535, all the data packets previously transmitted are to be retransmitted, so that the flow returns to the processing at and after S534.

[Twenty-Fifth Embodiment]

Figure 46:
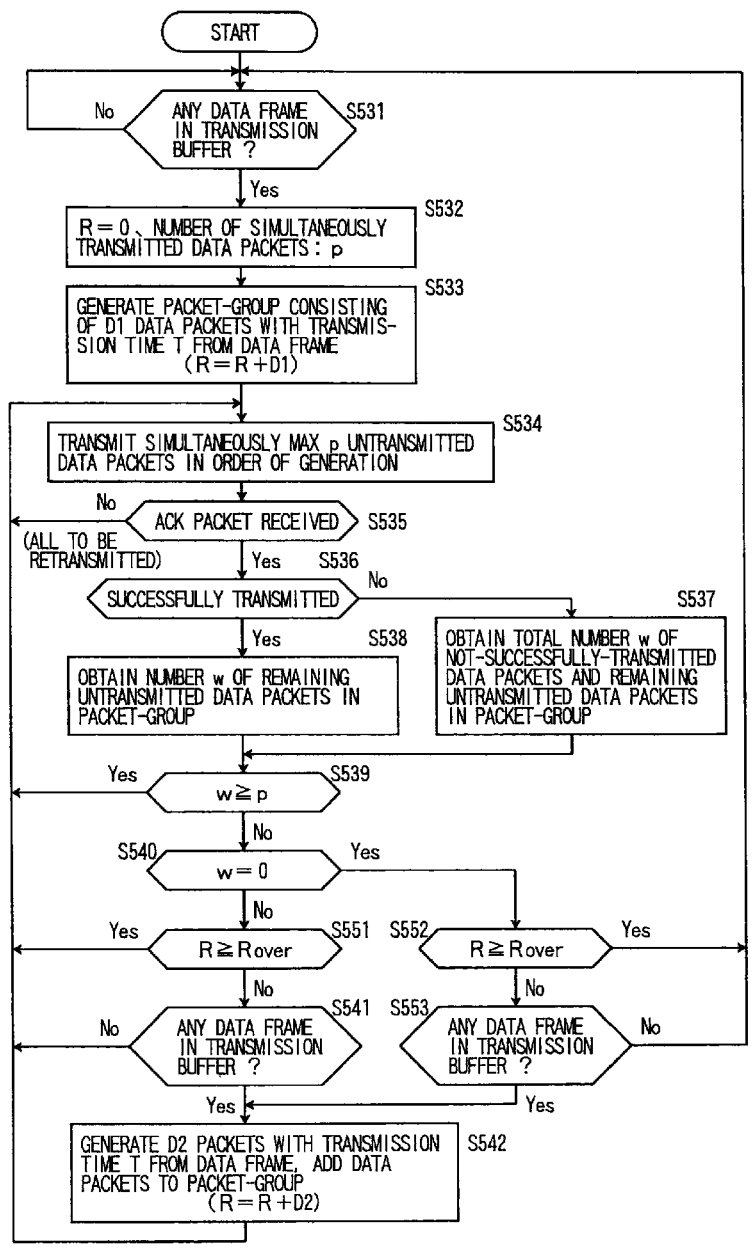
FIG. 46 is a flowchart showing a processing procedure of a twenty-fifth embodiment of the present invention.
Figure 47:
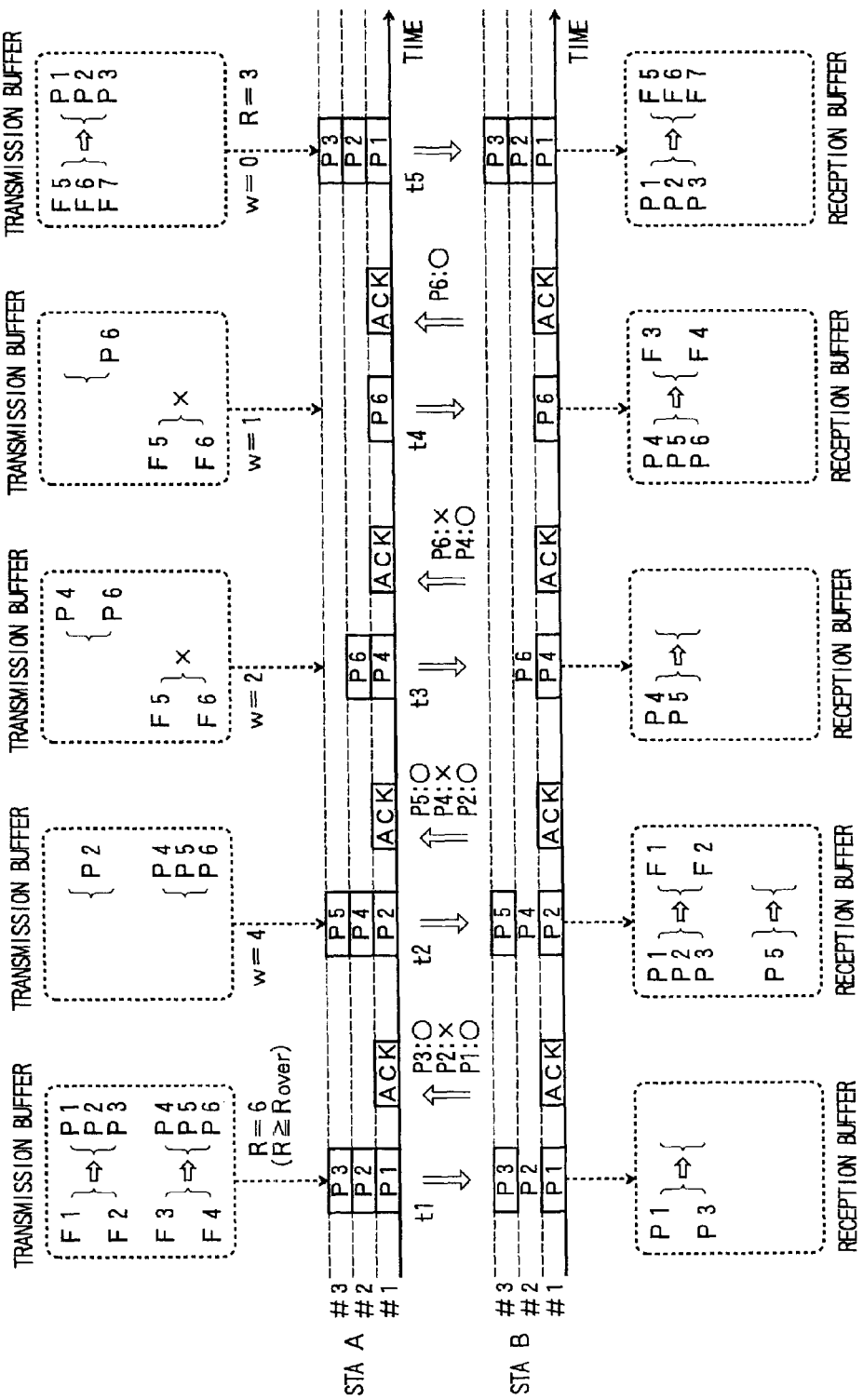
FIG. 47 is a time chart showing an operation example of the twenty-fifth embodiment of the present invention.
Figure 50:
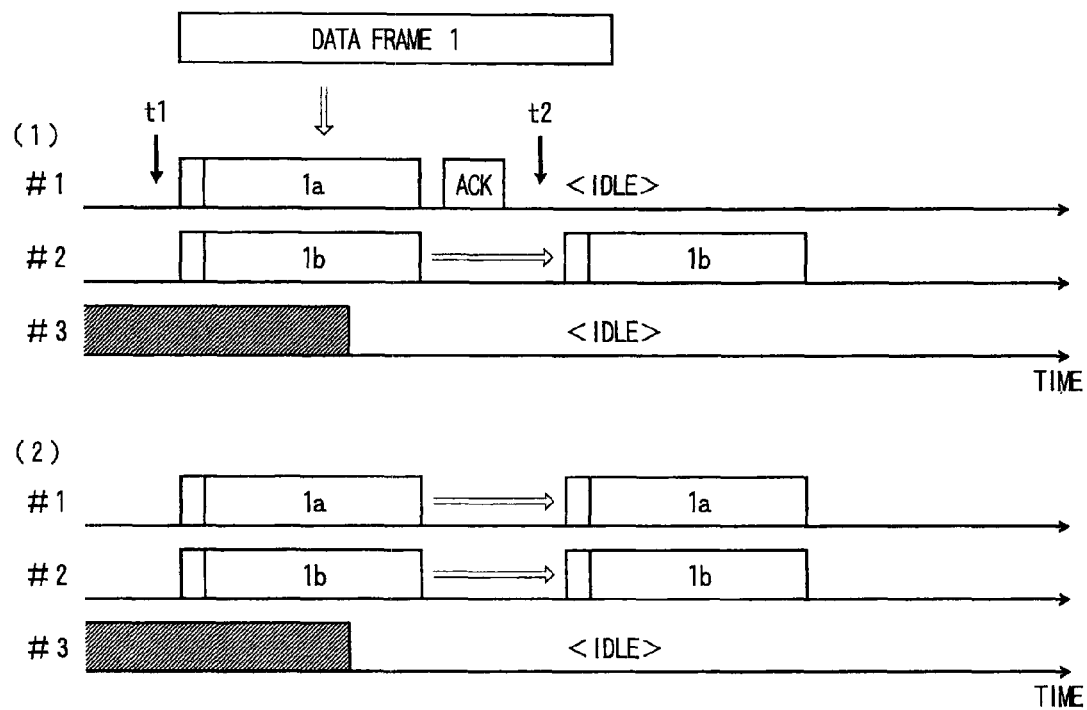
FIG. 50 are time charts to explain a problem 1 at the time of retransmission (when the number of wireless channels increases)
Figure 51:
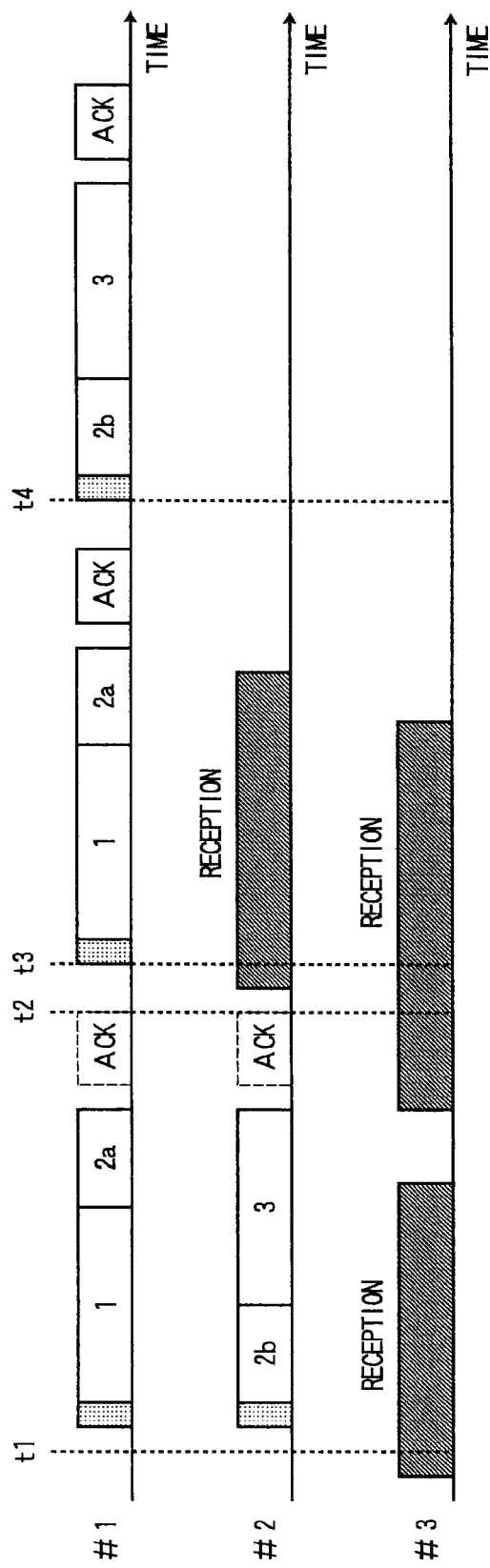
FIG. 51 is a time chart to explain a problem 1 at the time of retransmission (when the number of wireless channels decreases)
Figure 52:
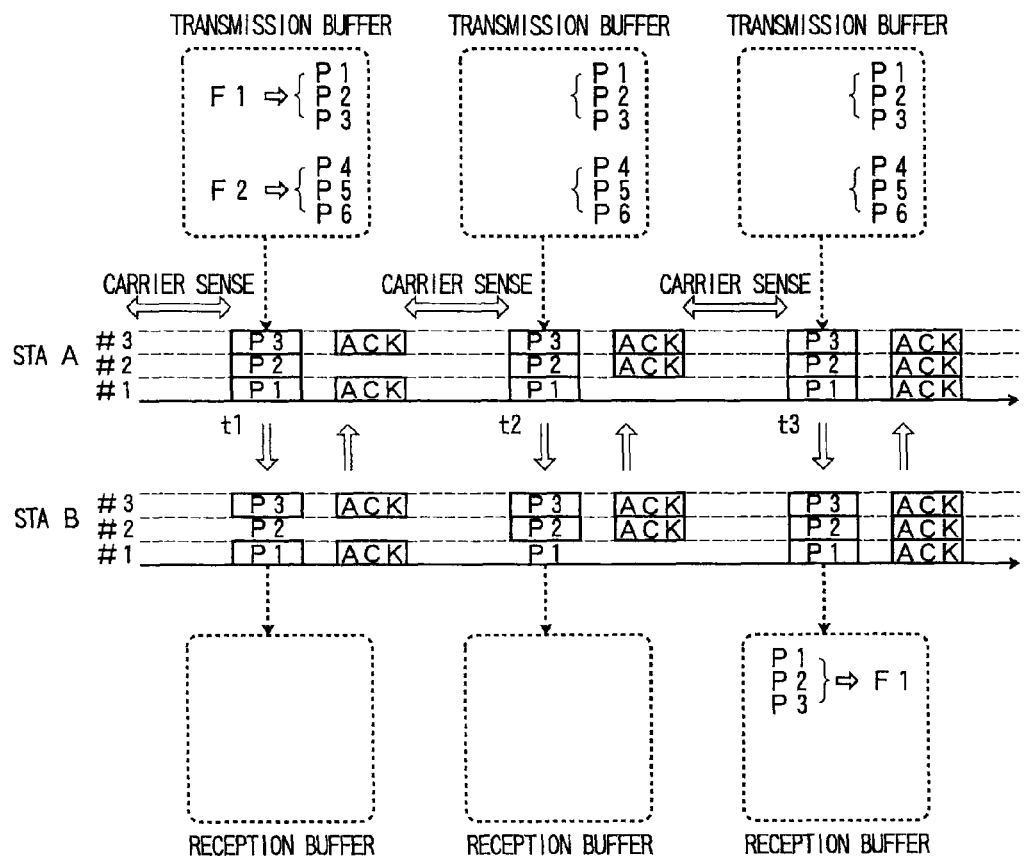
FIG. 52 is a time chart to explain a conventional retransmission method 1.
Figure 53:
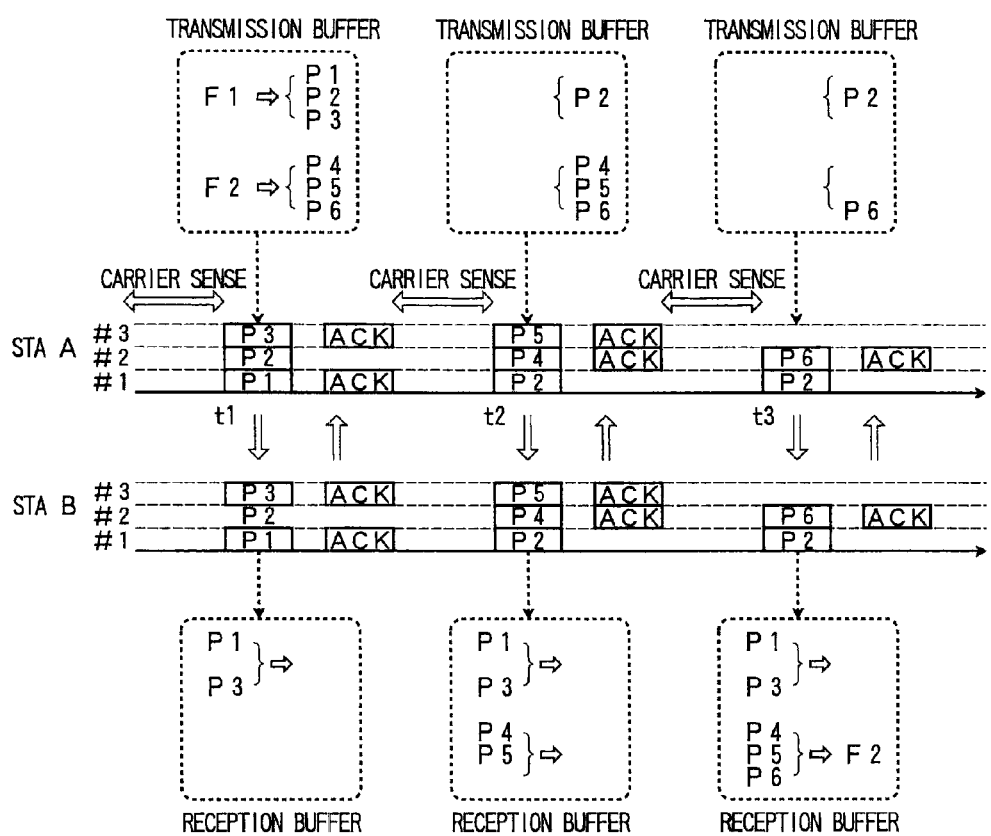
FIG. 53 is a time chart to explain a conventional retransmission method 2.

FIG. 46 shows a flowchart of a twenty-fourth embodiment of the present invention. FIG. 47 shows an operation example of the twenty-fifth embodiment of the present invention. This embodiment is characterized in that an upper limit value Rover is set for the cumulative number R in the packet-group in the twenty-fourth embodiment. This is done in consideration of the fact that if, for example, prior to the transmission success of the data packet P6, the data packets P7 to P9 generated thereafter are successfully transmitted at the transmission timings t3, t4 in FIG. 45 showing the twenty-fourth embodiment, there arises a problem that the restoration order of the data frames is reversed. The unlimited cumulative number R in the packet-group may possibly cause frequent occurrence of such a problem.

S531 to S542 in the flowchart of the twenty-fifth embodiment shown in FIG. 46 are the same as those of the twenty-fifth embodiment shown in FIG. 44. In this embodiment, when the number w of untransmitted data packets in a packet-group becomes smaller than the simultaneously transmittable number p (S539, S540), the cumulative number R in the packet-group and the upper limit value Rover are compared (S551), and if R≥Rover, data packets are not generated from a next data frame (the flow does not go to S541), but the control is performed so that the flow returns to S534, where all the data packets in the current packet-group are transmitted.

Further, when the number w of the untransmitted data packets in the packet-group becomes 0 (S539, S540), the cumulative number R in the packet-group and the upper limit value Rover are compared (S552), and if R≥Rover, the flow returns to S531 in order to newly generate data packets from data frames. On the other hand, if R<Rover, it is determined whether or not there is any data frame in a transmission buffer (S553), and if there is any data frame, the current cumulative number R in the packet-group is not reset but the flow goes to S542, S534 in order to newly generate data packets from the data frames. Further, if there is no data frame, the flow returns to S531 in order to newly generate data packets from data frames.

In the example shown in FIG. 47, 6 is set as the upper limit value Rover of the cumulative number R in the packet-group, so that at an instant when data packets P1 to P6 are generated at a transmission timing t1, R≥Rover holds. A difference from the twenty-fourth embodiment shown in FIG. 45 lies in that data packets are not generated when the number w of the untransmitted data packets in the packet-group becomes 2 (<p) at a transmission timing t3 even if data frames F5, F6 are present in the transmission buffer. Consequently, the transmission completion of the data packets P1 to P6 is given priority, so that the data packets P4, P6 are simultaneously transmitted at the transmission timing t3, the data packet P6 is transmitted at a transmission timing t4 due to a failure of transmission of the data packet P6, and after a transmission success thereof, data packets P1, P2, P3 are generated from new data frames F5, F6, F7 at a transmission timing 5.

[Twenty-sixth Embodiment]

A twenty-sixth embodiment is structured such that in the twenty-fifth embodiment, instead of the cumulative number R of data packets constituting the packet-group, the number F of accumulated data frames used for generating the packet-group is used. Similarly to the case where the cumulative number R of data packets is limited, limiting the cumulative number F of data frames makes it possible to avoid the problem of the reversed restoration order of data frames in the course of the retransmission processing when data packets are generated more than necessary.

[Twenty-seventh Embodiment]

A twenty-seventh embodiment is structured such that in the twenty-fourth to twenty-fifth embodiments, an STA A transmits a NACK request packet to an STA B and receives a NACK packet transmitted from the STA B, as in the twenty-second embodiment. In this case, the processing at S535 and the processing at S536 are transmission of the NACK request packet and reception of the NACK packet, and when the NACK packet is received, the total number w of untransmitted data packets failing in transmission and remaining untransmitted data packets in the packet-group is obtained at S537, whereas, when the NACK packet is not received, the number w of the remaining untransmitted data packets in the packet-group is obtained at S538. The other is the same as that of the twenty-fourth embodiment and the twenty-fifth embodiment.

[Twenty-eighth Embodiment]

A twenty-eighth embodiment is structured such that in the twenty-first to twenty-second embodiments, instead of Step S511 of obtaining the number h of the untransmitted data packets failing in transmission in the packet-set, the untransmitted data packets failing in transmission and subsequent data packets in the packet-sets are defined as the untransmitted data packets, and the number h thereof is used for the subsequent processing.

For example, in the examples shown in FIG. 41 and FIG. 43, when the data packet P2 is not successfully transmitted at the transmission timing t1, the data packets P2, P3, P4 are simultaneously transmitted at the transmission timing t2 even though the transmission of the data packet P3 has succeeded. This makes is possible to solve the problem of the reversed restoration order of data frames when the receive-side STA restores the data frames from packet-sets.

[Twenty-ninth Embodiment]

A twenty-ninth embodiment is structured such that in the twenty-fourth to twenty-fifth embodiment, instead of Step S537 of obtaining the total number w of the untransmitted data packets whose transmission failed and the remaining untransmitted data packets in the packet-group, the untransmitted data packets failing in transmission and subsequently generated data packets out of the data packets constituting the packet-group are defined as the untransmitted data packets, and the number w thereof is used for subsequent processing.

For example, in the examples shown in FIG. 45 and FIG. 47, when the data packet P2 is not successfully transmitted at the transmission timing t1, the data packets P2, P3, P4 are simultaneously transmitted at the transmission timing t2 even though the data packet P3 has been transmitted. This makes it possible to solve the problem of the reversed restoration order of data frames when the receive-side STA restores the data frames from data packets.

[Thirtieth Embodiment]

In the fifteenth to twenty-ninth embodiments described hitherto, multiple wireless channels are used for simultaneous transmission of data packets, but a method of utilizing a MIMO system or a method of using both multiple wireless channels and a MIMO system may be adopted when data packets are transmitted.

Further, when the MIMO is used, the number of MIMOs multiplexable in one channel may be calculated based on a predetermined threshold value by finding an antenna correlation from a propagation coefficient. Moreover, simultaneous transmission using multiple wireless channels or simultaneous transmission using the MIMO system may be selected according to the number of data arriving in the transmission buffer or the number of MIMOs that depends on a channel condition.

The invention is not limited to the above embodiments and various modifications may be made without departing from the spirit and scope of the invention. Any improvement may be made in part or all of the components.

INDUSTRIAL APPLICABILITY

The present invention enables efficient and sure transmission of retransmission packets, making the best use of idle channels and MIMO at the time of retransmission due to a failure of transmission of a data packet, which can enhance throughput. In addition, it is possible to simplify the control over data frame restoration by a receive-side STA without any increase in reception buffer size while realizing enhanced throughput.

The invention claimed is:

1. A method of wirelessly transmitting at least one data frame from a first wireless station to a second wireless station over a plurality of wireless channels, the method comprising:
   determining how many of the plurality of wireless channels are idle, wherein an integer C denotes how many of the plurality of wireless channels are determined to be idle;
   dividing the at least one data frame into C groups of data packets, wherein the C groups of data packets correspond one-to-one with the C idle wireless channels, and wherein the dividing includes setting a size of each one of the C groups of data packets such that a same length of time is necessary to transmit the group of data packets over the respective idle wireless channel;
   simultaneously transmitting the C groups of data packets over the respective C idle wireless channels from the first wireless station to the second wireless station;
   determining how many of the C groups of data packets experienced transmission failures, wherein an integer Q denotes how many of the C groups of data packets experienced transmission failures; and in response to Q being greater than zero:

determining how many of the plurality of wireless channels are idle, wherein an integer G denotes how many of the plurality of wireless channels are determined to be idle; and selectively (i) reconstructing the Q groups of data packets that experienced transmission failures into G groups of data packets and (ii) simultaneously transmitting the G groups of data packets over the respective G idle wireless channels from the first wireless station to the second wireless station.

2. The method of claim 1, further comprising performing the reconstructing the Q groups of data packets and the simultaneously transmitting the G groups of data packets in response to G being greater than Q.

3. The method of claim 2, further comprising omitting performance of the reconstructing the Q groups of data packets and the simultaneously transmitting the G groups of data packets in response to G being less than or equal to Q.

4. The method of claim 3, further comprising, in response to G being less than or equal to Q, simultaneously transmitting up to G of the Q groups of data packets over the respective G idle wireless channels from the first wireless station to the second wireless station.

5. The method of claim 1, wherein the G groups of data packets correspond one-to-one with the G idle wireless channels, and wherein the reconstructing includes setting a size of each one of the G groups of data packets such that a same length of time is necessary to transmit the group of data packets over the respective idle wireless channel.

6. The method of claim 1, wherein the determining how many of the plurality of wireless channels are idle comprises carrier sensing.

7. The method of claim 1, wherein the determining how many of the C groups of data packets experienced transmission failures comprises determining for which of the C transmitted groups of data packets a corresponding acknowledgement was not received.

\* \* \* \* \*